US010621390B1

(12) United States Patent
Winston

(10) Patent No.: US 10,621,390 B1
(45) Date of Patent: Apr. 14, 2020

(54) METHOD AND APPARATUS FOR SUMMARIZATION OF NATURAL LANGUAGE

(71) Applicant: Patrick Henry Winston, Cambridge, MA (US)

(72) Inventor: Patrick Henry Winston, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/821,785

(22) Filed: Aug. 9, 2015

Related U.S. Application Data

(60) Provisional application No. 62/202,900, filed on Aug. 9, 2015, provisional application No. 62/086,180, filed on Dec. 1, 2014.

(51) Int. Cl.
*G06F 1/00* (2006.01)
*G06F 1/03* (2006.01)
(Continued)

(52) U.S. Cl.
CPC ............ *G06F 40/30* (2020.01); *G06F 40/169* (2020.01); *G06F 40/211* (2020.01); *G06F 40/268* (2020.01)

(58) Field of Classification Search
CPC ............................ G06F 17/2785; G06F 16/345
(Continued)

(56) References Cited

U.S. PATENT DOCUMENTS 6,205,456 B1 * 3/2001 Nakao .................. G06F 16/345
715/201
9,020,824 B1 * 4/2015 Govil ...................... G10L 19/04
704/275
(Continued)

OTHER PUBLICATIONS

Awad, Hiba. "Culturally Based Story Understanding" Master's thesis, Electrical Engineering and Computer Science Department, MIT, Cambridge, MA. Submitted to EECS Dept. Jun. 2013. 84 pgs.
(Continued)

*Primary Examiner* — Akwasi M Sarpong
(74) *Attorney, Agent, or Firm* — Kaplan IP Law, PLLC; Jonathan T. Kaplan

(57) ABSTRACT

Summarization of an input story can be accomplished through identification of causal relationships, both explicit and implicit. The input story is transformed into an interpretation sequence, using syntactic cues, and common sense knowledge of an average reader. The interpretation sequence is a time ordered semantic representation of the input story, comprised of story elements. The common sense knowledge includes inference rules, which, from story elements already present, can add additional story elements to the interpretation sequence. Application of inference rules, based on type, can be prioritized. Summarization of the interpretation sequence can be accomplished by the selection of explicit story elements, according to a connection-based strategy, or a concept-based strategy. Regarding a concept-based strategy, metrics can be applied, to select the concepts for contra-causal searching of the interpretation sequence. Options can be provided, for the exclusion of means, or the inclusion of implicit, story elements in the output summary.

20 Claims, 70 Drawing Sheets

600 → John kissed Mary and John kissed Susie because John wanted to make Sally jealous and John wanted to win his bet with Paul.

601 →

(51) Int. Cl.

| | | |
|---|---|---|
| *G06F 3/023* | (2006.01) | |
| *G06F 3/03* | (2006.01) | |
| *G06F 40/30* | (2020.01) | |
| *G06F 40/169* | (2020.01) | |
| *G06F 40/211* | (2020.01) | |
| *G06F 40/268* | (2020.01) | |

(58) Field of Classification Search
USPC ........................................ 704/9, 246, 275, 1
See application file for complete search history.

(56) References Cited

U.S. PATENT DOCUMENTS

| | | | | |
|---|---|---|---|---|
| 2009/0100454 | A1* | 4/2009 | Weber | G11B 27/034 |
| | | | | 725/9 |
| 2012/0197630 | A1* | 8/2012 | Lyons | G06F 16/345 |
| | | | | 704/9 |
| 2012/0253793 | A1* | 10/2012 | Ghannam | G06F 17/2785 |
| | | | | 704/9 |
| 2012/0290289 | A1* | 11/2012 | Manera | G06F 16/345 |
| | | | | 704/9 |
| 2015/0039295 | A1* | 2/2015 | Soschen | G06F 17/28 |
| | | | | 704/9 |

OTHER PUBLICATIONS

Fay, Matthew Paul. "Enabling Imagination through Story Alignment." Master's thesis, Electrical Engineering and Computer Science Department, MIT, Cambridge, MA. Submitted to EECS Dept. Feb. 2012. 82 pgs.

Finlayson, Mark Alan. "Learning Narrative Structure from Annotated Folktales." PhD thesis, Electrical Engineering and Computer Science Department, MIT, Cambridge, MA. Submitted to EECS Dept. Feb. 2012. 100 pgs.

Krakauer, Caryn E. "Story Retrieval and Comparison Using Concept Patterns." Master's thesis, Electrical Engineering and Computer Science Department, MIT, Cambridge, MA. Submitted to EECS Dept. May 2012. 70 pgs.

Low, Harold William Cape. "Story Understanding in Genesis: Exploring Automatic Plot Construction through Commonsense Reasoning." Master's thesis, Electrical Engineering and Computer Science Department, MIT, Cambridge, MA. Submitted to EECS Dept. May 2011. 72 pgs.

Nackoul, David Douglas. "Text to Text: Plot Unit Searches Generated from English." Master's thesis, Electrical Engineering and Computer Science Department, MIT, Cambridge, MA. Submitted to EECS Dept. May 2010. 56 pgs.

Sayan, Eren Sila. "Audience Aware Computational Discourse Generation for Instruction and Persuasion" Master's thesis, Electrical Engineering and Computer Science Department, MIT, Cambridge, MA. Submitted to EECS Dept. Jun. 2014. 134 pgs.

Song, Susan S. "Of Intent and Action: Implementing Personality Traits for Storytelling Through Concept Patterns." Master's thesis, Electrical Engineering and Computer Science Department, MIT, Cambridge, MA. Submitted to EECS Dept. Sep. 2012. 97 pgs.

Winston, Patrick Henry. "The strong story hypothesis and the directed perception hypothesis." In Pat Langley, editor, Technical Report FS-11-01, Papers from the AAAI Fall Symposium, pp. 345-352, Menlo Park, CA. Dec. 15, 2011. 9 pgs.

Winston, Patrick Henry. "The next 50 years: a personal view." Biologically Inspired Cognitive Architectures, 1. Submitted Aug. 6, 2012. 15 pgs.

Winston, Patrick Henry. "The right way." Advances in Cognitive Systems, 1:23-36. Jul. 2012. 15 pgs.

Winston, Patrick Henry. "The Genesis Story Understanding and Story Telling System: A 21st Century Step toward Artiticial Intelligence." Center for Brains, Minds, & Machines, Memo No. 019. Jun. 10, 2014. 13 pgs.

Yarlott, Wolfgang Victor Hayden. "Old Man Coyote Stories: Cross-Cultural Story Understanding in the Genesis Story Understanding System." Master's thesis, Electrical Engineering and Computer Science Department, MIT, Cambridge, MA. Submitted to EECS Dept. Jun. 2014. 109 pgs.

\* cited by examiner

Example Precedence Table

FIGURE 2A

200 → Peter, Paul, and Mary are persons. Peter is poor. Mary marries Peter because Mary loves Peter. Paul is a thief. Mary trusts Paul. Mary's starting a company leads to Mary's becoming rich. Paul swindles Mary. In order to kill Paul, Mary stabs Paul.

FIGURE 2B

200 →
1. Peter, Paul, and Mary are persons.
2. Peter is poor.
3. Mary marries Peter because Mary loves Peter.
4. Paul is a thief.
5. Mary trusts Paul.
6. Mary's starting a company leads to Mary's becoming rich.
7. Paul swindles Mary.
8. In order to kill Paul, Mary stabs Paul.

FIGURE 4A
Example Deductive Rules

410: If xx swindles yy, then xx harms yy.

411: If xx harms yy, then xx angers yy.

412: If xx kills yy, then yy becomes dead.

FIGURE 4B
Example Explanatory Rules

420: If xx becomes rich and xx trusts yy and yy is a thief, then yy may swindle xx.

421: If xx angers yy, then yy may kill xx.

FIGURE 4C
Example Proximity Rule

430: xx becomes rich; yy becomes jealous.

FIGURE 4D
Example Abductive Rule

440: If xx kills yy, then xx is insane.

FIGURE 4E
Example Presumptive Rules

450: xx starts a company presumably because xx is ambitious.

451: xx is a thief presumably because xx is greedy.

FIGURE 4F
Example Enabling Rule

460: If xx stabs yy, then xx has a knife.

FIGURE 4G
Example Entity Rules

470: xx is a person.

471: yy is a person.

FIGURE 4H
Example Censoring Rule

480: If xx becomes dead, then xx cannot become unhappy.

Becomes relevant as a result of adding

481: If xx kills yy, then xx harms yy.

482: If xx harms yy, then yy becomes unhappy.

FIGURE 5A

Concept: Murder  ← 510 xx's angering yy leads_to yy's killing xx

FIGURE 5B

Concept: Tragic Greed  ← 520 xx's being greedy leads_to xx's becoming dead

FIGURE 5C

Concept: Ambition Rewarded  ← 530 xx's being ambitious leads_to xx's becoming rich

FIGURE 5D

Concept: Regicide

540: xx murders yy

541: yy is a king

FIGURE 7A

```
                                                                    ⟵ 700
(<VERB>
        (entity <AGENT>)
        (roles
                (object (entity <T_OBJECT>))
                [ (<prep_1> (entity <DESTINATION>)) ]
                [ (<prep_2> (entity <INSTRUMENT>)) ]
                [ (<prep_3> (entity <NEW_SURROUNDINGS>)) ]
                        .
                        .
                        .
                                                                    ) )
```

FIGURE 7B

```
            ⟵ 710                                                  ⟵ 700
701.    (<VERB>
702.            (entity <AGENT>)
703.            (roles
704.                    (object (entity <T_OBJECT>))
705.                    [ (<prep_1> (entity <DESTINATION>)) ]
706.    720 ⟶           [ (<prep_2> (entity <INSTRUMENT>)) ]
707.                    [ (<prep_3> (entity <NEW_SURROUNDINGS>)) ]
                                .
                                .
                                .
708.                                                                ) )
                                                                  721  711
```

FIGURE 8A

Explicit: (put
    (entity AGENT_UNKNOWN)
    (roles
        (object (entity Peter))
        (into (entity Person)) ) )

← 800

805 → ← 806

801. Explicit: (classification (entity Person) (entity Peter))
802. Explicit: (classification (entity Person) (entity Paul))
803. Explicit: (classification (entity Person) (entity Mary))

FIGURE 8B

Explicit: (add
    (entity AGENT_UNKNOWN)
    (roles
        (object (entity poor))
        (to (entity Peter)) ) )

← 810

811. Explicit: (property (entity Peter) (entity poor))

FIGURE 8C

Explicit: (love
    (entity Mary)
    (roles
        (object (entity Peter)) ) )

← 820

Explicit: (marry
    (entity Mary)
    (roles
        (object (entity Peter)) ) )

840. Explicit: (classification (entity thief) (entity Paul))

FIGURE 8E

Explicit: (trust  ← 850
    (entity Mary)
    (roles
        (object (entity Paul)) ) )

FIGURE 8F

Explicit: (start  ← 860
    (entity Mary)
    (roles
        (object (entity company)) ) )

Explicit: (appear  ← 861
    (property (entity Mary) (entity rich)) )

FIGURE 8G
Explicit: (swindle
        (entity Paul)
        (roles
            (object (entity Mary) ) ) ~870
FIGURE 8H
Explicit: (stab
        (entity Mary)
        (roles
            (object (entity Paul)) ) ) ~880
Explicit: (kill
        (entity Mary)
        (roles
            (object (entity Paul)) ) ) ~881

FIGURE 10B
1030 ▸ (cause_direct
        (cause_indirect
            ("John loves Mary")
            ("John is arrested") )
        ("John is foolish") )
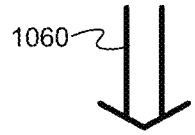
1060
1040 ▸ (cause_indirect
        ("John loves Mary")
        ("John is arrested") )
1041 ▸ ("John is foolish")
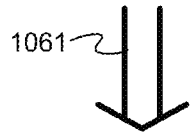
1061
1050 ▸ ("John loves Mary")
1051 ▸ ("John is arrested")
1041 ▸ ("John is foolish")

Example Implementation for Deductive Rule 410

Example Implementation for Explanation Rule 420

Example Implementation for Proximity Rule 430

Example Implementation for Abductive Rule 440

Example Implementation for Presumptive Rule 450

Example Implementation for Enabling Rule 460

Example Implementation for Murder Concept 510

Example Implementation for Tragic Greed Concept 520

FIGURE 12A

```
1  /* Builds an "interpretation sequence" representation of the input_story, comprised of a sequential ordering of sets, where each set
2   * is called a "time_step." Each time_step represents a corresponding sentence, of the sequence of sentences that constitute the
3   * input_story. Each time_step contains the set of semantic models that result (either explicitly or implicitly) from its corresponding
4   * sentence. Interpretation sequence is value returned by build-EG. */
5  build-EG( input_story )
6  {
7
8     /* Initialize interpretation sequence. */
9     interpretation_sequence = EMPTY_LIST;
10
11    /* Sequentially consider each explicit sentence of input_story. Each iteration of below loop builds a complete time_step.
12     * First step, for each iteration, is to reset time_step to EMPTY_SET. Last step is to add the complete time_step onto
13     * end of interpretation_sequence. */
14    for (each e_sentence of input_story) {
15
16       /* With respect to the input story's specification of the passage of time, it is referred to as the "story clock." The story clock
17        * is regarded as advancing no more frequently than with each successive sentence of the input story. The story elements
18        * resulting (whether explicitly or implicitly), from a same sentence of the input story, are indicated as having no temporal
19        * ordering (relative to each other) by their being packaged into a single time step set. */
20
21       /* Since we are beginning consideration of a new sentence of the input story, a new time_step is started. */
22       time_step = EMPTY_SET;
23
24       /* get-non-compounds returns a set of ≥1 non-compound sentences. If e_sentence is already non-compound, set returned just
25        * contains e_sentence. Otherwise, returns set of ≥2 non-compound sentences. */
26       non_compounds = get-non-compounds( e_sentence );
27
28       /* Iterate through each non-compound sentence. For each such sentence, any new explicit story elements it adds
29        * are determined, and assigned to e_story_elements. If e_story_elements is not empty, then a loop is started, called SE_INFER.
30        * SE_INFER determines, for each of its iterations, another wave of story elements, that can be inferred from e_story_elements.
31        * SE_INFER continues to iterate, until it able to perform one complete iteration, without inferring any additional story elements. */
32       for (each current_sentence of non_compounds) {
33
34          /* Produce semantic model of current sentence. This is where explicit types of causation are identified, and explicitly include
35           * in the semantic model produced. */
36          cs_semantic_model = generate-semantic-model( current_sentence );
```

FIGURE 12B

```
1  /* By recursive decomposition, convert semantic model of current sentence into a set of its corresponding explicit story
2     elements.  Recursive decomposition operates as follows:
3      • complete semantic model itself (i.e., the value of cs_semantic_model) is always included as a story element
4      • If semantic model includes non-subordinating conjunctions, or causation, it is recursively decomposed.
5           ○ For a simple AND, each operand of the AND is added as an additional story element.
6           ○ For each instance of causation:
7                • each operand of the causation identified, added as a story element; and
8                • the causation itself, along with its operands, is added as a story element.
9           ○ Three main types of causation are recognized:
10               ○ Direct causation: labeled "cause_direct" in semantic model
11               ○ Indirect causation: labeled "cause_indirect" in semantic model
12               ○ Means causation: labeled "cause_means" in semantic model */
13 e_story_elements = recursive_decomposition( cs_semantic_model );
14
15 /* This comment block defines a function called "prune-elements."  A call to prune-elements can be described, generally,
16    as follows:
17               returned_value = prune-elements(Arg1, Arg2).
18    The inputs and output are defined as follows:
19      • Arg1: the set of already-known story elements
20      • Arg2: set of potentially new story elements
21      • returned_value = Arg2 - (Arg1 ∩ Arg2) */
22
23 /* prune-elements, as used just below, eliminates, from the newly-determined explicit story elements, any story elements that
24    are already present in the interpretation_sequence or time_step. */
25 e_story_elements = prune-elements( (interpretation_sequence U time_step), e_story_elements );
26
27 /* Determine the set of story elements which, if present in e_story_elements, should be censored.
28    determine-censored-elements works in two main steps.
29      1. Based on the set of story elements currently present in the interpretation_sequence and time_step, a determination is made
30         as to which censor rules, if any, are triggered.
31      2. For each censor rule triggered, its consequent(s) is(are) added to the set of story elements returned. */
32 censored_story_elements = determine-censored-elements( (interpretation_sequence U time_step) );
33
34 /* eliminate, from the newly-determined explicit story elements, any that are censored. */
35 e_story_elements = prune-elements( censored_story_elements, e_story_elements );
```

FIGURE 12C

```
1 2 3 4 5
1 1 1 1 1
          /* Only continue if new explicit story elements result, because of current_sentence. Otherwise skip to next current_sentence. */
      1   if ( e_story_elements != EMPTY_SET ) {
 2
 3        /* Prepare to iteratively infer any non-explicit story elements, resulting from the newly-determined explicit
 4         * story elements of e_story_elements. */
 5
 6        /* Before invoking "SE_INFER" loop, initialize loop variable "rule_triggerings" to TRUE, to start the process. */
 7        rule_triggerings = TRUE;
 8        /* For the first iteration of SE_INFER, the set of story elements, that could possibly lead to new rule triggerings, is initialized
 9         * to the latest new explicit story elements. */
10        new_story_elements = e_story_elements;
11
12        /* Start the loop called "SE_INFER."
13         * Loop seeks to apply various rules embodying background knowledge, that can be helpful in understanding the input story.
14         * A rule consists of a TRIGGER and, if the trigger is satisfied, a corresponding ACTION.
15         * SE_INFER will only stop when, over the course of one entire iteration, no new story elements are inferred. */
16        SE_INFER: while ( rule_triggerings ) {
17
18            /* Begin by assuming no rule triggerings will occur, during current iteration. */
19            rule_triggerings = FALSE;
20            /* Assume current iteration will produce no new story elements to consider, for next iteration of SE_INFER. */
21            next_new_story_elements = EMPTY_SET;
22
```

FIGURE 12D

```
1   /* Consider every deductive rule, for its potential applicability. */
2   for (each current_rule of deductive_rules) {
3     /* Each iteration, of below-for-each-from-satisfying construct, finds a next minimal and unique combination, that satisfies
4      * trigger of current_rule. Each triggering combination (assigned to current_comb) represents a selection of antecedents
5      * for triggering current_rule, that includes at least some participation from new_story_elements. */
6     for (each current_comb from ((interpretation_sequence U time_step) U new_story_elements) satisfying current_rule) {
7       /* As a result of the below use of apply-rule, current_rule produces a type 1 story element, and, in many
8        *  cases, ≥1 story elements of type 2:
9        *    1. A story element of the particular instance of deductive causation identified. This type of causal link uses the
10       *       symbol cause_deduct.
11      *    2. A story element for each consequent, produced by triggering of current_rule by current_comb. */
12      rule_results = apply-rule(current_comb, current_rule);
13      /* Prune, from rule_results, any story elements already in interpretation_sequence, or that are planned for addition to
14       * the interpretation_sequence. */
15      rule_results = prune-elements(((interpretation_sequence U time_step U new_story_elements U
16                     next_new_story_elements), rule_results);
17      if (rule_results != EMPTY_SET) {
18        /* At least one new story element has been found. At least one more iteration of SE_INFER is assured, by setting
19         * rule_triggerings to TRUE. Exploration of the new story elements is deferred, until the next iteration of SE_INFER,
20         * by putting it aside (for the remainder of current iteration) in next_new_story_elements. */
21        rule_triggerings = TRUE;
22        next_new_story_elements = next_new_story_elements U rule_results;
23      } /* end if */
24    } /* end for each current_comb */
25  } /* end for each current_rule */
```

FIGURE 12E

```
1  /* Under this particular embodiment, every enabling rule is evaluated, for its potential applicability. */
2  for (each current_rule of enabling_rules) {
3      /* Following use, of for-each-from-satisfying loop, is same as discussed above, except that since the rule, for which a
4       * combination is sought is an enabling rule, each combination of story elements, assigned to current_comb, is a
5       * combination of ≥1 consequents.  The consequents selected include at least some participation from new_story_elements. */
6      for (each current_comb from {(interpretation_sequence U time_step) U new_story_elements} satisfying current_rule) {
           /* As a result of the below use of apply-rule, current_rule produces a type 1 story element, and, in many
            * cases, ≥1 story elements of type 2.
                1. A story element of the particular instance of enabling causation identified.  This type of causal link uses the
                   symbol cause_enable.
                2. A story element for each antecedent, implied by triggering of current_rule by current_comb. */
           rule_results = apply-rule(current_comb, current_rule);
           /* Prune, from rule_results, any story elements already in interpretation_sequence, or that are planned for addition to
            * the interpretation_sequence. */
           rule_results = prune-elements( {(interpretation_sequence U time_step U new_story_elements U
           next_new_story_elements}, rule_results);
           if (rule_results != EMPTY_SET) {
               /* At least one new story element has been found.  At least one more iteration of SE_INFER is assured, by setting
                * rule_triggerings to TRUE.  Exploration of the new story elements is deferred, until the next iteration of SE_INFER,
                * by putting it aside (for the remainder of the current iteration) in next_new_story_elements. */
               rule_triggerings = TRUE;
               next_new_story_elements = next_new_story_elements U rule_results;
           } /* end if */
       } /* end for each current_comb */
   } /* end for each current_rule */
```

FIGURE 12F

```
1   /* Under this particular embodiment, every proximity rule is tried, for potential applicability.  However, each configuration of
2    * story elements, where a proximity rule could otherwise apply, can be blocked by a pre-existing Priority 1 causal
3    * connection. */
4   for (each current_rule of proximity_rules) {
5
6     /* For each iteration, of below 'for-each-from-satisfying' loop, a next minimal, and unique combination
7      * (of ≥ 1 antecedents, and ≥ 1 consequents) that satisfies the trigger of current_rule, is determined. */
8     for (each current_comb from {(interpretation_sequence U time_step) U new_story_elements} satisfying current_rule) {
9       /* For each identified combination, the consequent portion is tested, for whether it is already the consequent of a Priority 1
10       * causal connection.  If such Priority 1 causal connection is found, then current_comb is skipped, as an application of
11       * current_rule. */
12
13      /* Get consequent portion, of current_comb.  */
14      current_consequent = get-consequent(current_comb, current_rule);
15      /* Determine all story elements either in interpretation sequence, or planned for addition to it. */
16      all_story_elements = {interpretation_sequence U time_step U new_story_elements U next_new_story_elements };
17
18      if (
19         /* Confirm that consequent portion is not already consequent of a Priority 1 causal connection. */
20         consequent_of_priority1(current_consequent, all_story_elements) == FALSE &&
21         /* Confirm that consequent portion is not already consequent for some other proximity causal connection. */
22         consequent_of_proximity(current_consequent, all_story_elements U rule_results) == FALSE)
23      {
24        /* A new story element, in the form of a proximity type causal link, has been found.  Use apply-rule to produce the link.
25         * This type of causal link uses the symbol cause_prox. */
26        rule_results = apply-rule(current_comb, current_rule);
27        /* At least one more iteration of SE_INFER is assured, by setting rule_triggerings to TRUE.
28         * Exploration of the new story element is deferred, until the next iteration of SE_INFER,
29         * by putting it aside (for the remainder of the current iteration) in next_new_story_elements. */
30        rule_triggerings = TRUE;
31        next_new_story_elements = next_new_story_elements U rule_results;
32      } /* end if */
33
34    } /* end "for each current_comb" */
35  } /* end "for each current_rule" */
```

FIGURE 12G

```
1  for (each current_rule of explanatory_rules){
2   for (each current_comb from ((interpretation_sequence U time_step) U new_story_elements) satisfying current_rule){
3
4    /* Get consequent portion, of current_comb. */
5    current_consequent = get-consequent(current_comb, current_rule);
     /* Determine all story elements either in interpretation sequence, or planned for addition to it. */
     all_story_elements = (interpretation_sequence U time_step U new_story_elements U next_new_story_elements );

if (
      /* Confirm that consequent portion is not already consequent of a Priority 1 causal connection. */
      consequent_of_priority1(current_consequent, all_story_elements) == FALSE &&
      /* Confirm that consequent portion is not already consequent for a proximity causal connection. */
      consequent_of_proximity(current_consequent, all_story_elements) == FALSE &&
      /* Confirm that consequent portion is not already consequent for some other explanatory causal connection. */
      consequent_of_explanatory(current_consequent, all_story_elements) == FALSE)
     {
       /* A new story element, in the form of an explanatory type causal link, has been found. Use apply-rule to produce
        * the link. This type of causal link uses the symbol cause_expla. */
       rule_results = apply-rule(current_comb, current_rule);

rule_triggerings = TRUE;
       next_new_story_elements = next_new_story_elements U rule_results;
     } /* end if */
   } /* end for each current_comb */
  } /* end for each current_rule */
```

FIGURE 12H

```
1  ─── for (each current_rule of abductive_rules) {
2  ─── for (each current_comb from {(interpretation_sequence U time_step) U new_story_elements} satisfying current_rule) {
3  ───
4  ─── /* Get consequent portion, of current_comb. */
5  ─── current_consequent = get-consequent(current_comb, current_rule);

/* Determine all story elements either in interpretation sequence, or planned for addition to it. */
       all_story_elements = {interpretation_sequence U time_step U new_story_elements U next_new_story_elements };

6  ─── if(
7  ─── /* Confirm that consequent portion is not already consequent of a Priority 1 causal connection. */
8  ─── consequent_of_priority1(current_consequent, all_story_elements) == FALSE &&
9  ─── /* Confirm that consequent portion is not already consequent for a proximity causal connection. */
10 ─── consequent_of_proximity(current_consequent, all_story_elements) == FALSE &&
11 ─── /* Confirm that consequent portion is not already consequent for an explanatory causal connection. */
12 ─── consequent_of_explanatory(current_consequent, all_story_elements) == FALSE &&
13 ─── /* Confirm that consequent portion is not already consequent for some other abductive causal connection. */
14 ─── consequent_of_abductive(current_consequent, all_story_elements) == FALSE)
15 ─── {
16 ───
17 ─── /* A new story element, in the form of an abductive type causal link, has been found. It is also likely that the
18 ───  * ≥1 abductively inferred antecedents are also new. Use apply-rule to produce causal link and ≥1 antecedents.
19 ───  * This type of causal link uses the symbol cause_abduct. */
20 ─── rule_results = apply-rule(current_comb, current_rule);
21 ───
22 ─── rule_triggerings = TRUE;
23 ─── next_new_story_elements = next_new_story_elements U rule_results;
24 ───
25 ─── } /* end if */
26 ───
27 ─── } /* end for each current_comb */
28 ─── } /* end for each current_rule */
```

FIGURE 12I

```
1    for each current_rule of presumptive_rules) {
2      for (each current_comb from {(interpretation_sequence U time_step) U new_story_elements) satisfying current_rule) {
3
4        /* Get consequent portion of current_comb. */
5        current_consequent = get-consequent(current_comb, current_rule);
6        /* Determine all story elements either in interpretation sequence, or planned for addition to it. */
7        all_story_elements = {(interpretation_sequence U time_step U new_story_elements U next_new_story_elements };
8
9        if(
10         /* Confirm that consequent portion is not already consequent of a Priority 1 causal connection. */
11         consequent_of_priority1(current_consequent, all_story_elements) == FALSE &&
12         /* Confirm that consequent portion is not already consequent for a proximity causal connection. */
13         consequent_of_proximity(current_consequent, all_story_elements) == FALSE &&
14         /* Confirm that consequent portion is not already consequent for an explanatory causal connection. */
15         consequent_of_explanatory(current_consequent, all_story_elements) == FALSE &&
16         /* Confirm that consequent portion is not already consequent for an abductive causal connection. */
17         consequent_of_abductive(current_consequent, all_story_elements) == FALSE &&
18         /* Confirm that consequent portion is not already consequent for some other presumptive causal connection. */
19         consequent_of_presumptive(current_consequent, all_story_elements) == FALSE)
20       {
21         /* A new story element, in the form of an presumptive (type causal link, has been found. It is also likely that the
22          * ≥1 presumptively-inferred antecedents are also new. Use apply-rule to produce causal link and ≥1 antecedents.
23          * This type of causal link uses the symbol cause_presum. */
24         rule_results = apply-rule(current_comb, current_rule);
25
26         rule_triggerings = TRUE;
27         next_new_story_elements = next_new_story_elements U rule_results;
28       } /* end if */
29
30     } /* end 'for each current_comb' */
31   } /* end 'for each current_rule' */
```

FIGURE 12J

```
1  2  3  4  5
|  |  |  |  |
            /* Prepare for next iteration of SE_INFER:
             *  Now that all implications, of new_story_elements, have been found, add them into time_step
             *  next_inferred_story_elements become the new_story_elements, of the next iteration */
            time_step = time_step ∪ new_story_elements;
            new_story_elements = next_new_story_elements;

} /* end "SE_INFER" loop */

} /* end "if (e_story_elements != EMPTY_SET)" */

} /* end "for (each current_sentence of non_compounds)" */

/* Now that all story elements resulting from current e_sentence have been determined, add the resulting time_step onto
    * the end of the interpretation sequence. */
   interpretation_sequence = interpretation_sequence + time_step;

} /* end "for (each e_sentence of input_story)" */ return interpretation_sequence;

} /* end "build_EG" */
```

T1

801. Explicit: (classification (entity person) (entity Peter))
802. Explicit: (classification (entity person) (entity Paul))
803. Explicit: (classification (entity person) (entity Mary))

T2

811: Explicit: (property (entity Peter) (entity poor))

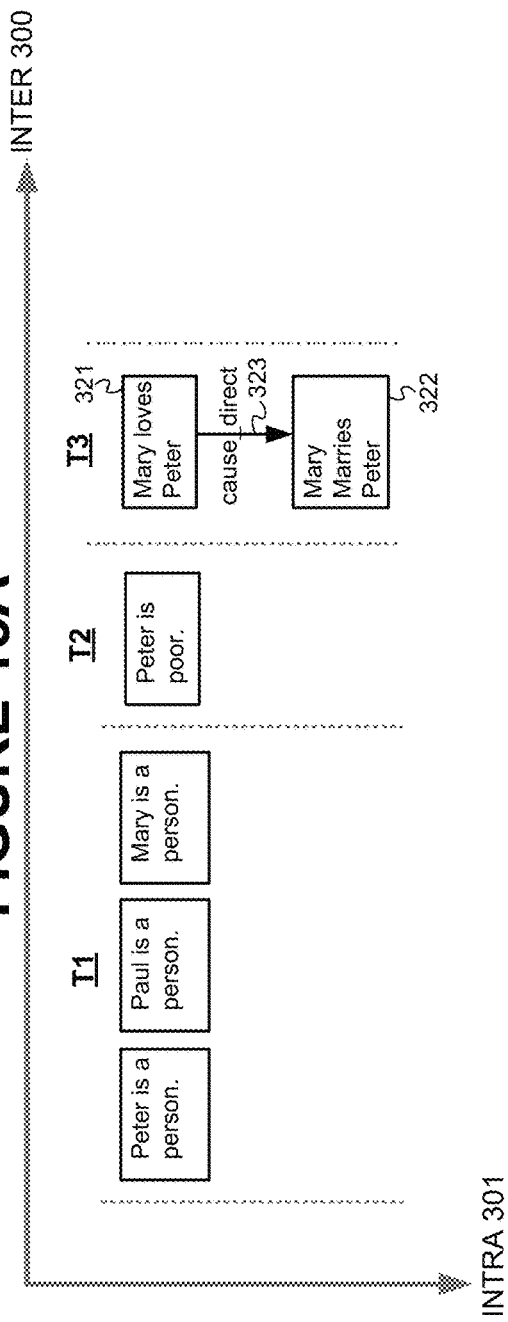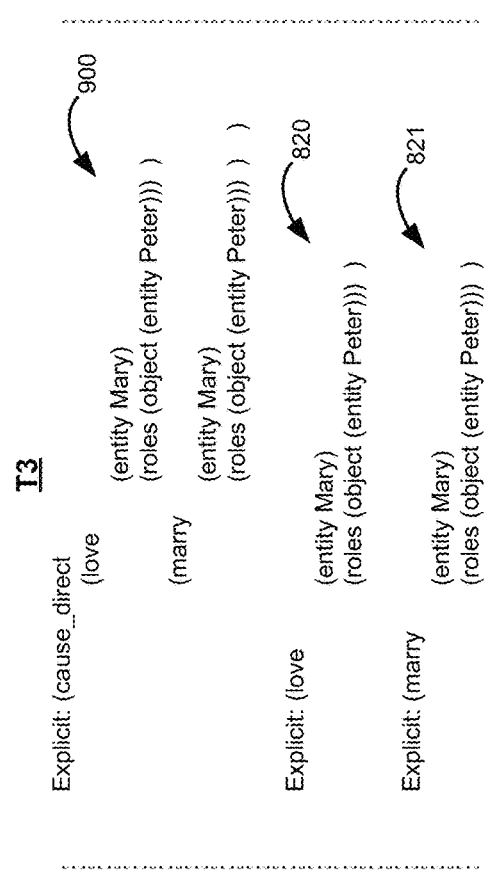

Explicit: (cause_indirect                                            ← 910
            (start
                      (entity Mary)
                      (roles (object (entity company))) )
            (appear
                      (property (entity Mary) (entity rich)) ) )

Explicit: (start                                                  ← 860
            (entity Mary)
            (roles (object (entity company))) )

← 861
Explicit: (appear
            (property (entity Mary) (entity rich)) )

← 1810
Implicit: (cause_presumptive
            (property (entity Mary) (entity ambitious))
            (start
                      (entity Mary)
                      (roles (object (entity company))) ) )

1811. Implicit: (property (entity Mary) (entity ambitious))

Explicit: (cause_means ← 920
        (recipe
                (stab
                      (entity Mary)
                      (roles (object (entity Paul))) )  )
        (kill
                (entity Mary)
                (roles (object (entity Paul))) )  )

Explicit: (stab ← 880
        (entity Mary)
        (roles (object (entity Paul))) )

Explicit: (kill ← 881
        (entity Mary)
        (roles (object (entity Paul))) )

Implicit: (cause_deductive ← 2010
        (kills
                (entity Mary)
                (roles (object (entity Paul))) )
        (appear
                (property (entity Paul) (entity dead)) )  )

Implicit: (appear ← 2011
        (property (entity Paul) (entity dead)) )

Implicit: (cause_enable ← 2012
        (have
                (entity Mary)
                (roles (object (entity knife))) )
        (stab
                (entity Mary)
                (roles (object (entity Paul))) )  )

Implicit: (have ← 2013
        (entity Mary)
        (roles (object (entity knife))) )

Implicit: (cause_explanatory ← 2014
        (anger
                (entity Paul)
                (roles (object (entity Mary))) )
        (kill
                (entity Mary)
                (roles (object (entity Paul))) )  )

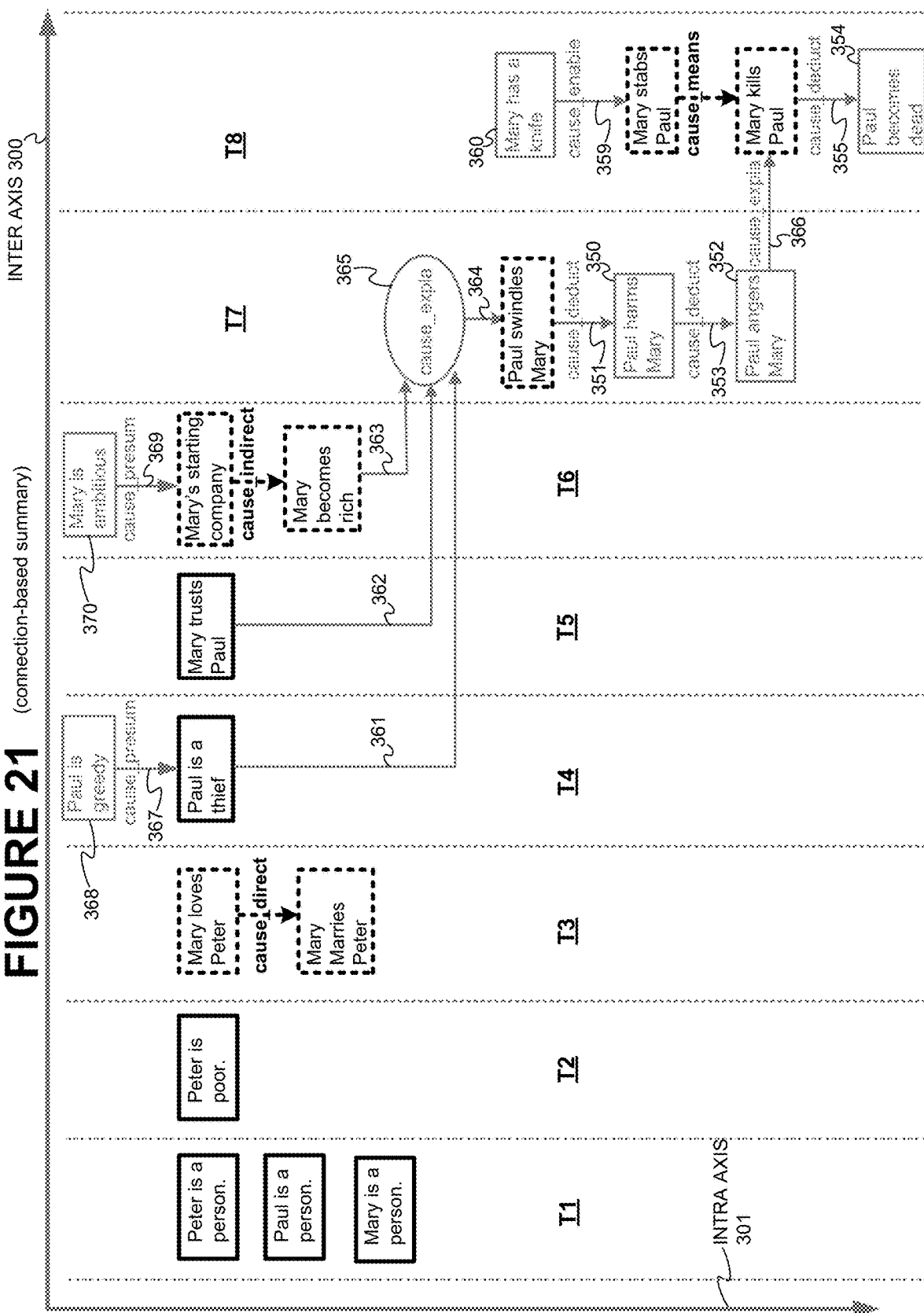
FIGURE 21 (connection-based summary)

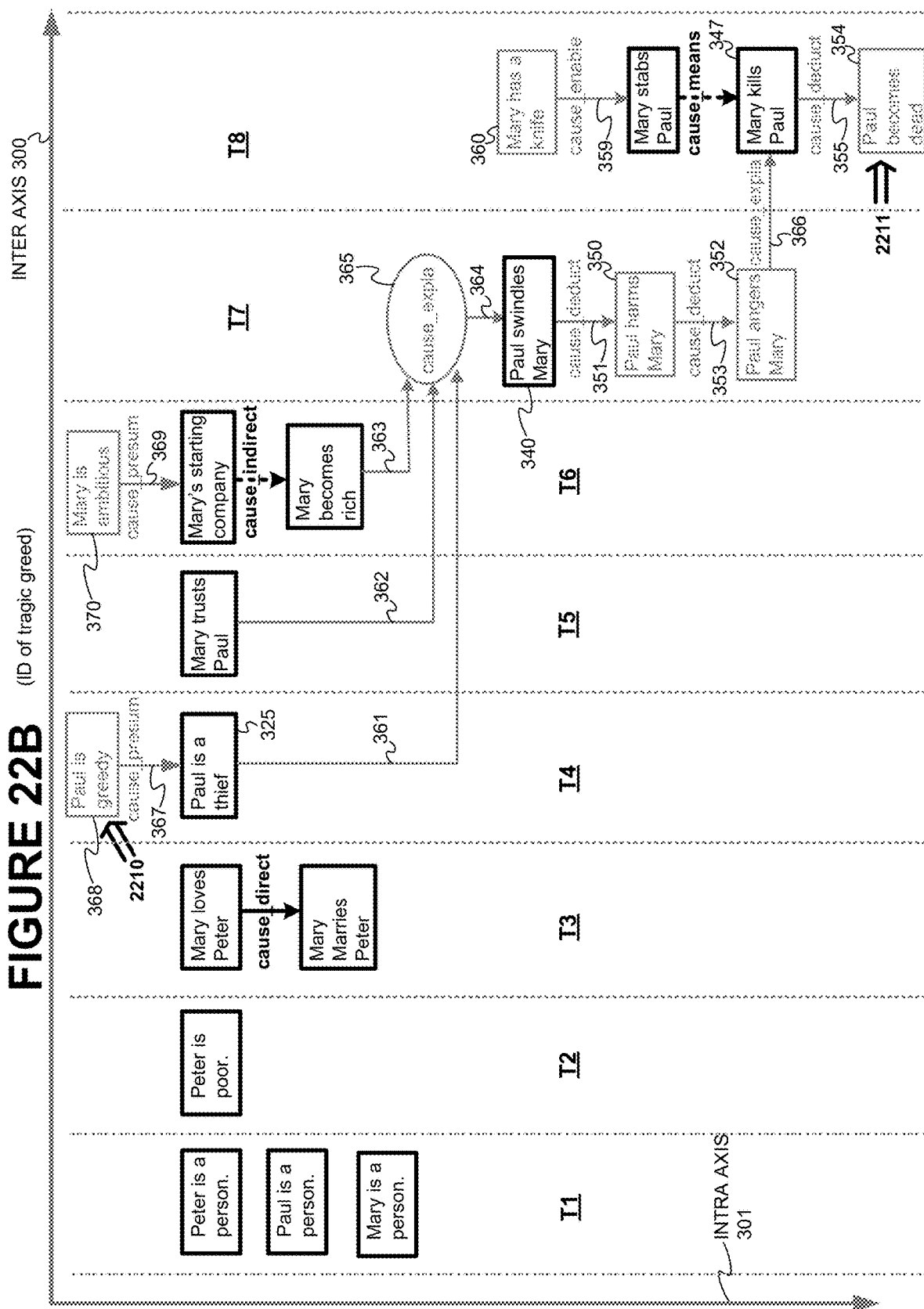
FIGURE 22B  (ID of tragic greed)

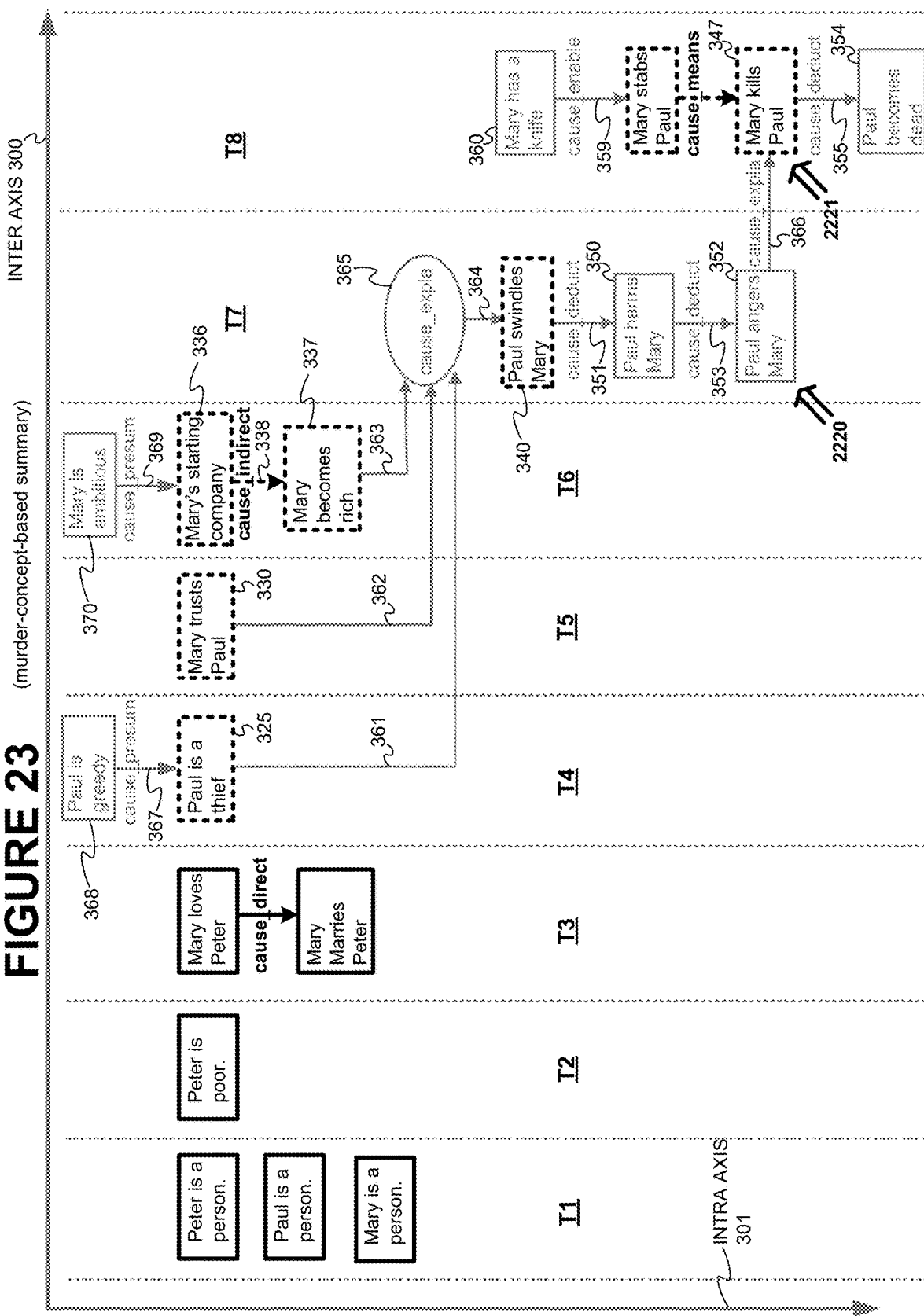

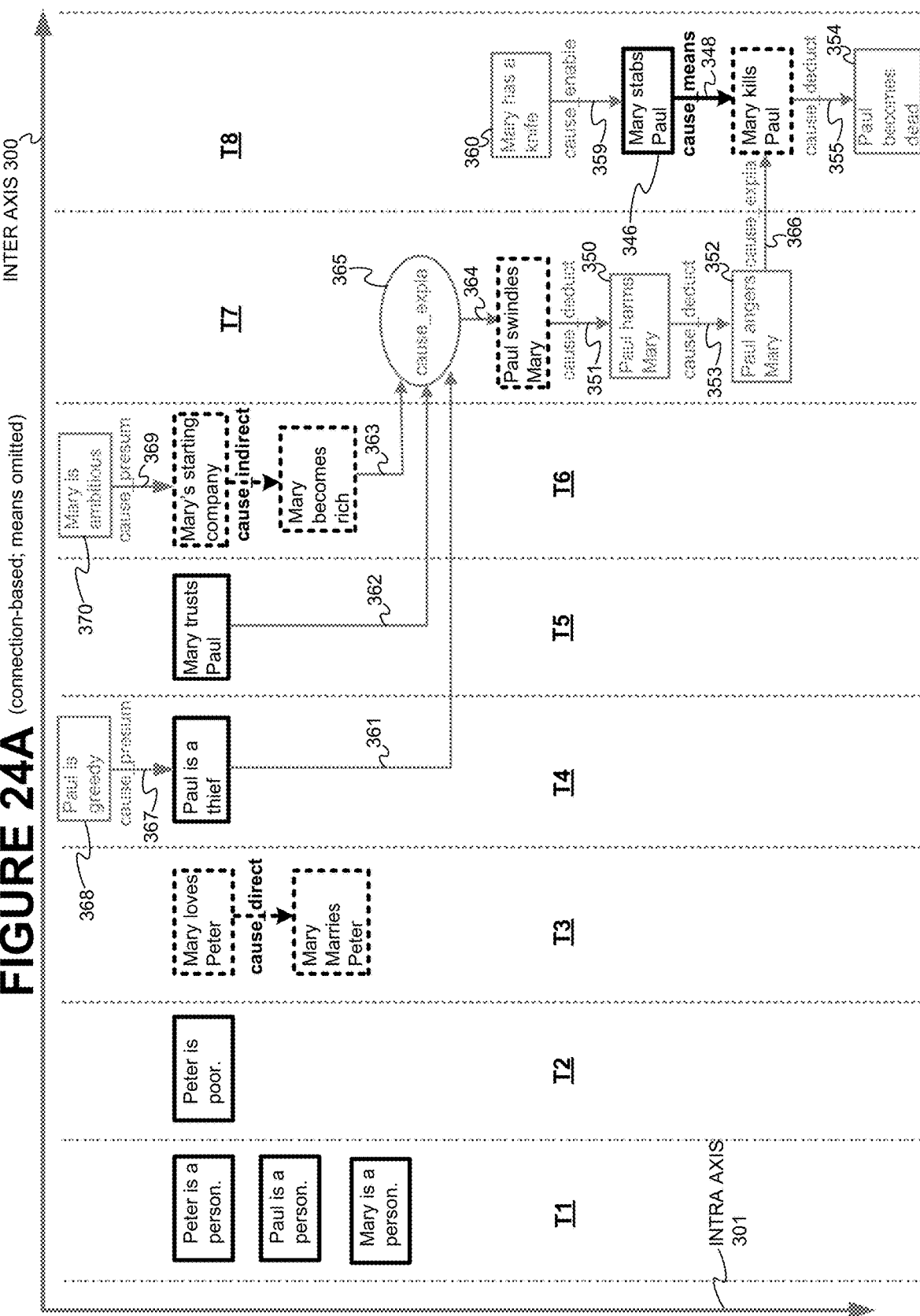
FIGURE 24A (connection-based; means omitted)

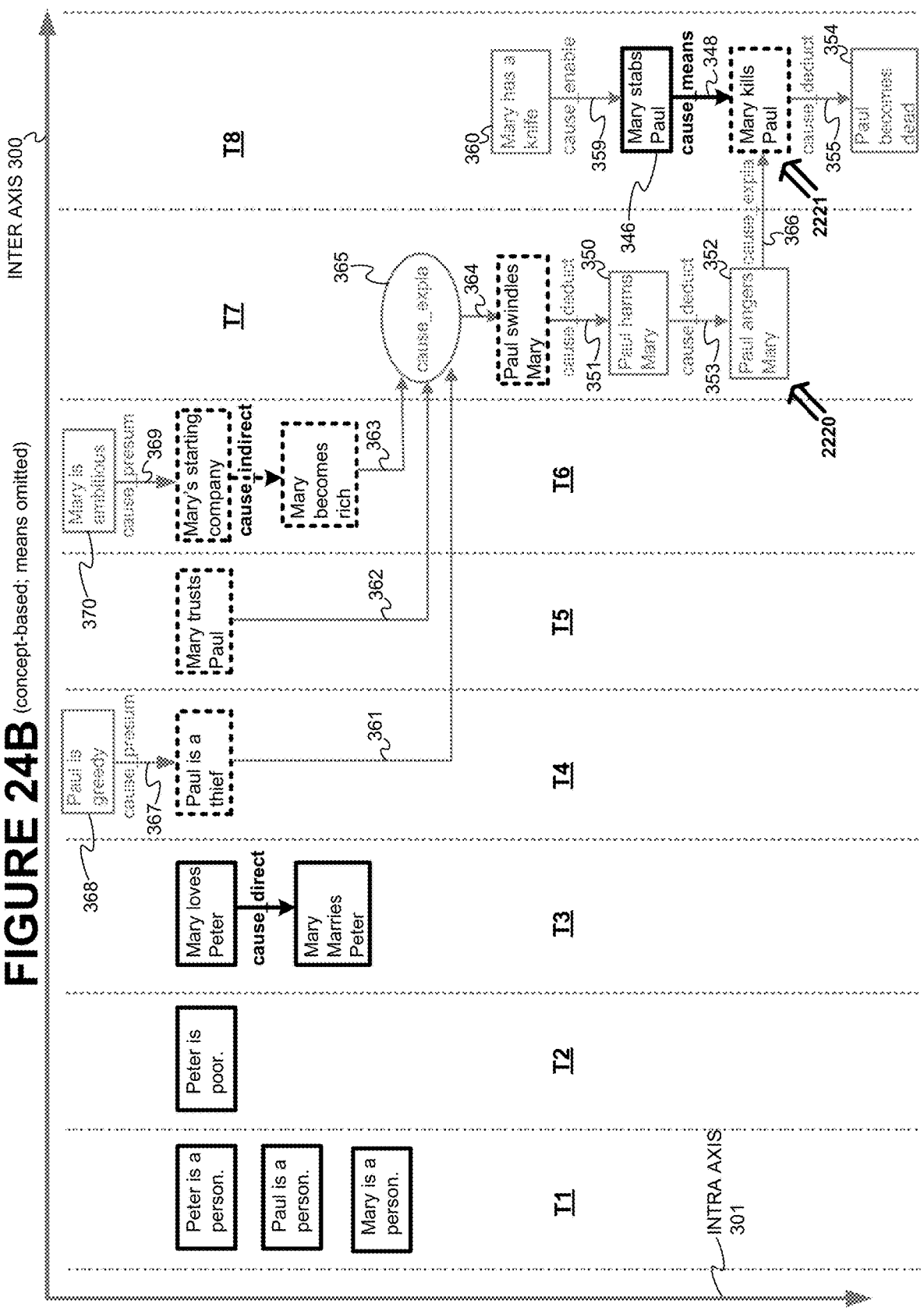

FIGURE 25A

```
1  /* Given an interpretation sequence, marks explicit story elements for inclusion in a connectedness summary. */
2  ConnectednessSummarization( interpretation_sequence )
3  {
4
5    /* Iterate through each story element of interpretation sequence. */
6    for ( each story_element_1 of interpretation_sequence ) {
7
8      /* Only continue if current story element is explicit.  Otherwise skip to next story element. */
9      if ( get-explicit( story_element_1 ) == TRUE ) {
10
11       /* Check whether current story element is a causal connection. */
12       if ( causal-connection( story_element_1 ) == TRUE )
13         /* Mark the current story element for inclusion in the summary. */
14         mark-it ( story_element_1 );
15
16       /* Else, check whether current story element is a part of an explicit causal connection. */
17       else
18         for ( each story_element_2 of interpretation_sequence) {
19           if ( get-explicit( story_element_2 ) == TRUE && causal-connection( story_element_2 ) == TRUE )
20             /* Check whether story_element_1 is embedded in story_element_2. */
21             if ( embedded(story_element_1, story_element_2) == TRUE)
22               mark-it ( story_element_1 );
23         } /* end "for each story_element_2" */
```

FIGURE 25B

```
1
2
3
4  /* If story_element_1 is not marked yet, then it can only be included if causes a deduction, but is not itself caused
5   * by a deduction. */
6  if ( get-marked( story_element_1 ) == FALSE )
7  for (each story_element_3 of interpretation_sequence) {
8
9    /* Check whether story_element_3 is an explicit, and deductive link. */
10   if ( deductive-link( story_element_3 ) == TRUE ) {
11
12     /* Check whether story_element_1 is an antecedent in the deductive link */
13     if ( embedded-as-antecedent( story_element_1, story_element_3 ) ) {
14
15       /* Now we know that story_element_1 is a cause of a deduction, but must make sure it is not itself caused */
16       caused_by_another = FALSE;
17
18       for (each story_element_4 of interpretation_sequence) {
19         if ( get-explicit( story_element_4 ) == TRUE && deductive-link( story_element_4 ) == TRUE )
20           if ( embedded-as-consequent( story_element_1, story_element_4 )
21             caused_by_another = TRUE;
22       } /* end for each story_element_4 */
23
24       if ( caused_by_another == FALSE )
25         /* We know that story_element_1 causes but is not itself caused, so mark it. */
26         mark-it( story_element_1 );
27
28     } /* end if embedded-as-antecedent */
29
30   } /* end if story_element_3 is an explicit, and deductive link */
31
32 } /* end for each story_element_3 */
33
34 } /* end if ( get-explicit( story_element_1 ) == FALSE ) */
35
36 } /* end if ( get-explicit( story_element_1 ) == TRUE ) */
37
38 } /* end for each story_element_1 */
39
40 } /* end Connectedness-Summarization */
```

FIGURE 26

```
1 2 3 4 5
1 1 1 1 1
/* From a starting point, does a contra-causal search through the interpretation sequence. Explicit story elements visited are marked
 * for inclusion in a concept-based summary. */
ConceptSummarization( interpretation_sequence, starting_point )
{

/* If starting_point is explicit, mark it for inclusion in the summary. */
    if ( get-explicit( starting_point ) == TRUE )
        mark-it ( starting_point );

/* Iterate through each story element of interpretation sequence. */
    for ( each story_element_1 of interpretation_sequence ) {

/* Check whether current story element is a causal connection and has starting_point embedded as consequent. */
        if ( causal-connection( story_element_1 ) == TRUE && embedded-as-consequent( starting_point, story_element_1 ) ) {

/* If story_element_1 is explicit, mark it for inclusion in the summary. */
            if ( get-explicit( story_element_1 ) == TRUE )
                /* Mark the current story element for inclusion in the summary. */
                mark-it ( story_element_1 );

antecedents = get-antecedents( story_element_1 );

for ( each antecedent of antecedents ) {
                ConceptSummarization( interpretation_sequence, antecedent )
            } /* end for each antecedent */

} /* end if story_element_1 is causal connection and has starting_point as consequent */

} /* end for each story_element_1 */

} /* end ConceptSummarization */
```

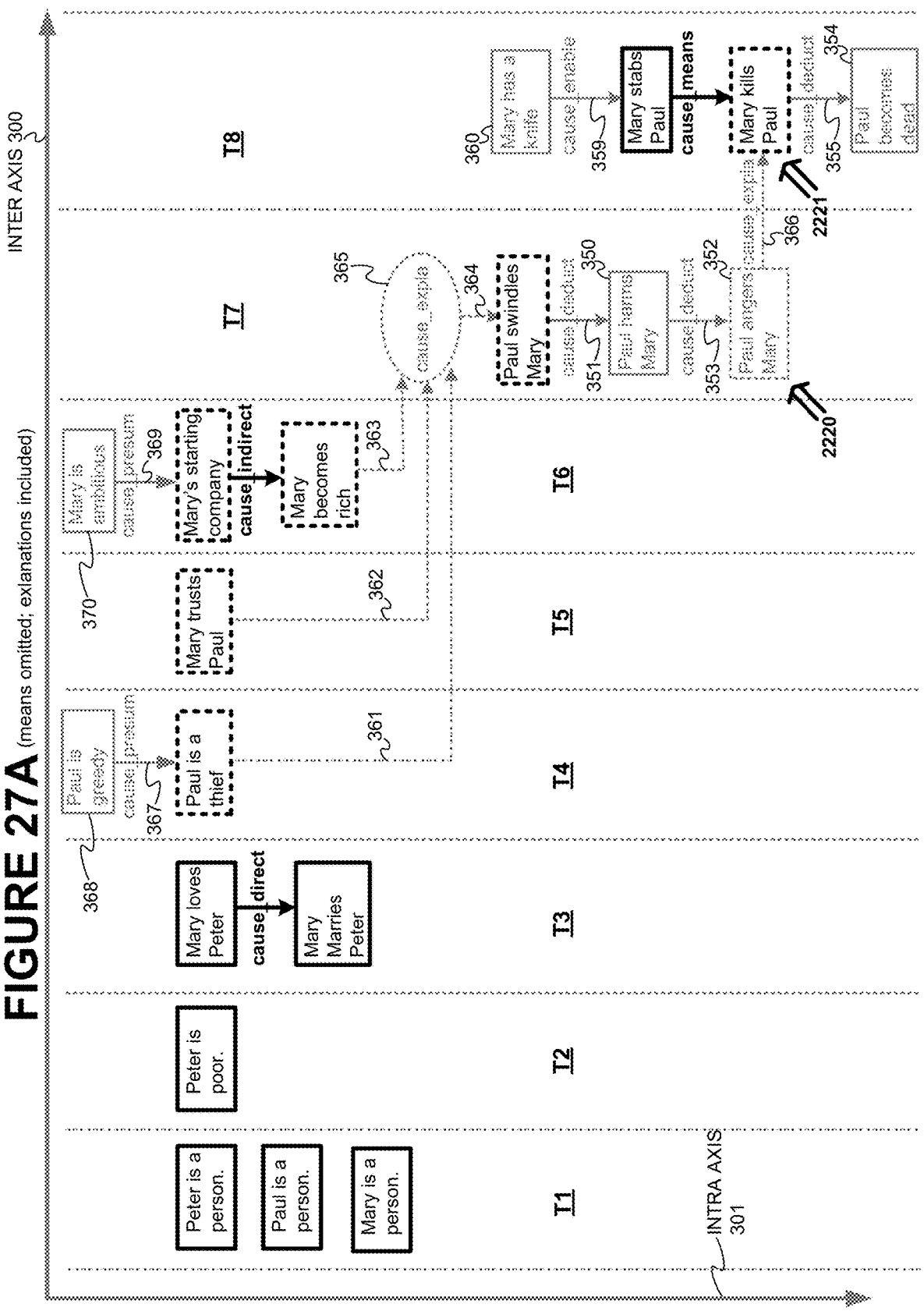

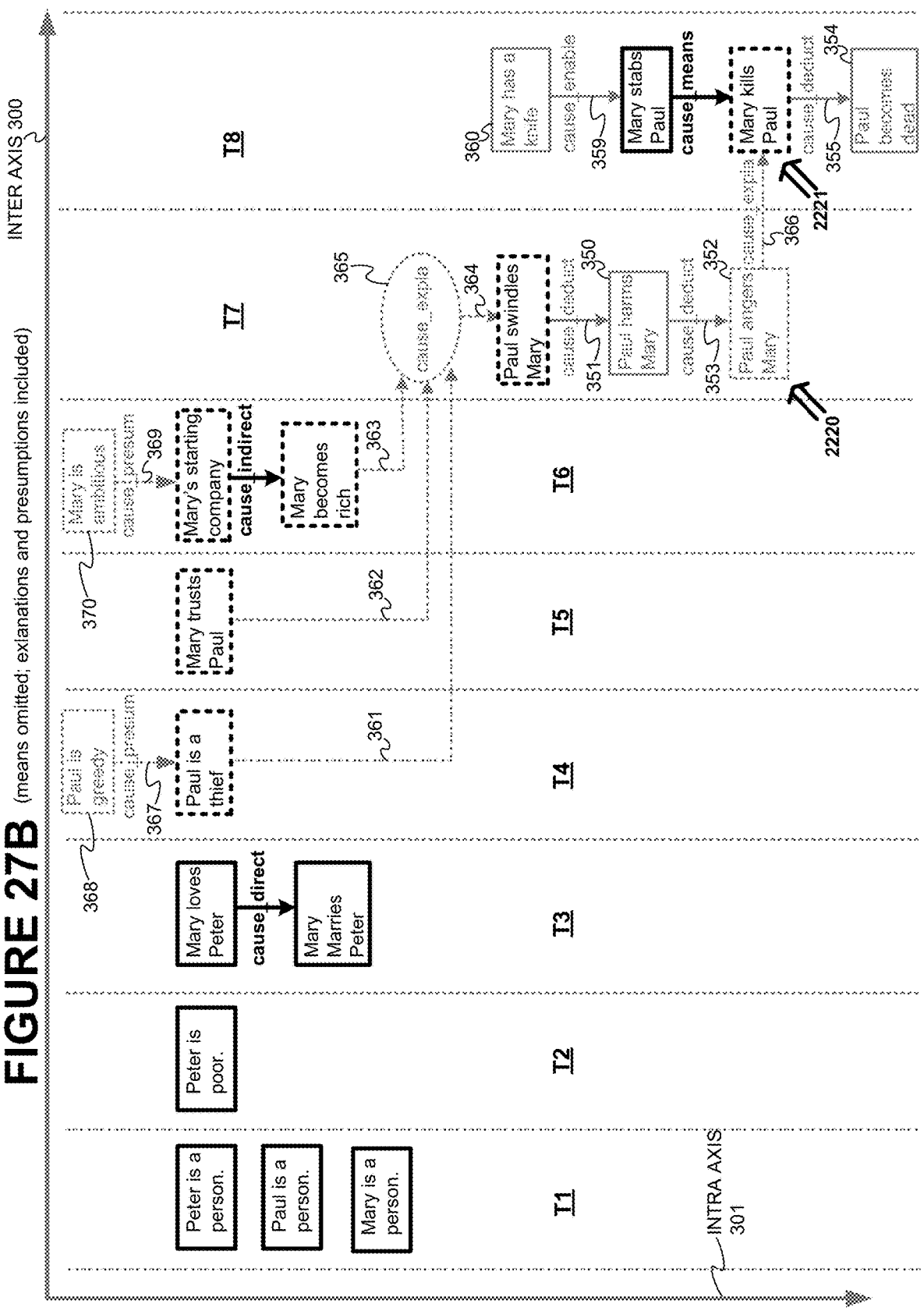
FIGURE 27B (means omitted; explanations and presumptions included)

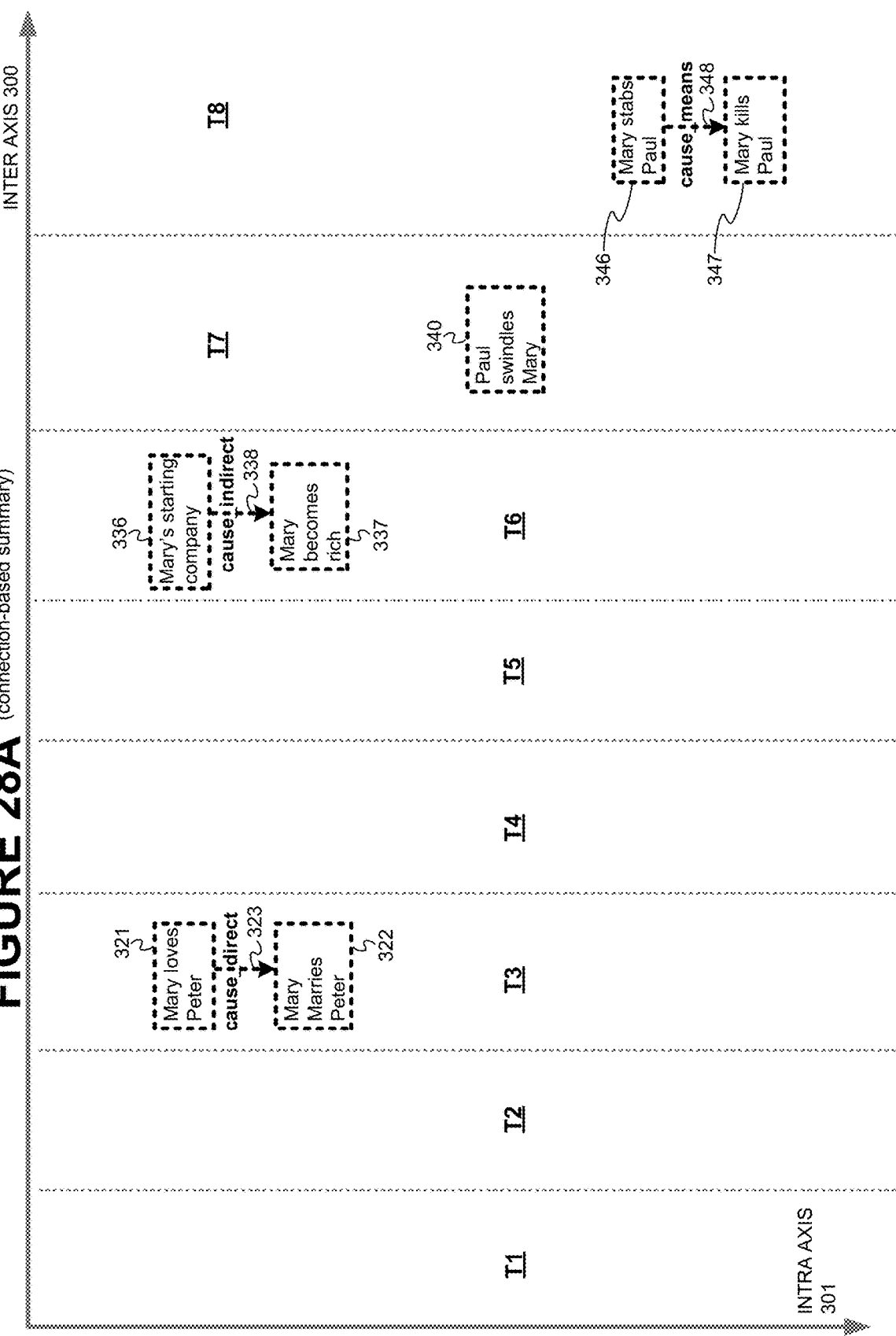

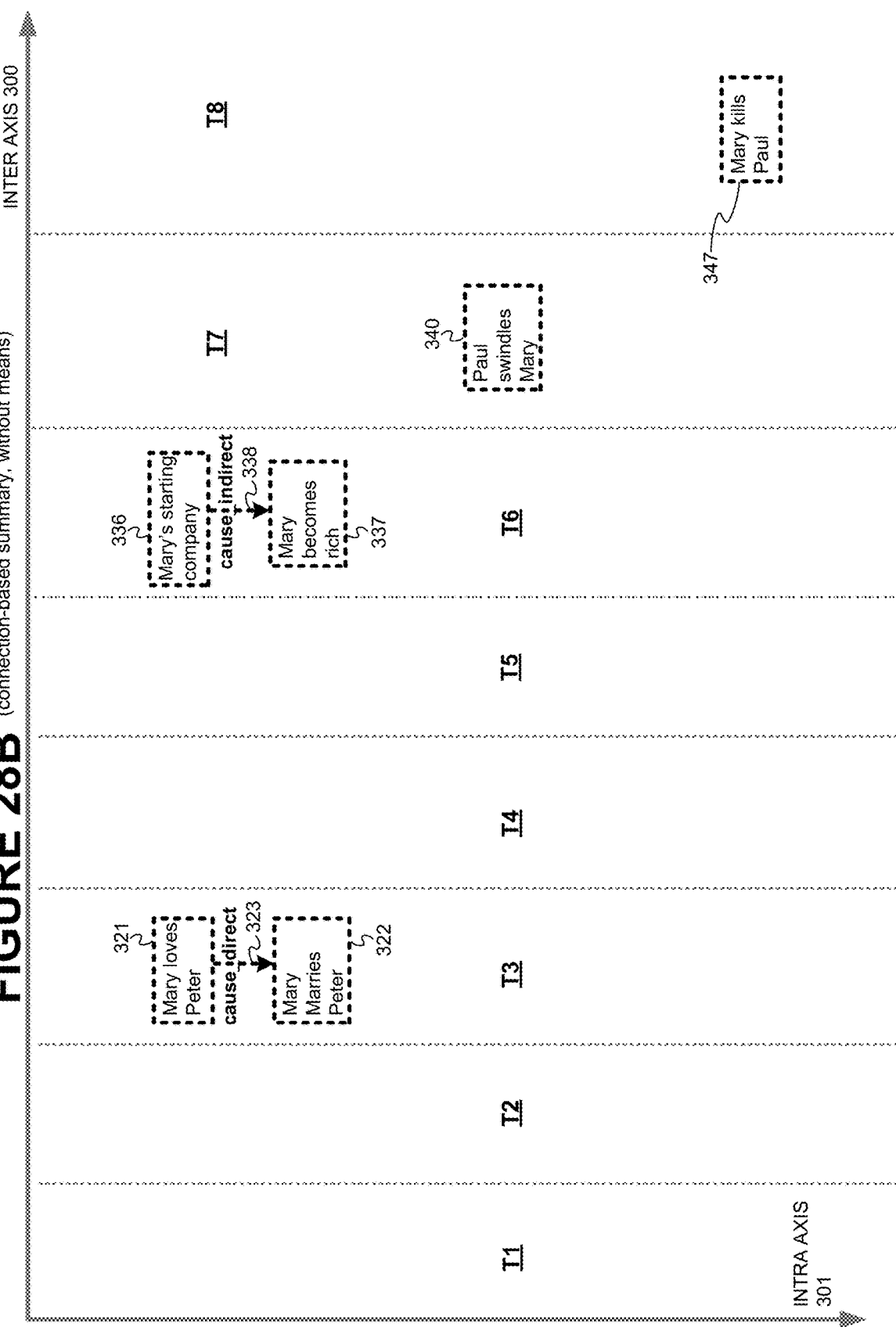
FIGURE 28B (connection-based summary, without means)

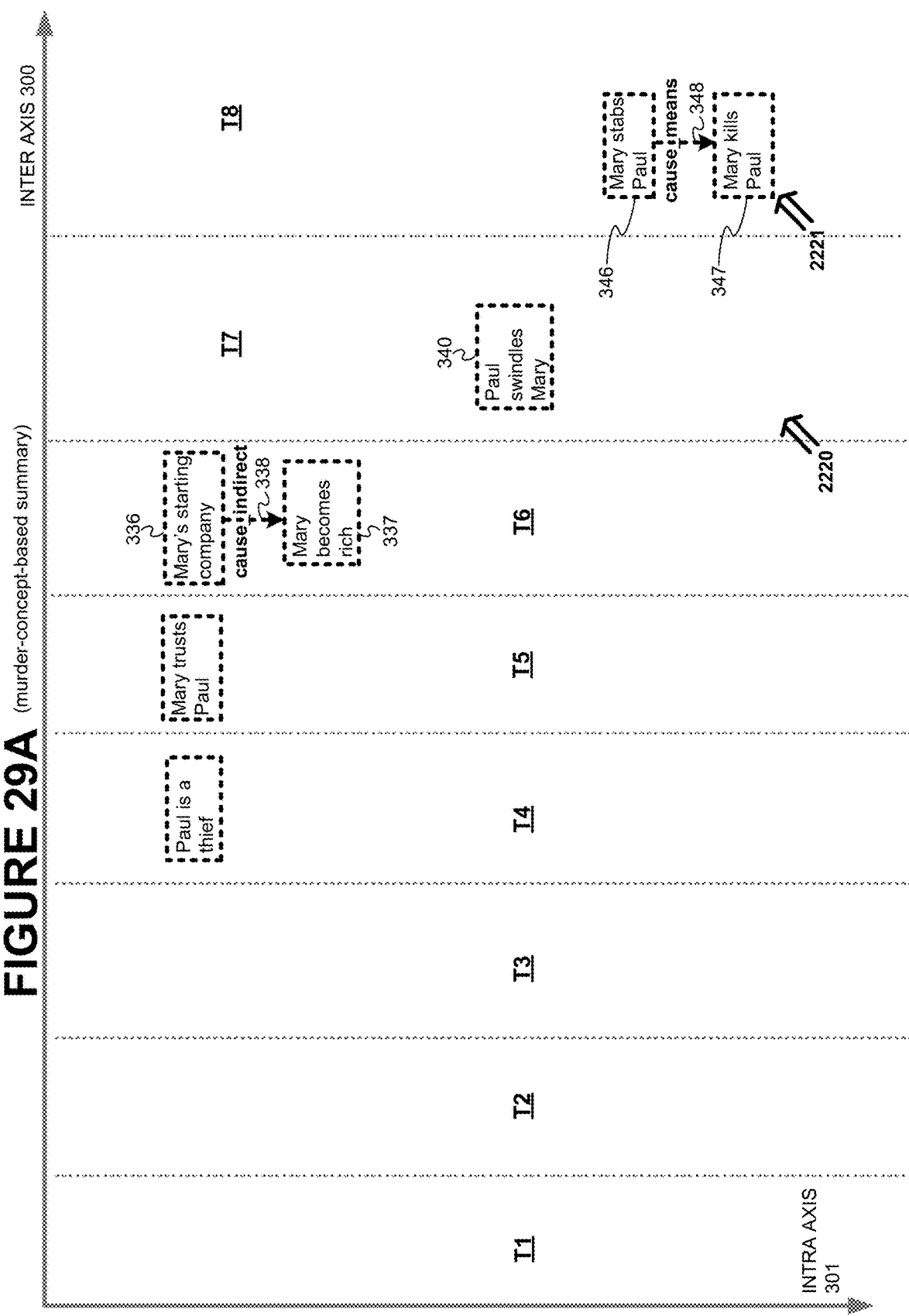
FIGURE 29A (murder-concept-based summary)

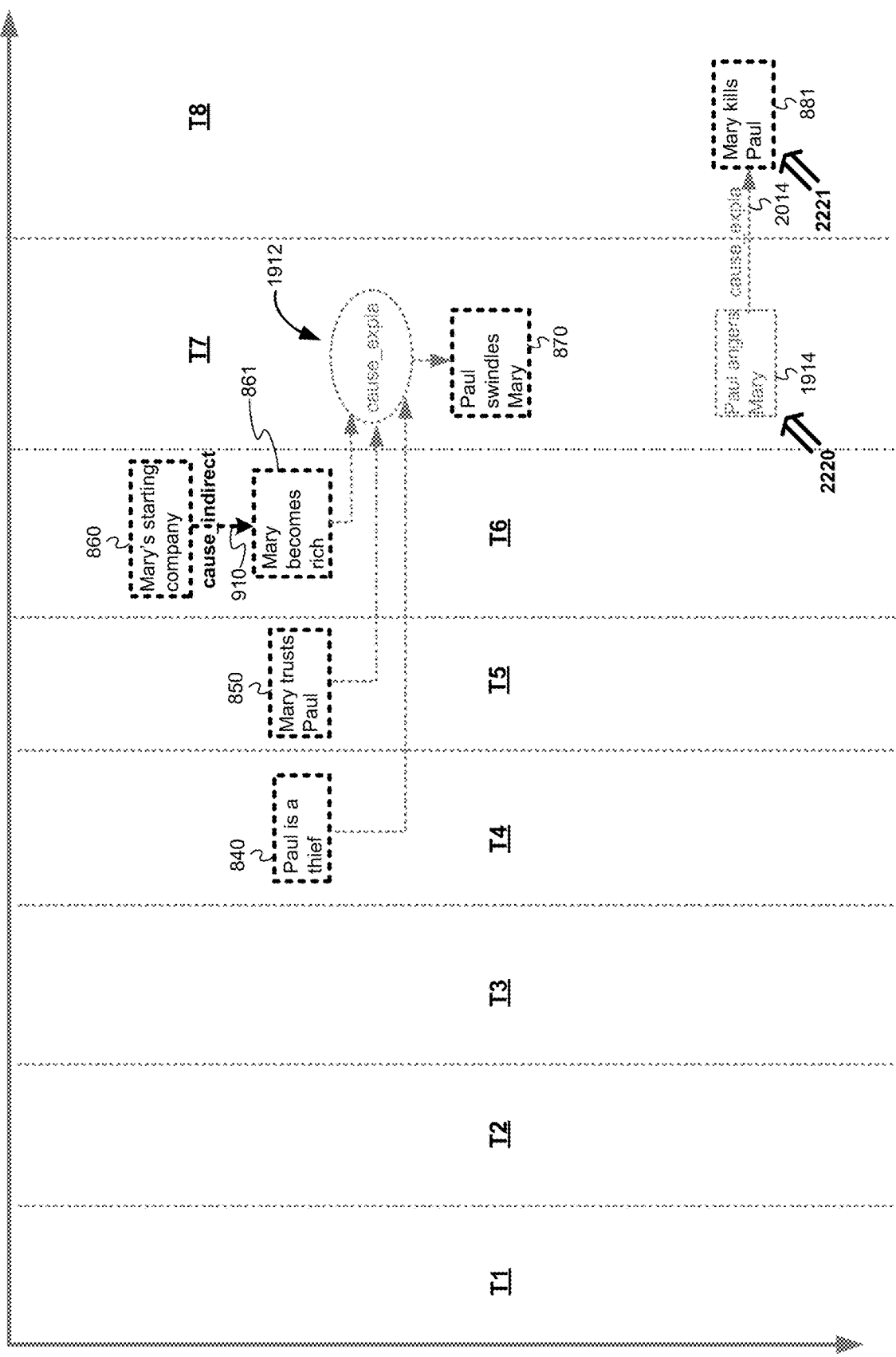
FIGURE 29B (means-type elements omitted; explanations included)

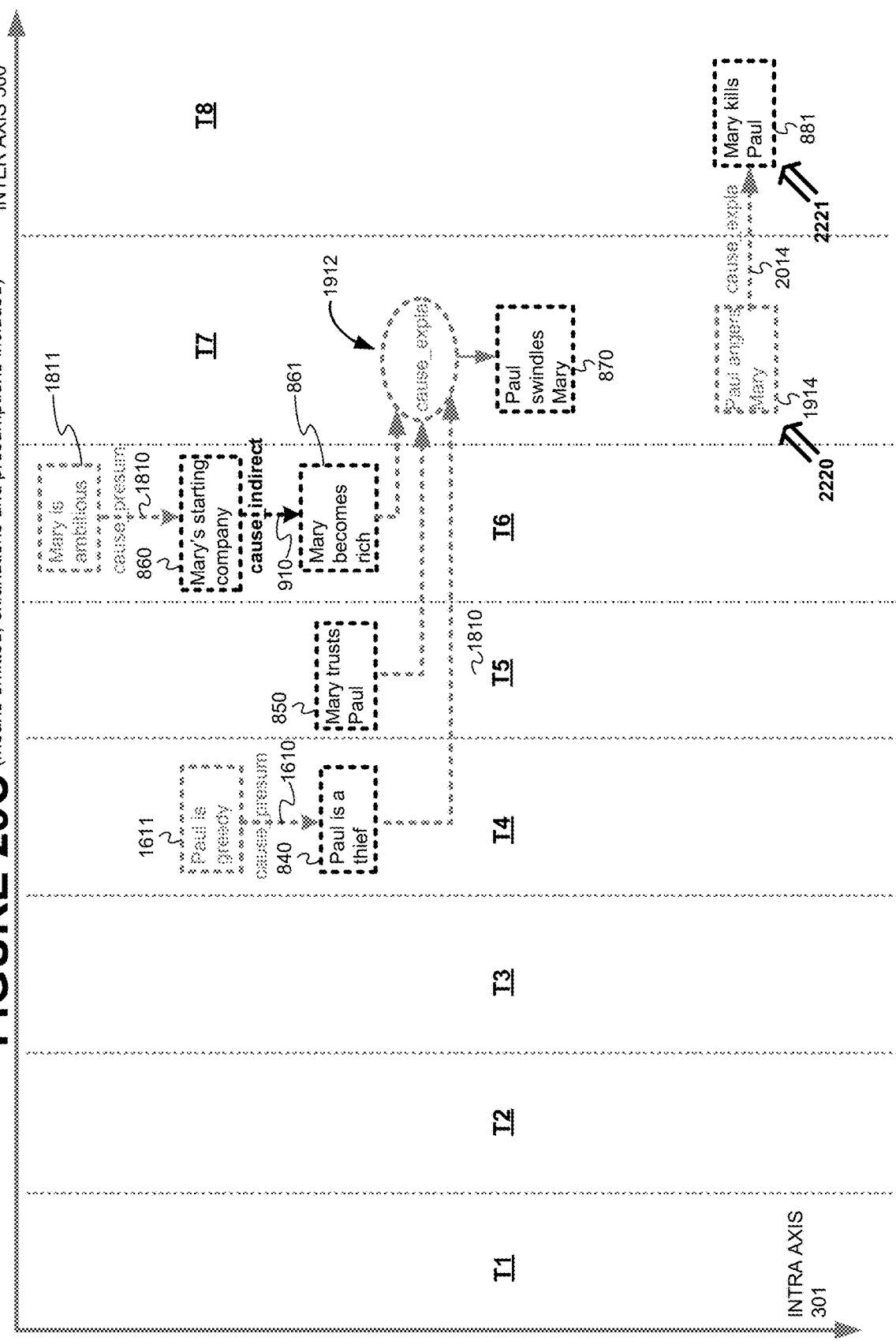

METHOD AND APPARATUS FOR SUMMARIZATION OF NATURAL LANGUAGE

As provided for under 35 U.S.C. § 119(e), this patent claims benefit of the filing date for the following U.S. provisional patent applications, herein incorporated by reference in their entirety:

"Method and Apparatus for Summarization of Natural Language," filed 2015 Aug. 9 (y/m/d), having inventor Patrick Henry Winston and App. No. 62202900; and "Method and Apparatus for Summarization of Natural Language," filed 2014 Dec. 1 (y/m/d), having inventor Patrick Henry Winston and App. No. 62086180.

App. No. 62086180 is referred to below as "the 180 application."

This invention was made with Government support under Grant No. D12AP00210 awarded by the U.S. department of Interior. The government has certain rights in the invention.

FIELD OF THE INVENTION

The present invention relates generally to processing natural language, and, more particularly, to techniques by which natural language can be summarized.

BACKGROUND OF THE INVENTION

The quantity of information expressed in natural language, and stored in computer-accessible form, has grown, and will likely continue to grow, at an exponential rate.

In almost any area of endeavor, merely gaining access, to the pertinent information, is no longer a principal issue. In its place, the more difficult problem has become being able to evaluate the accessible information, within a manageable timeframe. Accordingly, there is a great, and growing, need for automated methods that can summarize natural language information, prioritize the presentation of natural language information, or accomplish some combination of both.

While computer-based methods already exist, that provide a capacity to summarize natural language, the known methods suffer from severe limitations. For example, the following methods have been used: statistical, typical-element, and template-based, as well as methods that employ a combination of the foregoing.

A statistical method might, for example, summarize product reviews as "Acme makes a good pipe wrench," because the phrases "Acme," "pipe wrench," and "good" appear, frequently, in close proximity to each other.

A typical-element method might summarize a news item about an earthquake by looking for a number between 3 and 10, and then use that number to fill in a summary template.

Because their understanding, of the natural language to be summarized, is so shallow, such methods can be easily misled. The result is a misinterpretation of the input information, when such information would never confuse a human reader.

For example, it is clearly incorrect to summarize a review that states "only a fool would say that an Acme pipe wrench is good," as saying "Acme pipe wrenches are good," even though the word "good" appears in the same sentence as the phrases "Acme," and "pipe wrench."

Similarly, typical-element methods are easily confused. For example, if an earthquake report indicates that a building was damaged 9.5 miles from the slipping fault line, it would not be correct to summarize this report as saying "The magnitude of the earthquake was 9.5 on the Richter scale."

Accordingly, there exists a need for robust summarization methods that can consistently, and accurately, summarize, over a wide range of natural language input.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 2A presents an example input story 200.

FIG. 2B presents the same input story 200 of FIG. 2A, except each of the story's sentences is sequentially labeled FIG. 3A introduces a graphical representation of an interpretation sequence.

FIGS. 4A-4F present at least one example rule, for each category of implicit causation.

FIG. 4G depicts entity rules.

FIG. 4H depicts a censor rule.

FIGS. 5A-5D depict specifications for four example concepts.

FIGS. 7A-7B depict a generalized parentheses-based representation 700.

FIGS. 8A-8H, and 9A-9C, are re-presentations of the explicit story elements, previously presented in FIG. 3B.

FIG. 10B illustrates a parentheses-based representation of sentence 602.

FIGS. 12A-12J present an example pseudo-coded procedure, for interpretation sequence generation.

FIGS. 13A, 14A, 15A, 16A, 17A, 18A, 19A, and 20A present a step-by-step simulated execution of the pseudo-code, in a directed graph representation.

FIGS. 13B, 14B, 15B, 16B, 17B, 18B, 19B, and 20B present a step-by-step simulated execution of the pseudo-code, in the parentheses-based representation.

FIG. 21 depicts the explicit story elements, of FIG. 20A, selected for a connection-based summary.

FIG. 22A-22B depict, respectively, identification of the murder and tragic greed concepts.

FIG. 23 depicts the explicit story elements selected for a summary, based on a contra-causal search of the murder concept.

FIG. 24A depicts the same connection-based selection of explicit story elements, as is shown in FIG. 21, except story elements providing means type information are no longer selected for inclusion in the summary.

FIG. 24B depicts the same murder-concept-based selection of explicit story elements, as is shown in FIG. 23, except story elements providing means type information are no longer selected for inclusion in the summary.

FIGS. 25A-25B present a pseudo-coded procedure, for the determination of a connection-based summary.

FIG. 26 depicts an example pseudo-coded contra-causal search procedure, for the identification of a concept-based summary.

FIG. 27A depicts the effect, on the story elements included in the summary, by choosing the option to include explanatory-type causal connections.

FIG. 27B illustrates the same summary as FIG. 27A, except that presumptive-type causal connections are also included.

FIG. 28A depicts an interpretation sequence where only the story elements chosen for summarization, on the basis of the connectedness, are shown.

FIG. 28B depicts the same interpretation sequence as FIG. 28A, except means-type elements are omitted.

FIG. 29A depicts an interpretation sequence where only the story elements chosen for summarization, on the basis of the murder concept, are shown.

FIG. 29B depicts the same interpretation sequence as FIG. 29A, except means-type elements are omitted, and explanatory-type elements are included.

FIG. 29C depicts the same interpretation sequence as FIG. 29B, except presumptive-type elements are also included.

DETAILED DESCRIPTION OF PREFERRED EMBODIMENTS

Figure 1A:
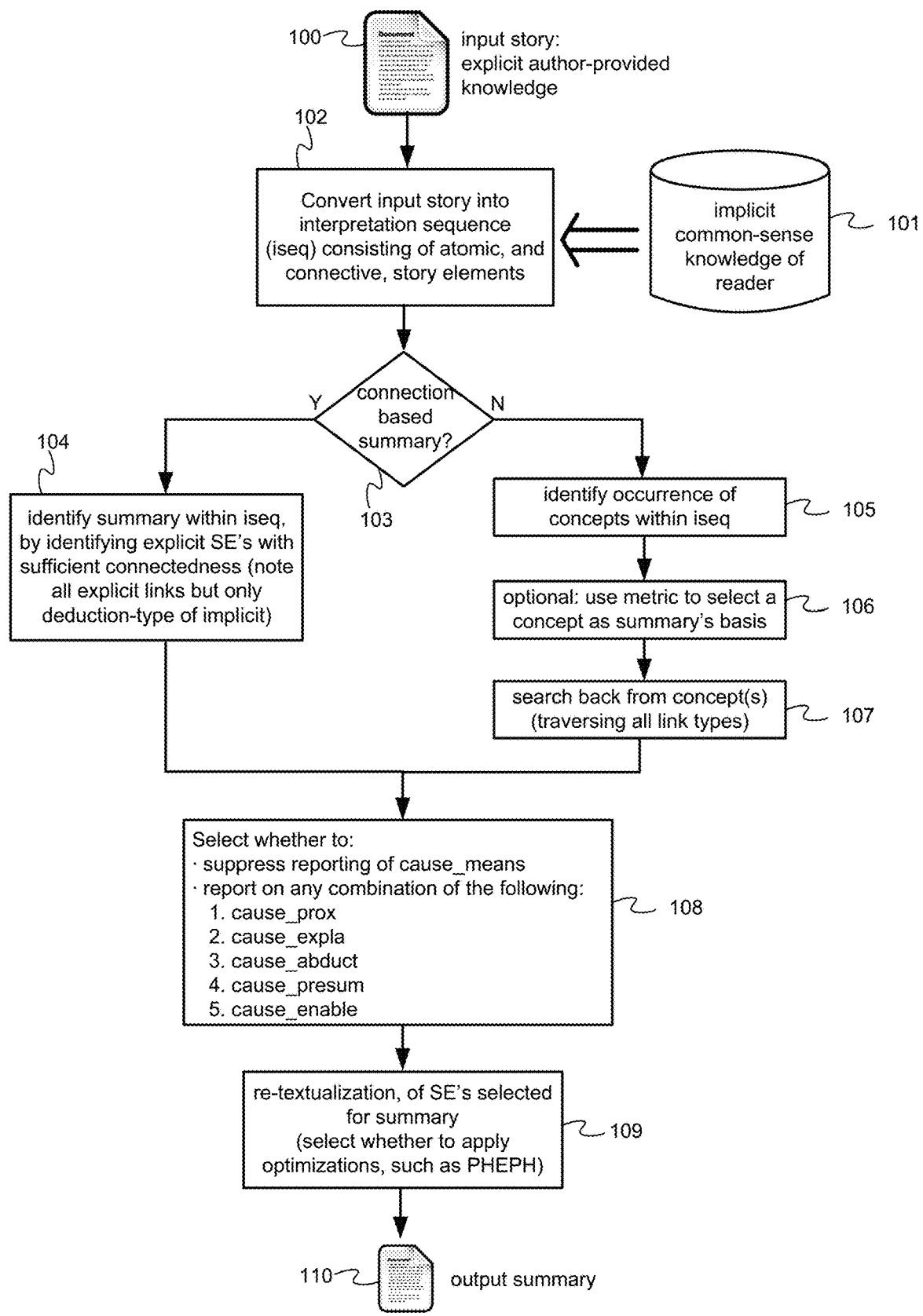
FIG. 1A presents an overview of inventive processes, for the summarization of a story through the use of a causation-based analysis.

Reference will now be made in detail to various embodiments of the invention, examples of which are illustrated in the accompanying drawings. Wherever possible, the same reference numbers will be used throughout the drawings to refer to the same or like parts.

Table of Contents to Detailed Description
1 Introduction
Interpretation Sequence
  2.1 Directed Graph Representation
    2.1.1 Explicitly Expressed Causation
      2.1.1.1 Direct causation
      2.1.1.2 Indirect causation
      2.1.1.3 Means (or "Instrumentality") causation
      2.1.1.4 Story Element Labeling
    2.1.2 Implicitly Expressed Causation
      2.1.2.1 Deductive causation
      2.1.2.2 Explanatory causation
      2.1.2.3 Proximity causation
      2.1.2.4 Abductive causation
      2.1.2.5 Presumptive causation
      2.1.2.6 Enabling causation
    2.1.3 Prioritization
    2.1.4 Censor Rules and Entity Rules
  2.2 Parentheses-based representation
    2.2.1 Introduction
    2.2.2 Representing Explicit Story Elements
    2.2.3 Representing Inference Rules
      2.2.3.1 Deductive causation
      2.2.3.2 Explanatory causation
      2.2.3.3 Proximity causation
      2.2.3.4 Abductive causation
      2.2.3.5 Presumptive causation
      2.2.3.6 Enabling causation
  2.3 Pseudo-code
  2.4 Execution of Pseudo-code
3 Selection of Explicit Story Elements
  3.1 Connection-based selection
    3.1.1 Procedure
    3.1.2 Directed Graph Representation of Story Elements
    3.1.3 Parenthesis-based Representation of Story Elements
  3.2 Concept-based selection
    3.2.1 Concept Identification
      3.2.1.1 Directed Graph Representation
      3.2.1.2 Parenthesis-Based Representation
    3.2.2 Metrics
    3.2.3 Contra-Causal Search
4 Reporting Options
  4.1 Means-Type Causation
  4.2 Implicit Causation
5 Retextualization
  5.1 Without Options Applicable
    5.1.1 Connection-based Summary
    5.1.2 Concept-based Summary
  5.2 Options Applied
    5.2.1 Without Means
    5.2.2 Without Means, With Explanations
    5.2.3 Without Means, With Explanations and Presumptions
    5.2.4 Phraseology
6 Additional Information
  6.1 Thematic-Role Frames
  6.2 Story Element Count
  6.3 Literal versus Meta Entities
  6.4 The "B" FIGS.
  6.5 Use of White Space
7 Glossary of Selected Terms
8 Computing Equipment
9 Java Implementation

1 INTRODUCTION

The question, of what makes a corpus of natural language qualify as a "story," can have a wide variety of answers, depending upon the situation. As used herein, the term "story" is meant to apply in a basic and fundamental way. For example, for purposes of the present invention, the following factors are irrelevant:

The particular natural language (e.g., English, Chinese, Russian, or Spanish), in which the story is written. For purposes of example, English is used herein.

Whether the story is fictional or factual.

The particular topic addressed.

The particular style in which a corpus of natural language is written, such as narrative, expository, stream-of-consciousness, or scientific.

The present invention can treat the meaning of "story" broadly because it is the result of research into the basic nature of human intelligence, and how it can be distinguished, from the intelligence exhibited by other species. For example, even the most advanced non-human primates (e.g., the chimpanzee), are not believed capable of creating or understanding stories.

For purposes of the present invention, any corpus of natural language, no matter how large or small, can fit the definition of story, as used herein, provided:

I. It is sufficiently cohesive, such that it can be regarded as a single work (or account), from the perspective of at least one topic; and II. It sufficiently develops a topic, such that the topic's presentation includes the use of at least one time-series of events, a time-series comprising two or more events.

A broadly-applicable basis, for determining whether a work of natural language includes a time-series, is whether it expresses at least one instance of causation (regardless of the type of causation). In addition to utilizing causation as the basis for distinguishing the story from the non-story, the present invention is further based upon a realization that causation can also serve as an extremely effective tool for story summarization.

While many types of summaries can be prepared, and for many reasons, a useful definition of a summary, focused upon herein, is as follows: it is a transformation of an input story, which allows a reader to acquire the more important knowledge, contained within that input story, with less time, less effort, or both.

In general, we will use the term "input story," to refer to the story that is to be subjected to a summarization process. For purposes of illustration, a very simple input story is focused upon herein. It is presented in FIG. 2A as input story 200. While simple, input story 200 is sufficient to illustrate most of the capabilities of the present invention. Once the techniques of the present invention have been presented, one can readily appreciate how such techniques can be applied, to an input story of far greater size.

FIG. 2B presents the same input story 200 of FIG. 2A, except each of the story's eight sentences is sequentially labeled, and begins on a new line.

Even for a very simple story, like input story 200, the summarization task can seem extremely complex, and, quite likely, beyond the capacity of current computing technology. Three characters are involved in story 200, with a variety of different attributes and relationships ascribed to each. In addition to the explicit knowledge, that the author has chosen to directly express, there is, of course, also the implicit knowledge communicated by story 200.

The process of reading a story is, to at least some extent, inherently sequential. At least for a story a reader has not seen before, achieving an understanding of it requires a careful, and time-consuming, sentence-by-sentence consideration of its contents. With each additional statement read, an experienced reader will invariably ask himself/herself at least the following questions:

Why did the author just make the explicit statement that I just read? For example, one of the first sentences in story 100 is "Peter is poor." An ordinary human reader is likely to ask, "Why is the author telling me this about Peter?" Certainly, a human reader will begin to think that the remainder of the story, regardless of what else it may address, will likely include wealth as a significant issue.

Why did the author place the explicit statements of the story in the particular order he/she did? For example, the sentence immediately following "Paul is a thief" is "Mary trusts Paul." This juxtaposition (the evil of thievery, immediately followed by the nobility of trusting) suggests, of course, a potential for conflict, which is likely to be a significant aspect of the story.

Why didn't the author include a particular statement, explicitly in the story? For example, we read that, in the end, Mary kills Paul, and that Mary accomplishes the killing by stabbing Paul. Since the killing of another person is an extraordinary action to undertake, a reader will naturally seek an explanation, for why Mary did this. Unfortunately, for the reader of this particular story, no explicit statement, of why Mary killed Paul, is provided. The reader is therefore forced to "read between the lines," and to try to infer, one or more potential reasons.

In general, one can expect the type of understanding any one individual achieves, when reading an input story, to vary based upon such factors as: culture, religion, ethnicity, education, personal experience, and even genetically-based predispositions.

Herein, however, the focus is on modeling the story understanding competence of an average person. This kind of understanding is objective, where objective in this context means that an understanding can be expected (at least within a certain culture) to be included in essentially all understandings of an input story.

An overview of inventive processes, for the summarization of a story through the use of a causation-based analysis, is presented in FIG. 1A. Each of the steps of FIG. 1A is now discussed in a following section.

2 INTERPRETATION SEQUENCE

As can be seen in FIG. 1A, the main inputs to the summarization process are the following:

Explicit knowledge, provided in the form of the input story, from the author (labeled 100 in FIG. 1A).

Implicit knowledge, expected from an average reader of the story (labeled 101 in FIG. 1A).

These two types of knowledge are processed, in order to produce a representation of the story's semantics, referred to herein as an "interpretation sequence," or "iseq," (see step 102). It is referred to as a "sequence," because, as a default, the ordering of its semantic representations follows the ordering of sentences, by the author, in the input story. Each constituent semantic representation, of which an interpretation sequence is constructed, is called a "story element." Story elements are created, and organized, in a way that is intended to be useful to a summarization process. Story elements can be divided into three main types:

Atomic: Has no specific structure (e.g., has no data structure) dedicated to the representation of causation. For this reason, it has an internal structure that is, for purposes of summarization, essentially irrelevant. Many types of non-causation-specialized semantic representation have been developed, over the years, in the fields of Artificial Intelligence, Natural Language Processing, and Computational Linguistics. For purposes of the present invention, the choice, of non-causation-specialized semantic representation, is irrelevant. An example representation is presented herein, that is based upon thematic-role frames (a definition of thematic-role frames is presented below, in the "Additional Information" section 6).

Connective: represents a connection (or linkage), between two or more story elements. The types of linkages addressed herein are of two main subtypes:

Conjunctive: represents a logical AND, of two or more story elements.

Causal: represents a type of causation, between one or more story elements identified as antecedents, and one or more story elements identified as consequents.

Compound: the result of combining two or more atomic story elements, as operands of a connective story element. A compound story element can itself be used as an operand, for a higher level connective story element. Thus, story elements can be recursively composed, to form compound story elements of any desired complexity level. Conversely, a compound story element can be recursively decomposed, according to its connective story elements, until all atomic story elements are identified.

In general, unless it has been specifically stated, the use of the term "story element" herein should be understood as referring to any of the three above-listed main types. Also, the parts of an interpretation sequence regarded as atomic, and the parts regarded as connective, can change, depending upon the particular type of summarization to be performed (e.g., the point of view, from which the story is analyzed).

In addition to categorizing story elements as atomic, connective, or compound, an additional and orthogonal basis, for categorization of a story element, is whether it is explicit or implicit. A story element is considered explicit, if it meets either of the two following criteria:

Its creation does not depend upon a reader-supplied causal inference rule. A causal inference rule, as defined herein, is an item of reader-supplied knowledge, which takes one or more semantic representations (e.g., story elements) as input. If triggered, the causal inference rule produces one or more story elements as output, with at least one of the output story elements specialized to the representation of causation.

If the story element does represent causation, the conclusion, that causation is present, is based upon a specific syntactic cue, of the sentence itself. Examples of such syntactic cues are discussed below.

Conversely, a story element is considered implicit, if it meets both the two following criteria:

Its creation does depend upon a reader-supplied causal inference rule.

If the story element represents causation, the conclusion, that causation is present, is based upon the presence of one or more previously-created semantic representations, and not upon a syntactic cue.

Each successive sentence of the input story is presumed, as a default, to be a forward incremental step of an implicit "story clock," by which passage of time in a story is measured. After conversion into a suitable semantic representation, each sentence of the input story is assigned to, within the interpretation sequence, a subdivision referred to herein as a "time step." If the sentence of the input story is compound, it is first divided into independent non-compound sentences. The semantic representation, of each of these non-compound sentences, is put within the same time step. While referred to as a "clock," the purpose of the story clock (as used herein) is merely to provide relative ordering, to the extent it can be determined, of the events of a story.

Figure 3A:
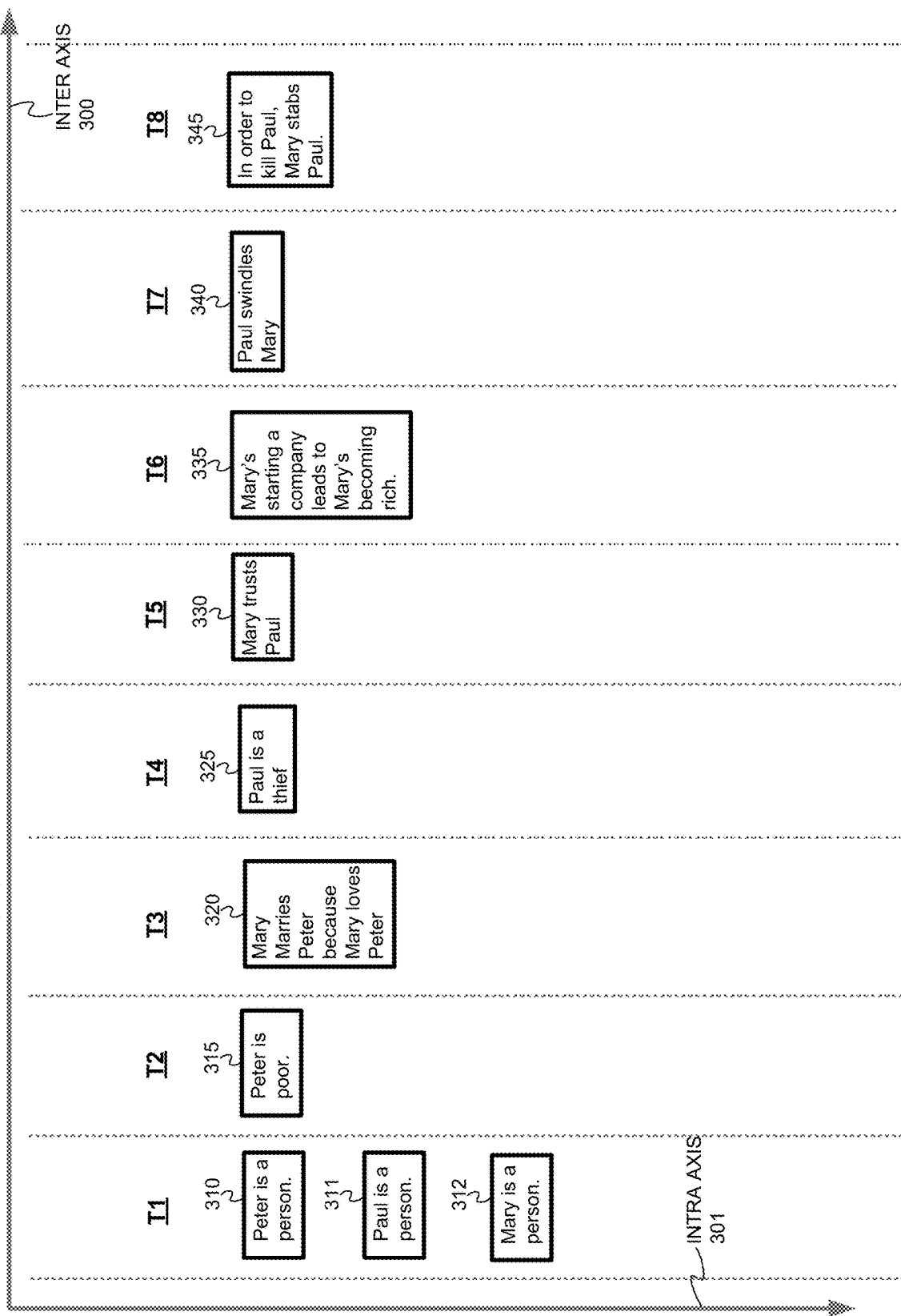
FIG. 3B is the same as FIG. 3A, except for the causation-specialized representation.
FIGS. 3C-3K represent example application, of the six types of inference rules.

FIG. 3A introduces a graphical representation of an interpretation sequence. It represents input story 200. For purposes of simplicity, FIG. 3A does not depict any story elements, with respect to input story 200, as being connective or compound. In FIG. 3A, each non-compound sentence of the input story is represented by a single box (or node), the internal structure of which is undefined. These boxes are numbered: 310, 311, 312, 315, 320, 325, 330, 335, 340, and 345. As can be seen, the interpretation sequence of FIG. 3A comprises two axes: an "INTER" axis 300 (short for INTER-sentence), and an "INTRA" axis 301 (short for INTRA-sentence). The plane, defined by these two axes, is divided, along the INTER axis, into 8 separate time steps, labeled T1 to T8. Each of sentences 1 to 8, of FIG. 2B, corresponds to, respectively, a time step of T1 to T8. Within each time step of FIG. 3A, each box (or, equivalently, each node) is intended to be a semantic representation, of a corresponding non-compound sentence, in FIG. 2B.

For example, because sentence 1 of FIG. 2B is a compound sentence, it is first divided into three non-compound sentences. Each of these non-compound sentences is then represented as a separate box in time step T1 (these boxes are labeled 310, 311, and 312). All other sentences of story 200 being non-compound, each is represented by a single box, in time steps T2 to T8. It is important to note that while each box is labeled with the same text of its corresponding sentence in the input story 200, each box is actually a semantic representation of its corresponding sentence.

Organization of story elements, along the INTER axis, is only a partial ordering, with regard to time, since story elements of a same time step are regarded as having, with respect to each other, no meaningful temporal ordering. Causal ordering, along the INTER axis, is only present to the extent that causal links are added, that connect one or more story elements from an earlier time step to one or more story elements at a later time step.

The INTRA axis is used to represent causal sequences, to the extent they occur, within a single time step. However, relative placement of story elements, with respect to the INTRA axis, does not represent causal sequencing, unless the placement is accompanied by one or more causal links. Thus, for example, with respect to the three non-compound sentences of time step T1 (see FIG. 3A), their sequential placement, along the INTRA axis, is only for graphical convenience (since there are no causal links between them).

In the following two subsections, two different approaches, to representing story elements that include causal links, are presented:

The directed graph approach of section 2.1.
The parentheses-based representation of section 2.2.

With these two representations established, section 2.3 presents a pseudo-coded procedure, for generating an example interpretation sequence from input story 200. Finally (with regard to a presentation of step 102 of FIG. 1A) in section 2.4, a step-by-step simulated execution, of the pseudo-code of section 2.3, is presented. This simulated execution is depicted using both the directed graph and parentheses-based representations.

2.1 Directed Graph Representation 2.1.1 Explicitly Expressed Causation

Having presented an example interpretation sequence, in its most basic form in FIG. 3A, a next level of complexity is introduced by the representation of explicit causation.

As discussed above, the identification, of an explicit category of causation, is based, to at least some extent, upon one or more syntactic cues (i.e., the text, provided by the story's author). In general, the syntactic cues, necessary to support an identification, of a particular instance of explicit causation, need not all appear in one sentence. However, for purposes of simplicity of exposition, the examples of explicit causation discussed herein are based upon syntactic cues within a single sentence.

For the embodiment presented herein, at least three categories are assumed available, for categorizing the type, of an instance of explicit causation:

Direct causation,
Indirect causation, and
Means causation.

Figure 3B:
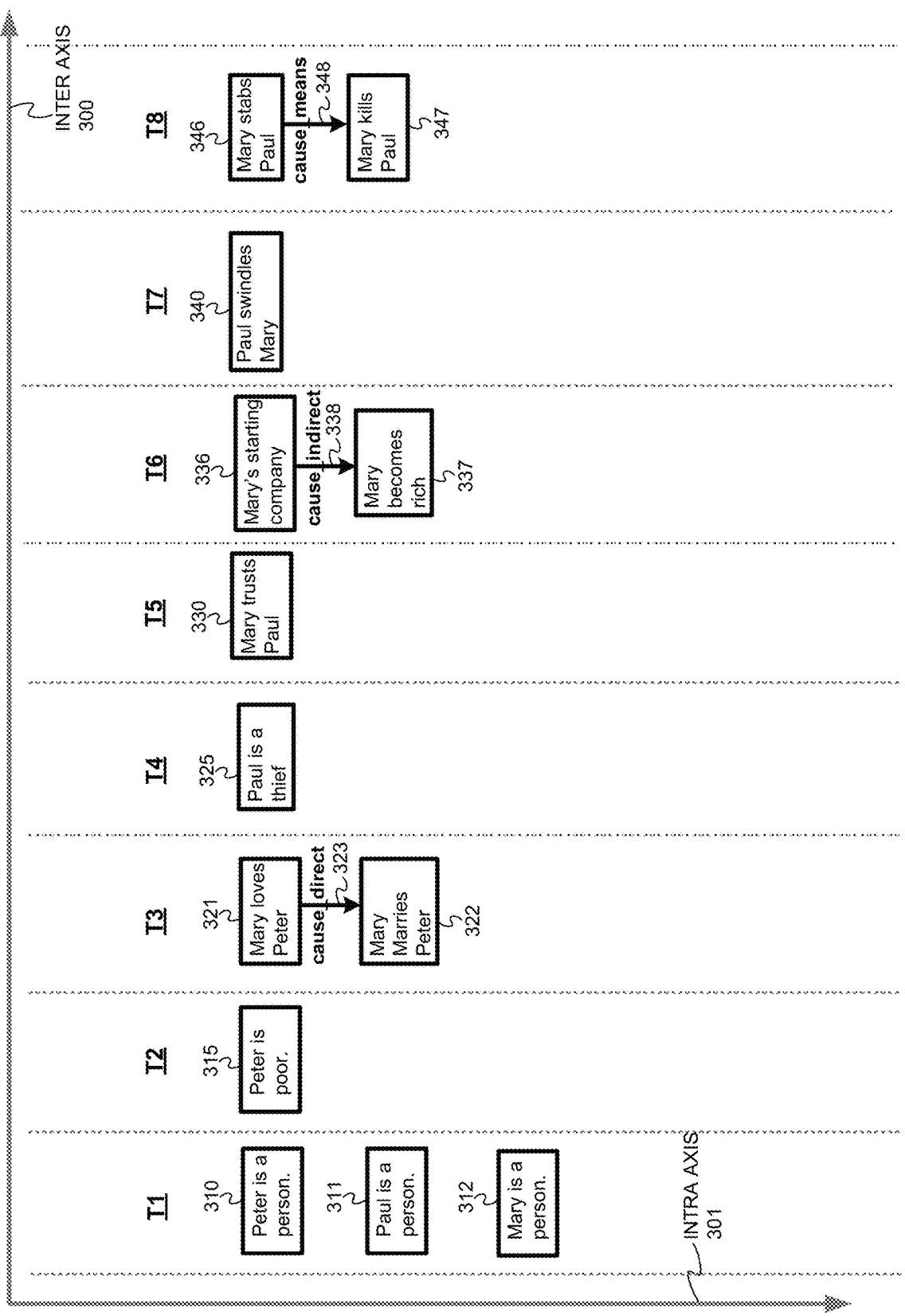

FIG. 3B is the same as FIG. 3A, except for the causation-specialized representation, through the use of directed edges, of the three instances of explicit causation. In FIG. 3A, each causal instance is represented within a single box (i.e., boxes 320, 335, and 345). When a node is used to represent each story element where causation is (at least temporarily) irrelevant, and an edge is used to represent each causal relation, an interpretation sequence becomes a kind of directed graph. Each of the causal instances of FIG. 3B is discussed in a following sub-section, in conjunction with explaining the category of causation it represents.

2.1.1.1 Direct Causation

Represented symbolically as "cause_direct," direct causation occurs when the semantics of the sentence indicate a very close connection, between antecedent(s) and consequents(s). It communicates, to the average reader, that the reader should regard the occurrence of the consequent(s) as, at the very least, sufficiently explained by the antecedent(s).

An example syntactic cue, for an instance of direct causation, is the finding of certain subordinating conjunctions (such as "because" or "since") in a sentence. For input story 200, an example occurs in sentence 3 (see FIG. 2B). An ordinary reader of English would regard Mary's love of Peter (barring the presence of contra-indicating information) as sufficient reason, for Mary marrying Peter. In FIG. 3B, the semantic representation of time step T3 has been changed (relative to FIG. 3A), to represent the cause_direct semantics of sentence 3. In particular, the single story element 320 in FIG. 3A, has been replaced with the following three story elements: atomic story element 321, atomic story element 322, and connective story element 323.

2.1.1.2 Indirect Causation

Represented symbolically as "cause_indirect," indirect causation occurs when the semantics of a sentence indicate both the following:
  A causal connection, between the antecedent(s) and consequents(s)
  However, such causation is less-than-sufficiently explained, by the antecedent(s).
  Thus it indicates, to an average reader, that he/she should regard the occurrence of the consequent(s) as a possible outcome of the antecedent(s). However, the reader also understands, that one or more unstated events are also needed, in order that the consequent(s) occur.

An example syntactic cue, for an instance of indirect causation, is the finding of certain transitive phrasal verbs (such as "leads to" or "ends-up with"), where the verb's subject clause contains the antecedent(s), and its object clause has the consequent(s). For input story 200, an example of this occurs in sentence 6 (see FIG. 2B). An average reader of English understands that he/she should regard Mary's becoming rich as a possible result of starting a company. However, the reader also understands that this should not be regarded, on its own, as sufficient explanation. An average reader can be expected to know, for example, that many businesses are failures. In FIG. 3B, the semantic representation of time step T6 has been changed, to represent the cause_indirect semantics of sentence 6. In particular, the single story element 335 in FIG. 3A, has been replaced with the following three story elements: atomic story element 336, atomic story element 337, and connective story element 338.

2.1.1.3 Means (or "Instrumentality") Causation

Represented symbolically as "cause_means," this type of causation indicates a "how to" connection, between the antecedent(s) and consequents(s). It indicates, to the ordinary reader, that the antecedent(s) should be regarded as providing at least some information, on the instrumentalities by which the consequent(s) were (or can be) achieved.

An example syntactic cue, for an instance of instrumentality causation, is the finding of certain phrasal adverbs (such as "in order to"). For input story 200, an example of this occurs in sentence 8 (see FIG. 2B). An average reader of English would certainly have a better understanding, of the instrumentality by which Mary killed Paul, by knowing that she stabbed him (an average reader also knows that there are many other ways to kill). In FIG. 3B, the semantic representation of time step T8 has been changed, to represent the cause_means semantics of sentence 8. In particular, the single story element 345 in FIG. 3A, has been replaced with the following three story elements: atomic story element 346, atomic story element 347, and connective story element 348.

2.1.1.4 Story Element Labeling

The numeric labeling of explicit story elements, as specified by FIG. 3B, continues to apply to the corresponding explicit story elements of FIGS. 3C-3K. These numeric labels do not explicitly appear in FIGS. 3C-3K, simply for purposes of preserving graphical space, for the introduction of implicit story elements.

Regarding all the numeric labels of FIGS. 3A-3K, the same labeling continues to apply in (the "A" versions of) FIGS. 13-20. Such labeling represents the numeric labeling of the directed graph representation of input story 200, and is used consistently throughout, where reference to this directed graph representation is intended.

2.1.2 Implicitly Expressed Causation

Having covered the representation of explicit causation in an interpretation sequence (see previous section), this section introduces the representation of implicit causation. The identification of implicit causation relies upon commonsense knowledge of the reader (shown as a database 101 in FIG. 1A), and can be represented (at least in part) as a collection of rules.

Implicit causation, when recognized, either extends the semantic representation of a sentence, or creates connections between sentence-level semantic representations. The connections created can be across time steps (i.e., inter-sentence), within a time step (i.e., intra-sentence), or both.

The types of implicit causation, recognized when producing an interpretation sequence, can comprise six categories:
 1. Deductive causation (symbolic name "cause_deductive" or "cause_deduct"),
 2. Explanatory causation (symbolic name "cause_explanatory" or "cause_expla"),
 3. Proximity causation (symbolic name "cause_proximity" or "cause_prox"),
 4. Abductive causation (symbolic name "cause_abductive" or "cause_abduct"),
 5. Presumptive causation (symbolic name "cause_presumptive" or "cause_presum"), and
 6. Enabling causation (symbolic name "cause_enabling" or "cause_enable").

For each of these categories, at least one example rule is depicted in, respectively, FIGS. 4A-4F. Each of these categories is addressed in a following subsection.

All the rules of FIGS. 4A-4F share a common format, which will be introduced below, in conjunction with example rule 410 of the deductive causation category.

2.1.2.1 Deductive Causation

An instance of deductive causation is found when one or more consequents are regarded, by the average reader, as an obvious and necessary result, upon reading one or more antecedents. For example, an average reader necessarily and readily understands, upon reading a first person has killed a second person, that, among other things, the second person is dead.

FIG. 4A shows 3 example deductive rules: 410, 411, and 412. Each of these rules will be addressed in turn. In addition to adding a deductive causal link, a deductive rule can cause the addition (if not already present) of one or more consequents.

The increment of knowledge added, by a deductive rule, is small enough such that, in general, it is never useful to include its knowledge in a summary. While their results are obvious, it can still be important to include, in the interpretation sequence, the story element(s) resulting from deductive rules. This is because such story elements can play a crucial role, in determining whether other implicit rules (of any type) are triggered.

For example, deductive rules can be helpful in ensuring that, in general, form does not rule over substance. More specifically, suppose an interpretation sequence contains a story element, "se_1," with semantics very close to that which is required for the triggering of an implicit causation rule "icr_1." Despite the closeness, assume that se_1 is still not of the necessary form, in order to trigger icr_1. The fact that se_1 is expressed in a different form, should not be prevent icr_1 from being triggered. Deductive rules can bridge this gap, between the se_1 that is currently part of the interpretation sequence, and a story element, se_2, which can trigger icr_1. Application of one or more deductive rules, to se_1, can lead to the creation of an se_2, for inclusion in the interpretation sequence.

Regarding rule 410, as representative of the format of all the rules of FIGS. 4A-4F, it can be seen that rule 410 is a kind of stylized English sentence. A rule in this format differs from an actual sentence by the fact of it containing one or more "meta-entities." For rule 410, the meta-entities are "xx" and "yy." (In general, we will follow a convention, herein, of indicating a meta-entity by a twice-repeated character.) In trying to determine whether a rule is triggered, by one or more story elements, a rule-matcher tries to find a portion of the interpretation sequence that:
  matches the logical structure of the rule's trigger, and
  matches each meta-entity, by assigning, to each meta-entity, a literal entity (where what is "meta" and what is "literal" is relative).

The specification of an inference rule as a kind of stylized English sentence, is provided merely for purposes of convenience. Before any inference rule is applied to an interpretation sequence, it must first be converted into a corresponding semantic representation. In general, the semantic representation can be the same as that used for story elements, except that the literal entities in a story element are replaced by meta-entities. (See section 6 "Additional Information" for discussion of "literal" versus "meta" representations.)

Rule 410 is triggered, for example, by semantic representation 340 (the semantic representation of sentence 7 of input story 100), when a rule-matcher assigns "Paul" to xx, and "Mary" to yy. Under these assignments, the action portion of rule 410 creates a story element, representative of the semantics of Paul harming Mary (see story element 350, of time step T7, FIG. 3C). The rule action also creates a causal-link story element (see story element 351, of time step T7, FIG. 3C), of type "cause_deduct," with the Paul-swindles-Mary story element as antecedent, and the Paul-harming-Mary story element as consequent. To indicate that story elements 350 and 351 are implicit, two graphical techniques are used:
  They are drawn with thinner lines (compared to those used for explicit story elements).
  They are drawn with grey lines (compared to black lines for explicit story elements).

The format for rule 410, just discussed in the previous several paragraphs, is applicable to all the other rules of FIGS. 4A-4F.

Figure 3C:
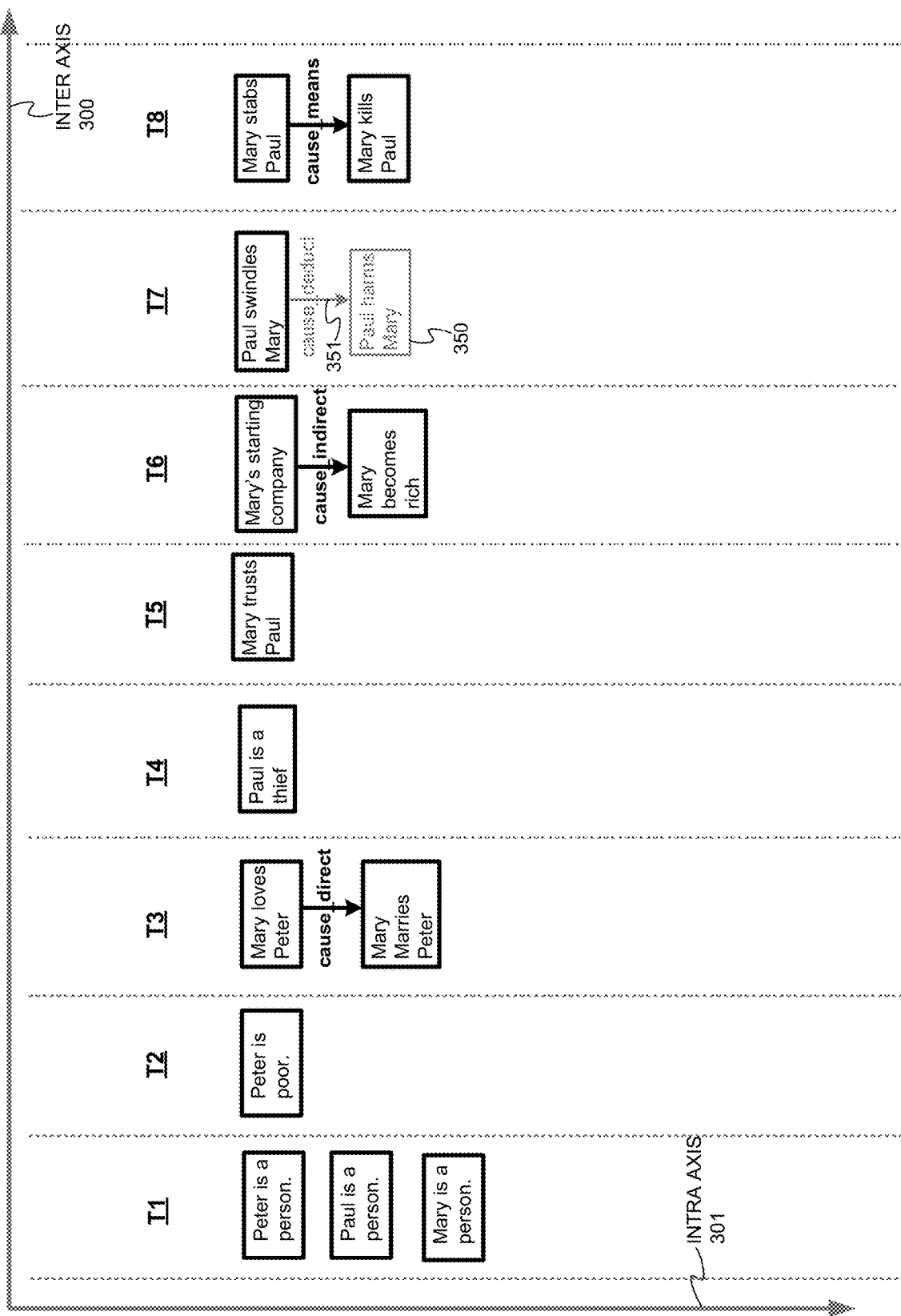
Figure 3D:
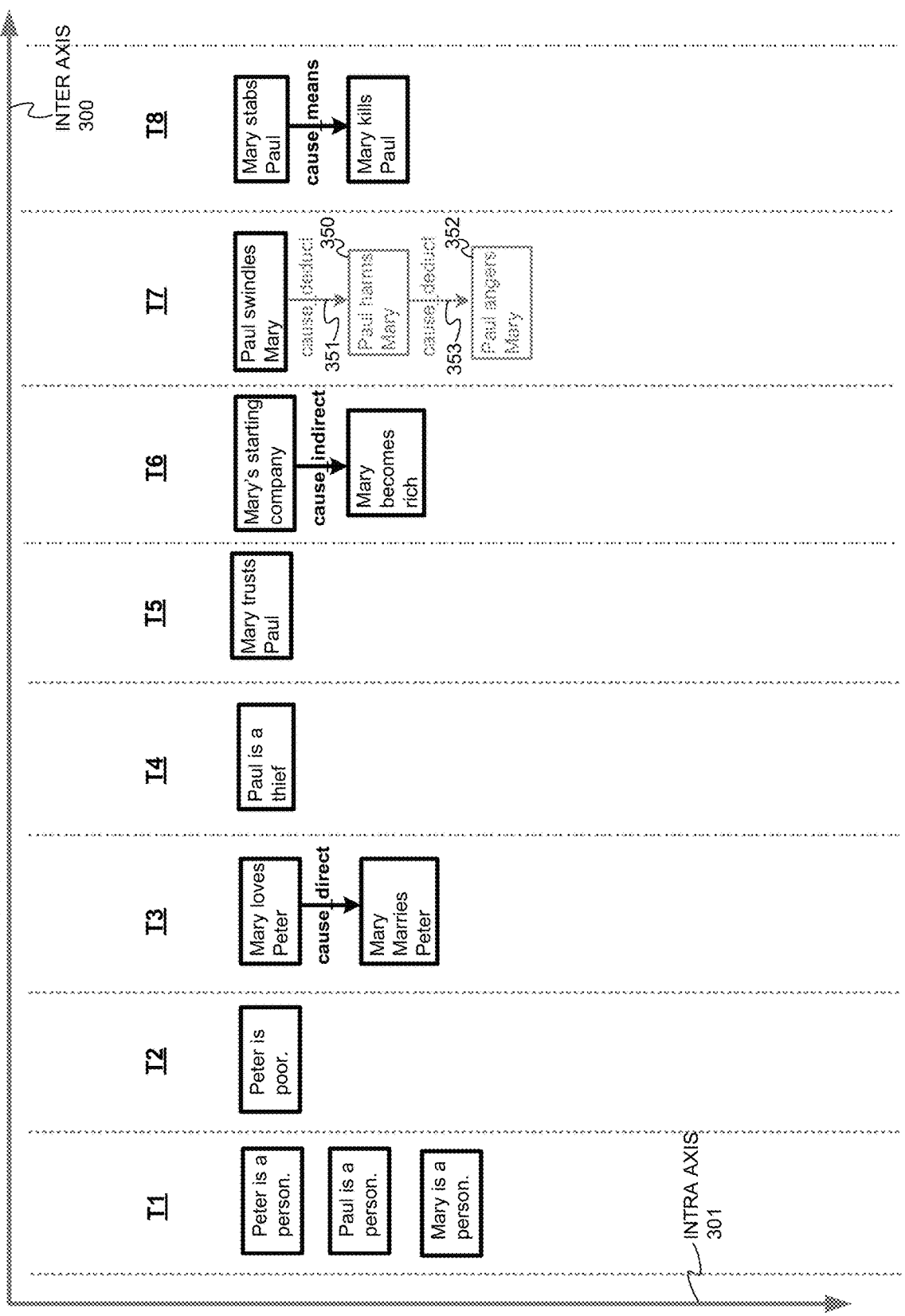

Deductive causation rules can "cascade," meaning that a story element added, as a result of applying one rule, can, for example, provide the triggering event for another deductive rule. A second example deductive rule 411 is shown in FIG. 4A. Rule 411 can be triggered by story element 350, created by the first example deductive rule 410. An example application of deductive rule 411, to the interpretation sequence of FIG. 3C, is shown in FIG. 3D. The rule's action creates story element 352, regarding Paul angering Mary, and story element 353, another causal-link story element, of type "cause_deduct," with the Paul-harms-Mary as antecedent, and the Paul-angers-Mary as consequent.

Rule 412 is the third example deductive rule. It can be triggered by the story element labeled "Mary kills Paul" (and numbered 347) of time step T8 (when a rule-matcher assigns "Mary" to xx, and "Paul" to yy). Applying rule 412, to the interpretation sequence of FIG. 3D, results in the interpretation sequence of FIG. 3E. The rule's action creates story element 354, regarding Paul becoming dead, and story element 355, a third causal-link story element, of type "cause_deduct," with Mary-kills-Paul as antecedent, and Paul-becomes-dead as consequent.

2.1.2.2 Explanatory Causation

The purpose of an explanatory causation rule, is to provide a possible explanation, for one or more story elements, that would otherwise have no explanation (or would have a weaker explanation). A distinguishing feature of an explanatory causation rule is that, if triggered, it only adds a causal connection, between one or more preexisting antecedents, and one or more preexisting consequents. An explanatory causation rule does not create antecedents or consequents.

The kind of searching embodied in an explanatory causation rule, which seeks to find at least some potential explanation for pre-existing events, is intended to model a key characteristic of human intelligence: the need to have explanations. Since explanation appears to be a defining characteristic of human intelligence, the provision of possible explanations, even if their actual correctness is not certain, is believed to be an important capability, for an effective summarization process.

Figure 3E:
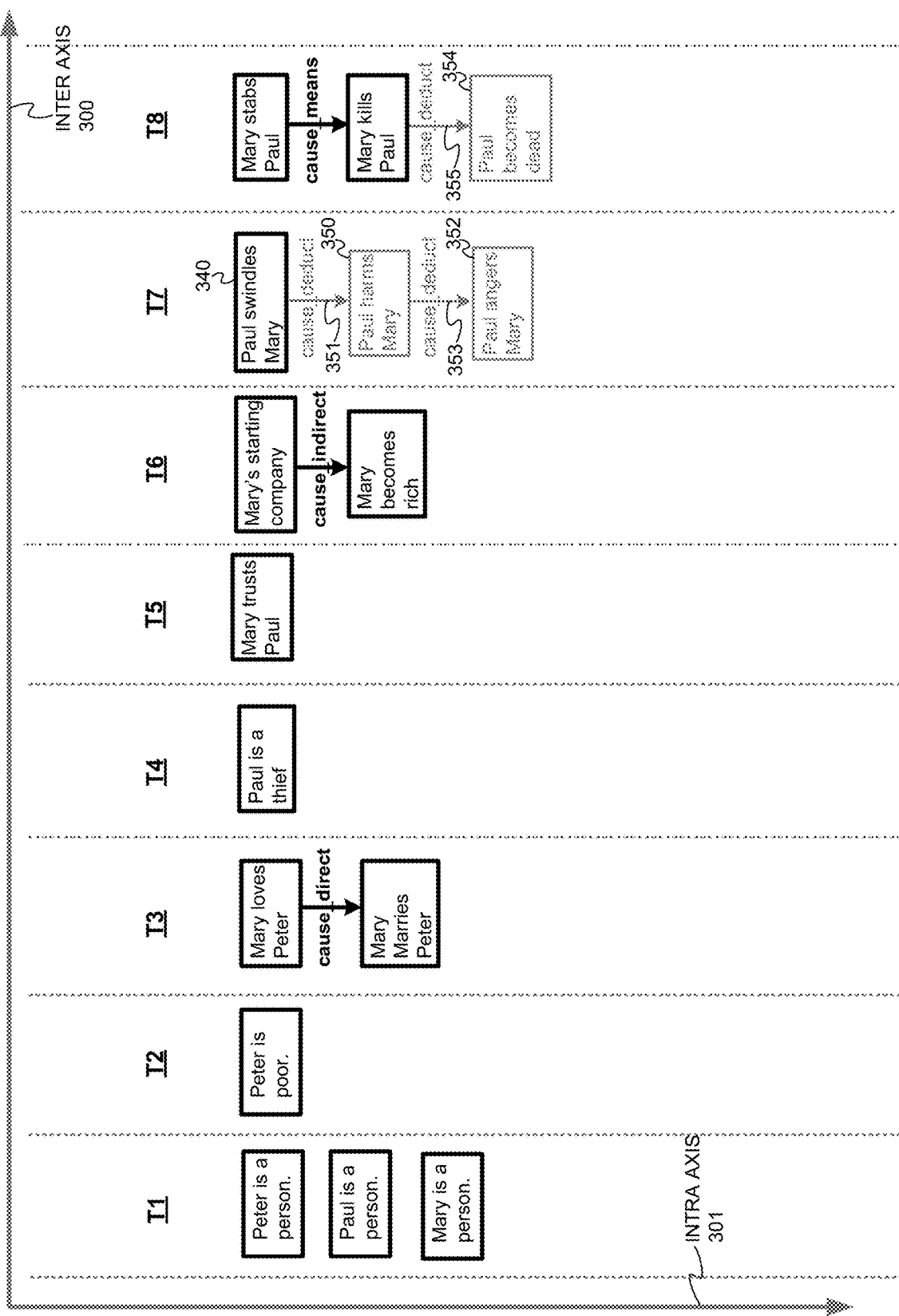
Figure 3F:
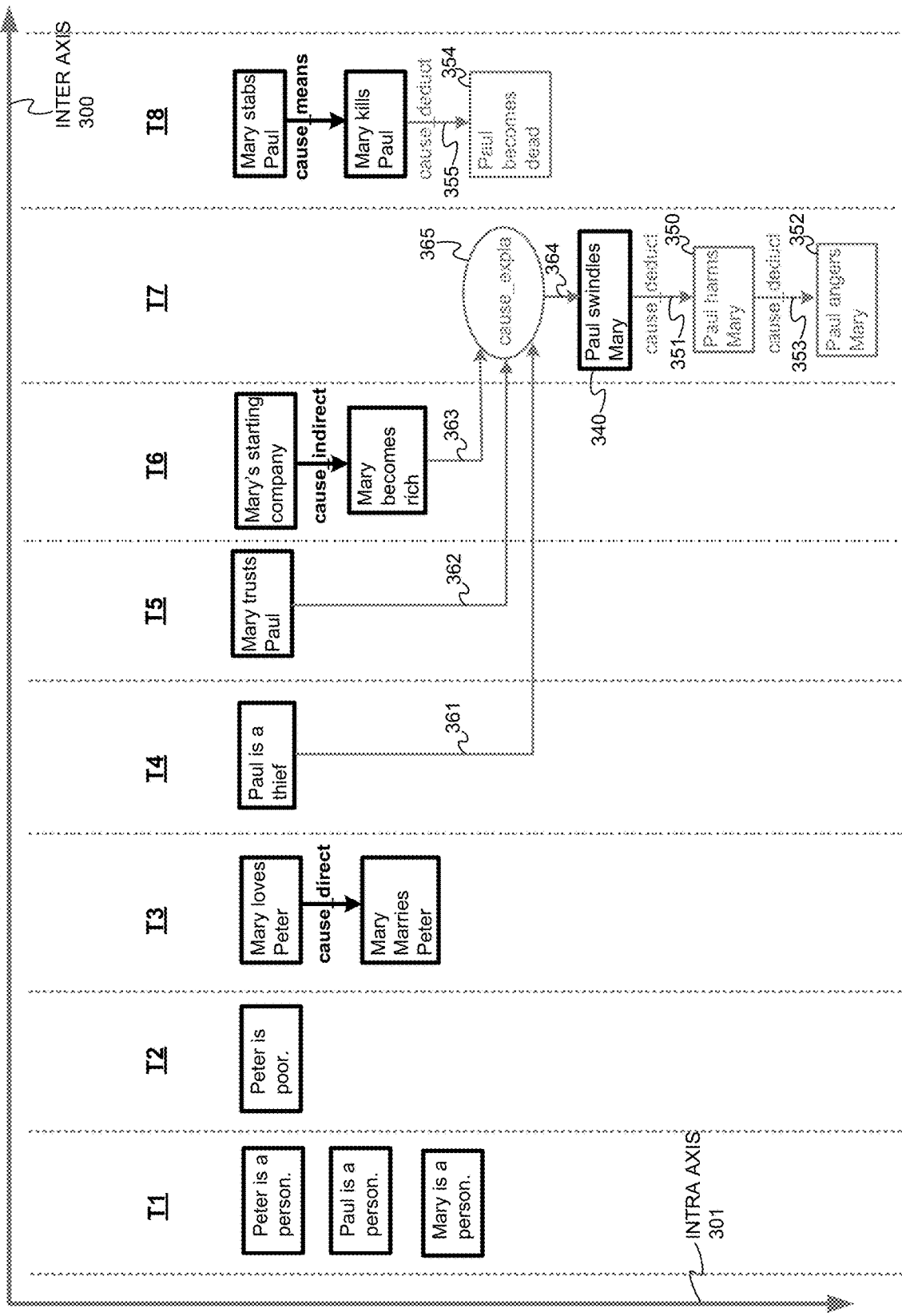

Example explanatory rules, that have applicability to input story 200, are shown in FIG. 4B. Rule 420 can provide a possible explanation for why, in sentence 7 of story 200, Paul swindles Mary. The explanation is created if meta-entity xx is bound to "Mary," and meta-entity yy is bound to "Paul." FIG. 3F shows the result of applying rule 420 to the interpretation sequence of FIG. 3E. While the previously-depicted causal links were sufficiently simple, such that each could be represented by a simple edge, FIG. 3F shows the explanation link as having a body 365, because it has three story element inputs. To ensure the explanation link is not confused with the non-causal-link story elements, explanation link 365 has an oval shape. As can be seen, through edge 361, explanation link 365 couples to "Paul is a thief" of time step T4; through edge 362, explanation link 365 couples to "Mary trusts Paul" of time step T5; and through edge 363, explanation link 365 couples to "Mary becomes rich" of time step T6. The single consequent, of explanation link 365, is coupled through edge 364, to "Paul swindles Mary."

Figure 3G:
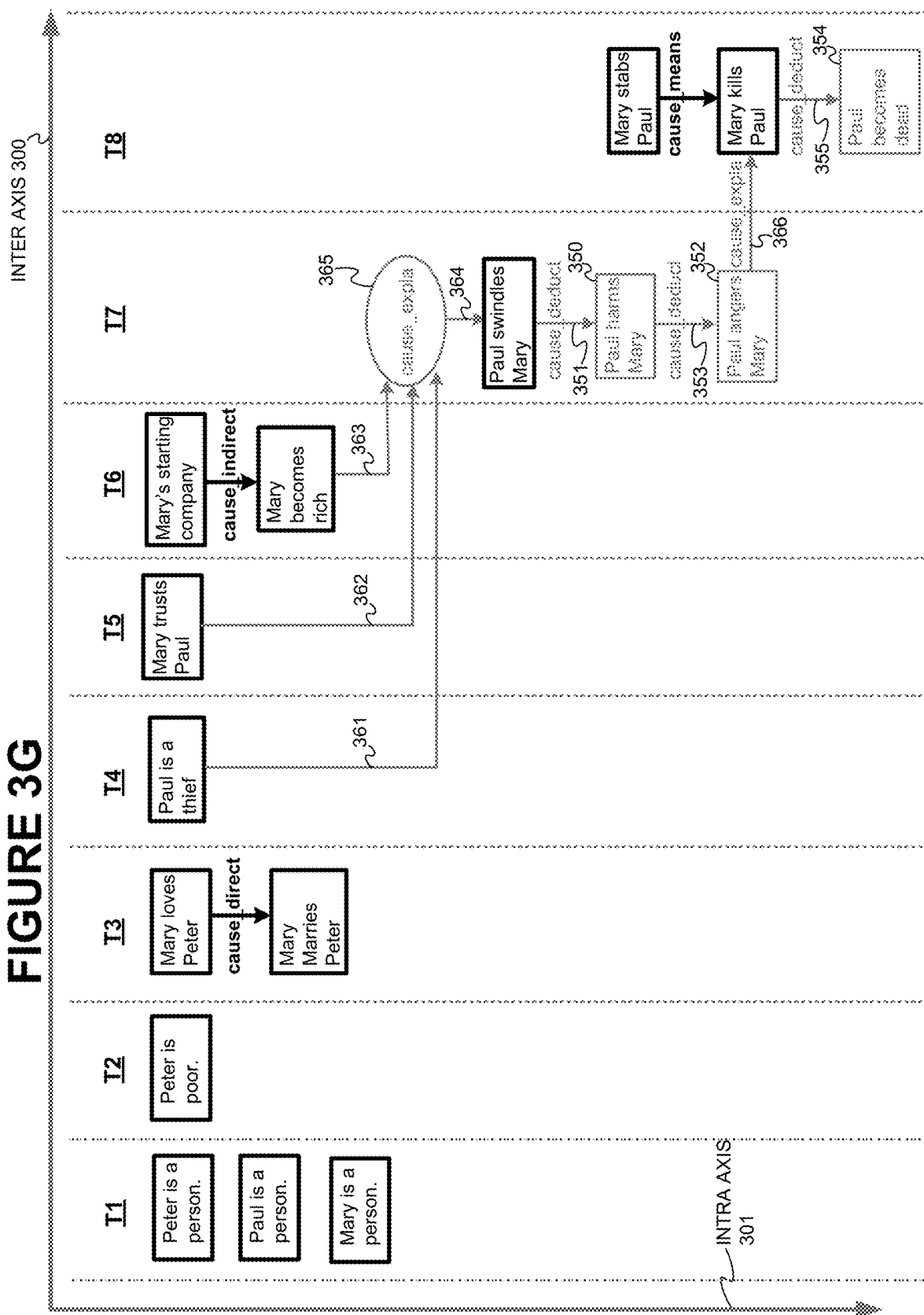

Explanatory rule 421 can be used to explain why, in sentence 8 of story 200, Mary kills Paul. FIG. 3G shows the result of applying rule 421 to the interpretation sequence of FIG. 3F. FIG. 3G shows an explanation link 366 as a simple edge, since it has only one antecedent and one consequent. As can be seen, explanation link 366 couples "Paul angers Mary" of time step T7 to "Mary kills Paul" of time step T8.

2.1.2.3 Proximity Causation

Proximity causation can be viewed as a special case of explanatory causation. Like an explanatory causation rule, the purpose of proximity causation is to provide a possible explanation, for one or more story elements, that would otherwise have no explanation (or only have, at best, a weaker explanation). Also, if triggered, a proximity causation rule only adds a causal connection, between one or more preexisting antecedents, and one or more preexisting consequents. A proximity causation rule does not create antecedents or consequents.

As the name suggests, the triggering of a proximity causation rule is based upon two or more story elements being in close proximity to each other. For example, two story elements can be regarded as being sufficiently close to each other if they are in adjacent time steps or share a same time step. An example rule 430 is depicted in FIG. 4C.

While rule 430 is not triggered by input story 200 as written, one can easily construct a modification to the story that would lead to such triggering. For example, we can imagine that Peter, because he is poor, becomes jealous of Mary's acquired wealth. The sentence "Peter became jealous" can be added, after sentence 6 and before sentence 7, of input story 200 as presented in FIG. 2B. In that case, with respect to the interpretation sequence of FIG. 3B, the following occurs. A story element, representative of Peter becoming jealous, is added. This additional story element is placed in an additional time step, inserted in-between time steps T6 and T7. Then, with story elements "Mary becomes rich" and "Peter became jealous" in immediately adjacent time steps, a triggering of rule 430 occurs. A cause_proximity link is added, going from "Mary becomes rich" to "Peter became jealous."

2.1.2.4 Abductive Causation

An instance of abductive causation is found when, as a result of reading one or more consequents, an average reader is able to conclude that, in order for the consequent(s) to occur, there must have existed one or more antecedents. For example, under (at least) western style thinking, the fact of a first person killing a second person (without countervailing indications, such as accidental killing, or self-defense) implies (among other things) that the first person is (at least temporarily) insane. FIG. 4D shows an example abductive rule for this knowledge, labeled 440. In general, abductive rules embody deeply held moral convictions, or sacred values.

Figure 3H:
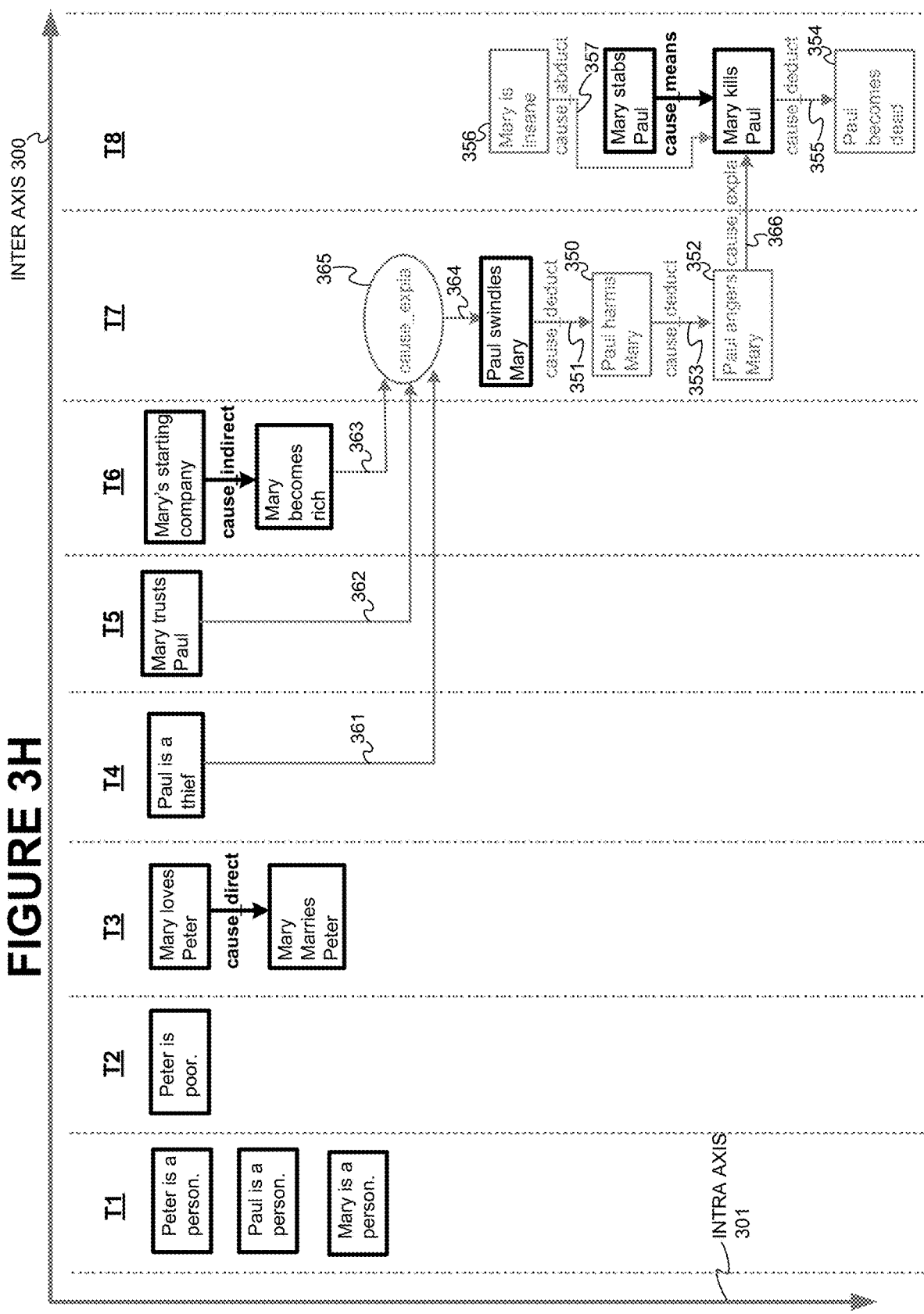

Like example deductive rule 412, rule 440 can also be triggered by the story element labeled "Mary kills Paul" (and numbered 347) of time step T8. Unlike rule 412, however, rule 440 creates a story element representative of the semantics of Mary being insane. Also unlike rule 412, rule 440 treats the story element it creates as an antecedent, to the story element that triggered it. FIG. 3H shows the result of applying rule 440 to the interpretation sequence of FIG. 3G. As can be seen, the Mary-is-insane story element 356 is connected, as an antecedent, to the Mary-kills-Paul story element, that acts as consequent. The connection is through a causal link 357 of type cause_abduct.

2.1.2.5 Presumptive Causation

Presumptive causation can be viewed as a much weaker form of abductive causation. It provides, for a group of one or more consequents, only a possible explanation, in terms of a group of one or more antecedents.

Figure 3J:
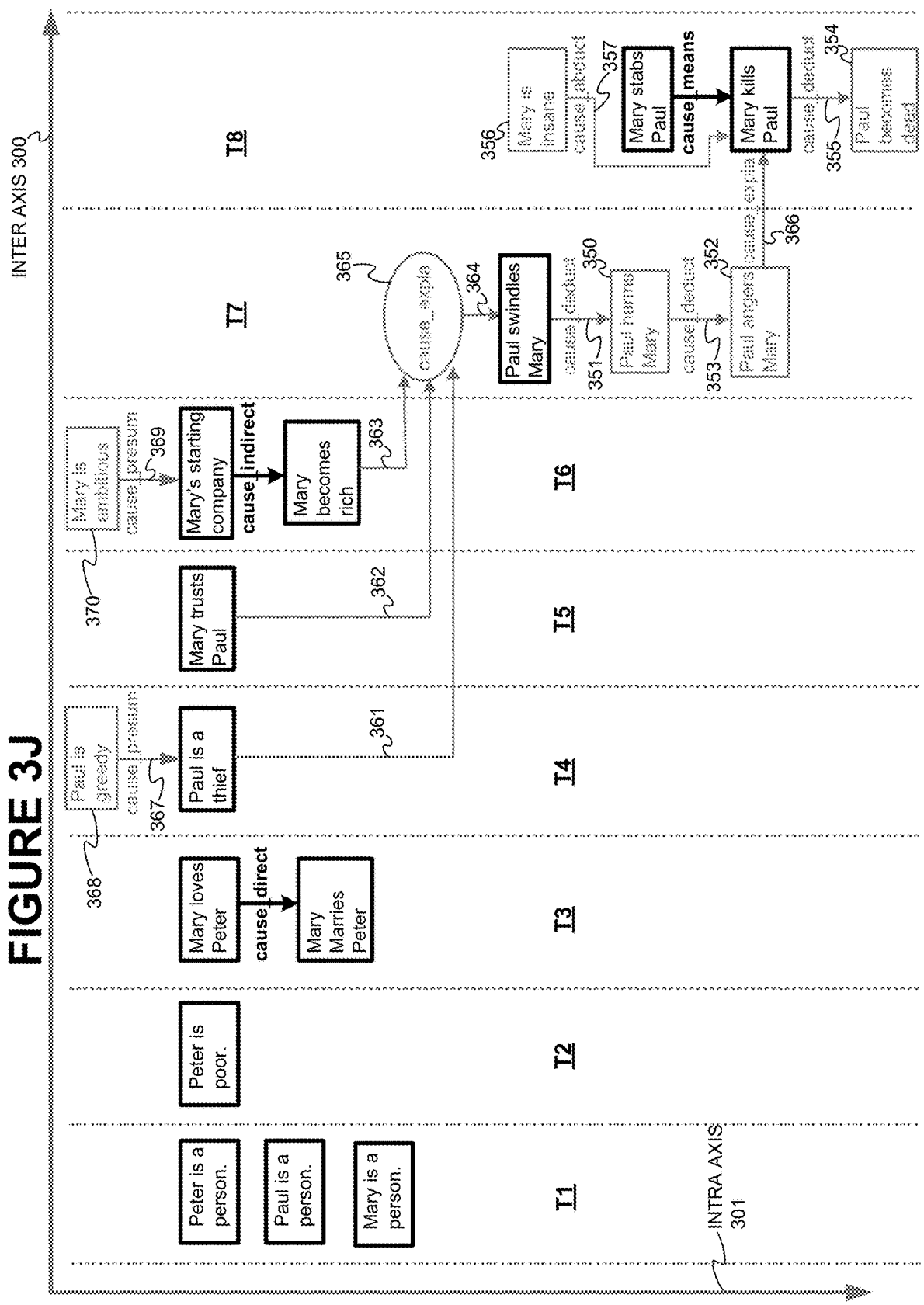

Example presumption rules 450 and 451 are shown in FIG. 4E. As can be seen in FIG. 3J, rule 451 adds that "Paul is a thief" (story element 325) is presumably due to the fact that "Paul is greedy" (story element 368). A connective-type causal link 367, of type cause_presum, is added. Similarly, rule 450 adds that "Mary's starting company" (story element 336) is presumably due to Mary being ambitious (story element 370). Once again, a connective-type causal link, of type cause_presum, is added, where this causal link is labeled 369.

2.1.2.6 Enabling Causation

Like abductive and presumptive causation, enabling causation also works contra-causally (i.e., from consequent(s) to inferred antecedent(s)). It is limited to providing "how to" information, that is, of necessity, implied by the antecedent(s). For example, example enablement rule 460 of FIG. 4F embodies the following knowledge: if a story states a first person stabs a second person, a necessary precondition is that the first person used a knife.

Figure 3K:
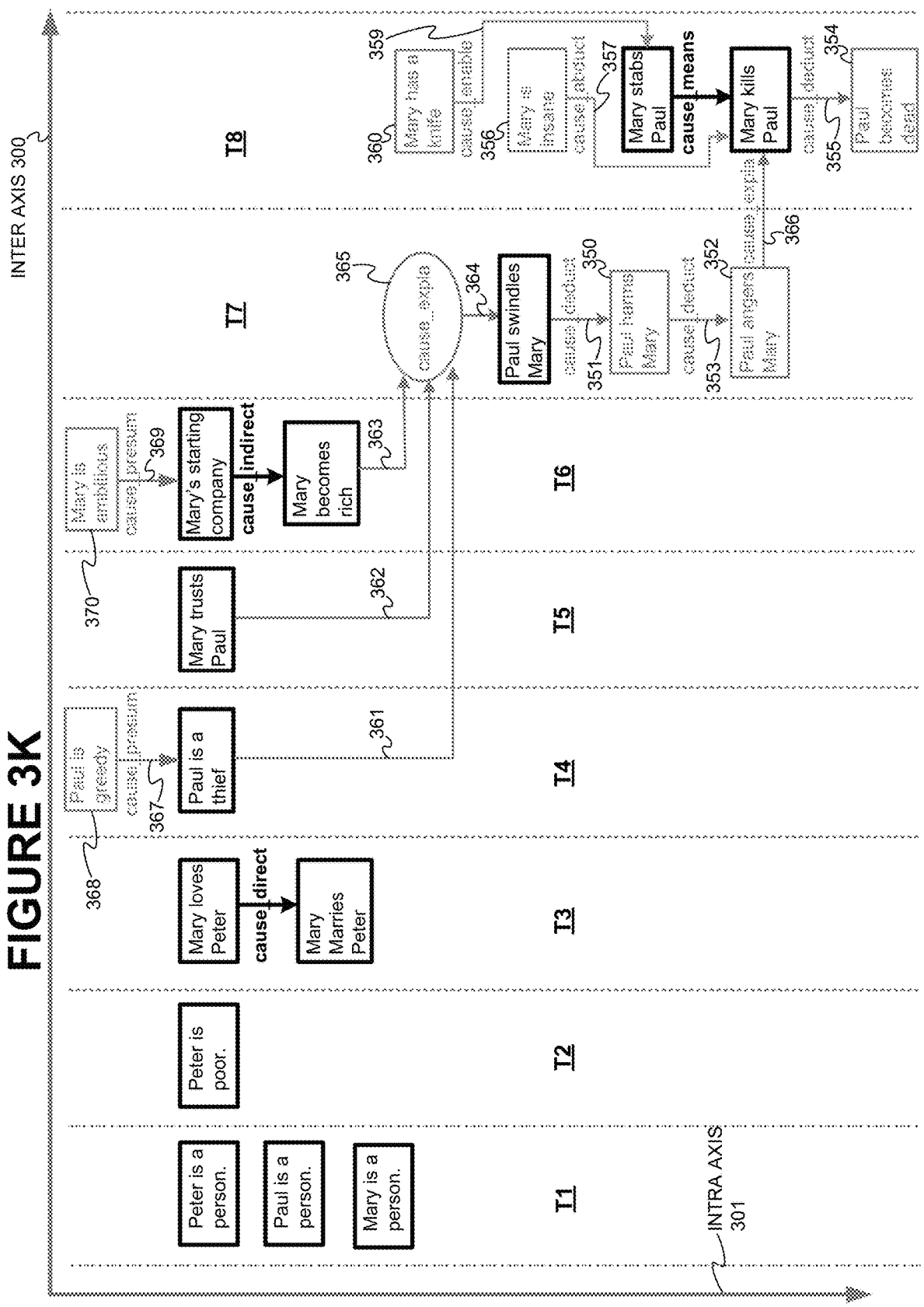

FIG. 3K shows the result of applying rule 460 to the interpretation sequence of FIG. 3J. As can be seen, the Mary-has-a-knife story element 360 is connected, as an antecedent, to the Mary-stabs-Paul story element (numbered 346), that acts as a relative consequent. The connection is through a causal link 359 of type cause_enable.

2.1.3 Prioritization

Depending upon the application (i.e., the particular type of summarization to be performed), it can be desirable to have the production of certain causal link types blocked, depending upon the link types already present in an interpretation sequence.

Figure 1B:
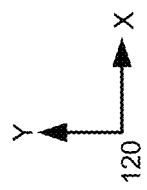
FIG. 1B presents an example prioritization scheme, in the form of a precedence (or prioritization) table 130.

FIG. 1B presents an example prioritization scheme, in the form of a precedence (or prioritization) table 130, which addresses the nine example causal types (3 explicit, 6 implicit) presented above. Table 130 of FIG. 1B is read as follows. According to axes 120, table 130 has rows along the Y axis, and columns along the X axis. Following (row, column) format, for specifying the contents of a table's cell, the cell contents located at (row_1, col_1) answers the following question:

Does the preexistence (in the interpretation sequence) of a causal link "cl_1," explaining a story element "se_1" (i.e., cl_1 has se_1 as its consequent), where cl_1 is of causal type row_1, block addition of a causal link "cl_2," that would also explain se_1, where cl_2 would be of causal type col_1?

Any cell of the table can have one of the two following values:

1. No: cl_1 does not block the addition of link cl_2.
2. Blocks: cl_1 does block the addition of link cl_2.

Additional values are possible, for those cells where the preexisting causal link, and the link for potential addition, are of a shared type (i.e., row_1=col_1):

3. Self: The first causal link found of the shared type, with se_1 as its consequent, blocks the addition of any further causal links, of the shared type, with se_1 as consequent.
4. Best: All links, of the shared type, are produced. The links are ordered, according to an appropriate metric, and the "best" one is (or the n best are) selected.

The specific example programming of table 130 is now explained, along with some alternatives.

Table 130 is programmed such that the presence of causal links, of any type, do not block the production of any type of explicit causal link. The reasoning for this choice is as follows: because the author has chosen to explicitly include the causation in his/her story, it is likely to be important in a summary.

Thus, for example, consider the question of whether to add an instance of Direct causation to an interpretation sequence (a question represented by the "Direct" column of table 130). It can be seen that the preexistence, of any other causal type, does not block the addition of the Direct causal instance (i.e., the contents of every cell, under the "Direct" column header, is "No"). The same is true of the columns under the "Indirect" and "Means" headers.

While all being explicit, however, it can be seen that Means type causation is treated differently, from Direct and Indirect, by not being included in the category called "Priority 1." The "Priority" of a causal type is intended to indicate the extent to which preexistence, of a causal type, blocks the addition of other causal types. For example, the "Means" and "Enabling" rows, of table 130, show that neither of these causal types blocks the addition of any other causal type (i.e., the contents of every cell, along the "Means" row and "Enabling" row, is "No"). In contrast, the Direct, Indirect, and Deductive causal types each block a same greatest number of other causal types. As can be seen, each of these rows blocks four causal types (i.e., Proximity, Explanatory, Abductive, and Presumptive). The lower the value of the numeric label, for the Priority group in which a causal type "ct_1" is a member, the greater the number of causal types ct_1 blocks. This is why Direct, Indirect, and Deductive belong to the lowest-numbered Priority group (i.e., "Priority 1"), while "Means" and "Enabling" belong to the highest-numbered Priority group (i.e., "Priority 4").

The Priority 4 group of causal types, more generally, is intended to cover "how to" causation. Such types of causation, even when explicitly included by the author (as in "Means"), or a necessary implication of what is already present (as in "Enabling"), are often considered too detailed for inclusion in a summary (particularly for an initial, high-level summary). Thus, as a result of table 130, Priority 4 causation is treated as a kind of parallel, and independent, track, with respect to the other causal types.

The creation of a Priority 4 causal type is never blocked by the presence of any other type of causation (i.e., a column, under any type of Priority 4 causation, contains all "Noes"). Also, a Priority 4 causal type never blocks the creation of any other type of causation (i.e., a row, for any type of Priority 4 causation, contains all "Noes"). Rather, as is discussed more below, Priority 4 causal links are treated as a kind of option, for potential selection, at a later step in the summarization process. (In accordance with step 108 of FIG. 1A, a user has the option, with respect to each Priority 4 causal type, to either include it, or not to include it, in the summary.)

In addition to Direct and Indirect causation, it can be seen that Deductive causation (a category of implicit causation) is also included in the Priority 1 group. This inclusion is for such purposes as the following: preventing the form of a semantic expression from controlling over the effect of its actual substance. For this reason, among others, it is almost always best to include, in an interpretation sequence, story elements that are a necessary and obvious implication, of story elements already in the interpretation sequence.

The most interesting and complex causal prioritizations occur between the causal types belonging to Priority 2 and Priority 3.

The prioritization of Proximity causation, as programmed by the Proximity column of table 130, can be described as follows.

The "Self" cell value, at table location (Proximity, Proximity), indicates (as introduced generally above) that a first Proximity causation rule, to explain an se_1, blocks subsequent usage of any other Proximity causation rule, for purposes of explaining the same se_1. The reasoning here is that since a cause for se_1 has already been identified, there is no particular additional advantage, at least from the point of view of summarization, to be obtained by adding additional Proximity-type causes. As was also discussed (more generally) above, other possible values for this cell are "No" (causing all Proximity type causal links to be constructed), or "Best" (causing all Proximity type causal links to be constructed, and then to have the best, according an appropriate metric, selected).

The "Blocks" contents, of cells (Direct, Proximity), (Indirect, Proximity), and (Deductive, Proximity), can be explained as follows. When considering whether to add a cl_2, as an explanation of se_1, the addition is blocked, if there is already a causal link of type Direct, Indirect, or Deductive, that explains se_1 (i.e., that treats se_1 as a consequent). The reasoning here is that since se_1 already has a stronger explanation (because it is explained by, at least, a Priority 1 causal link), there is no need to add any Priority 2 type causal explanation.

The "No" contents, of cells (Explanatory, Proximity), (Abductive, Proximity), and (Presumptive, Proximity), can be explained as follows. When considering whether to add a cl_2, as an explanation for se_1, the addition is not blocked, if there is already a causal link of type Explanatory, Abductive, or Presumptive, that treats se_1 as a consequent. That is because an Explanatory, Abductive, or Presumptive explanation, for se_1, is treated as weaker than a Proximity-type explanation.

The prioritization of Explanatory, Abductive, and Presumptive causation, as programmed by, respectively, each of the Explanatory, Abductive, and Presumptive columns, of table 130, follows similar logic to that explained just-above, for Proximity causation. The differences are just due to the fact that:

Explanatory causation is programmed to have less priority than Proximity causation, but greater priority than Abductive or Presumptive causation.

Abductive causation is treated as having less priority than Explanatory causation, but greater than Presumptive causation.

Presumptive causation is treated as having less priority than Abductive causation.

Regarding the interpretation sequence of FIG. 3K, that is the final result in the last section (section 2.1.2), after applying all the example inference rules, it was produced without consideration to prioritization table 130. In general, with a prioritization table like 130, the order in which rules are applied can produce a difference, in the interpretation sequence produced. However, for the particular example of section 2.1.2, there are not many nodes where more than one explanation is available.

Thus, even were table 130 to be applied, to the production of the interpretation sequence in section 2.1.2, there would be only difference in the interpretation sequence produced. This difference is the following: the abductive inference of FIG. 3K, that "Mary is insane," would be blocked by the higher-priority explanatory inference, that "Mary kills Paul" probably because "Paul angers Mary."

2.1.4 Censor Rules and Entity Rules

In addition to the six types of rules discussed above (examples of which were shown in FIGS. 4A-4F), for the six example types of implicit causation, two additional types of rules can be useful, in the generation of an interpretation sequence.

These two additional types are called Censor Rules and Entity Rules. Each is now discussed, in turn.

A censoring rule is essentially the converse of a deductive rule. While a deductive rule ensures obvious implications, of already-present story elements, are added, a censoring rule ensures the removal, of obviously nonsensical story elements.

FIG. 4H depicts a censor rule 480 that can become relevant, to the interpretation sequence (as shown in FIG. 3K) of input story 200. For example, consider a situation where deductive rules 481 and 482 (also introduced, along with 480, in FIG. 4H) are included in the production of the interpretation sequence. An implication of deductive rule 481, is that Mary killing Paul implies that Mary harms Paul. A further implication, as a result of rule 482, is that Mary harming Paul causes Paul to become unhappy. Without a censoring rule, the result is a nonsensical situation, where Paul is both dead and unhappy about it. Censor rule 480, however, causes the story element "Paul is unhappy" to be removed. (Deductive rules 481 and 482 are introduced merely for purposes of illustrating rule 480, and are not applicable outside of this section 2.1.4.)

Entity rules, such as those shown in FIG. 4G, are used to place restrictions on the types of entities, which can match the meta-entities, no matter where such meta-entities are used. In the case of FIG. 4G, it restricts to persons, the type of entity that can match xx or yy. Thus, wherever these meta-entities are used, the relative literal entity, to which it can be matched, must be a person.

2.2 Parentheses-Based Representation

Now that a directed graph representation has been presented, this section presents another, more detailed, approach, referred to herein as parentheses-based representation.

2.2.1 Introduction

FIG. 7A depicts a generalized parentheses-based representation 700, by which to present a thematic-role frame (see "Additional Information," for the general definition of thematic-role frame). FIG. 7B is the same as FIG. 7A, except line numbers and numerical labels are added. As can be seen, FIG. 7B includes eight line numbers: 701-708.

As the name suggests, each logical section, within a parentheses-based representation, is indicated by a balanced pair of enclosing parentheses. The entire example role frame 700 is contained within opening left-parenthesis 710 (of line 701) and closing, right-parenthesis 711 (on line 708). The verb, around which the role frame is anchored, is also shown on line 701. Because FIG. 7B presents a general format, line 701 contains a placeholder meta-verb (i.e., <VERB>).

Line 702 contains a pair of parentheses, within which is specified the "Agent" for the frame. Line 702 is known to be the Agent, because it is the first logical unit to follow the verb. The Agent often corresponds to the familiar syntactic subject of a sentence. However, 700 is a semantic representation. Therefore, under certain circumstances, the Agent can remain the same, even if the syntactic subject changes (for further discussion of this property of thematic-role frames, see below section 6 "Additional Information"). Just as with the meta-verb of line 701, line 702 also has a kind of placeholder. In this case the placeholder represents a meta-Agent (i.e., <AGENT>). Line 702 also requires that the Agent be an "entity." In general, the "entity" operator requires that its operand refer to something that can be classified as a noun.

The thematic object of the thematic-role frame is either the second logical unit to follow the verb, or it can be specified by the "object" operator, as part of a "roles" subframe. The latter option is shown in FIG. 7B, where the second logical unit (enclosed within parentheses 720 and 721) is the "roles" operator of line 703. Line 704 is known to specify the thematic object, because of its inclusion of the "object" operator. The "roles" operator is generally used, if the thematic object is to be further qualified. In that case, the other operands of the "roles" subframe (i.e., the operands besides the "object" operand) are the qualifiers. This is the situation shown in FIG. 7B, where the optional qualifiers are shown on lines 705-707.

In general, each qualifier of a thematic object is a prepositional phrase. Three example prepositional phrases are indicated on lines 705-707. The optional nature, of each prepositional phrase, is indicated by its being enclosed in square brackets. The prepositional phrase of line 705, if included, is to indicate a destination (specified by meta-variable <DESTINATION>) for the thematic object. The prepositional phrase of line 706, if included, is to indicate an instrumentality (specified by meta-variable <INSTRUMENT>), for use in conjunction with the thematic object. The prepositional phrase of line 707, if included, is to indicate a new surroundings (specified by meta-variable <NEW_SURROUNDINGS>) for the thematic object. It should be emphasized that destination, instrumentality, and new surroundings are just examples, and there are additional well-known roles, for use within a thematic-role frame. These additional possibilities are indicated, between lines 707 and 708, by the inclusion of ellipses.

2.2.2 Representing Explicit Story Elements

FIGS. 8A-8H are re-presentations, of the explicit story elements discussed in section 2.1.1, and illustrated in FIG. 3B. With the exception of representing causal links 323, 338, and 348, each of FIGS. 8A-8H corresponds to, respectively, the explicit story element contents of time steps T1-T8 (as shown in FIG. 3B). Representation of the explicit causal link, in time steps T3, T6, and T8, is omitted from, respectively, FIGS. 8C, 8F, and 8H. Representing the causal links is addressed later in this section, after the non-causal aspects, of representing the sentences of input story 200, have been addressed.

Each of FIGS. 8A-8H is now discussed, in turn.

Regarding Peter, Paul, and Mary being persons (i.e., sentence 1 of FIG. 2B.), FIG. 8A presents two different approaches to achieving a parentheses-based representation. Representation 800 just addresses the statement "Peter is a person." Representation 800 presents this as an unknown Agent (i.e., AGENT UNKNOWN) "putting" Peter into the person category. (Use of white space in representation 800, as well as in other figures, is discussed in the "Use of White Space" subsection, of "Additional Information" section 6.)

Line 801 depicts another approach to representing the same "Peter is a person" statement. In this case, Peter and the category person are subjected to a special "classification" operator. Lines 802 and 803 are the same as line 801, except that these lines represent, respectively, "Paul is a person" and "Mary is a person."

Because representations 800-803 are all representations of explicit story elements, each begins with an "Explicit:" prefix. The same prefix is used for all explicit story elements presented herein, that are in parentheses-based format.

FIG. 8B presents a parentheses-based representation of sentence 2 of FIG. 2B. FIG. 8B presents two different approaches. Representation 810 presents it as an unknown agent, adding the property (and object) "poor," to the entity (and destination) Peter. Line 811 depicts another approach to representing the same "Peter is poor" statement. In this case, Peter and the property "poor" are subjected to a special "property" operator.

Figure 9A:
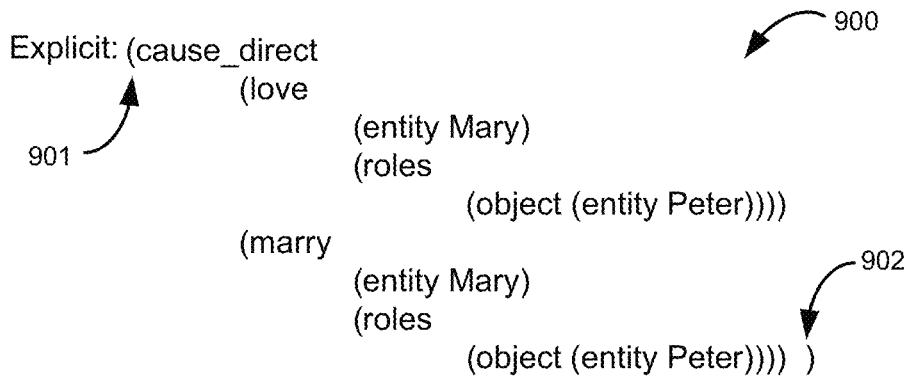

FIG. 8C presents a parentheses-based representation of sentence 3 of FIG. 2B, except that the direct causation link, between antecedent and consequent, is not represented (see FIG. 9A for this). Representation 820 presents the statement "Mary loves Peter" as the Agent "Mary" expressing the verb "love" towards the thematic object "Peter." Representation 821 presents the statement "Mary marries Peter" as the Agent "Mary" taking the action of "marrying" towards the thematic object "Peter."

FIG. 8D presents a parentheses-based representation of sentence 4 of FIG. 2B. Line 840 uses the special "classification" operator, to place "Paul" into the category of thieves.

FIG. 8E presents a parentheses-based representation of sentence 5 of FIG. 2B. Representation 850 presents the statement "Mary trusts Paul" as the Agent "Mary" expressing the verb "trust" towards the thematic object "Paul."

Figure 9B:
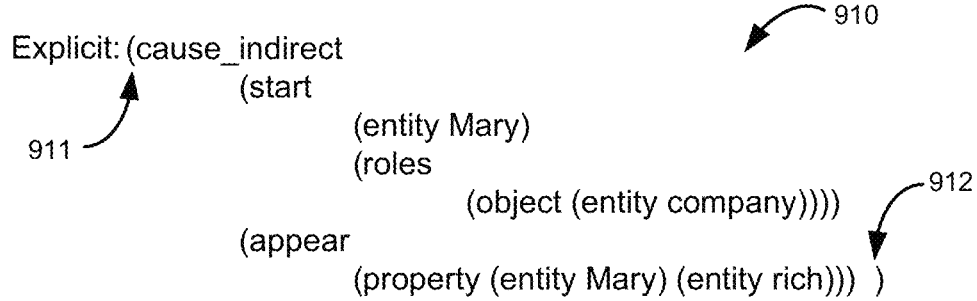

FIG. 8F presents a parentheses-based representation of sentence 6 of FIG. 2B, except that the indirect causation link, between antecedent and consequent, is not represented (see FIG. 9B for this). Representation 860 presents the statement "Mary's starting a company" as follows: the Agent "Mary" taking the action of "starting" towards the thematic object "company." Representation 861 presents the statement "Mary becomes rich," as follows: Mary obtaining the property "rich," through the special "property" operator.

FIG. 8G presents a parentheses-based representation of sentence 7 of FIG. 2B. Representation 870 presents the statement "Paul swindles Mary" as the Agent "Paul" taking the action of "swindle" towards the thematic object "Mary."

Figure 9C:
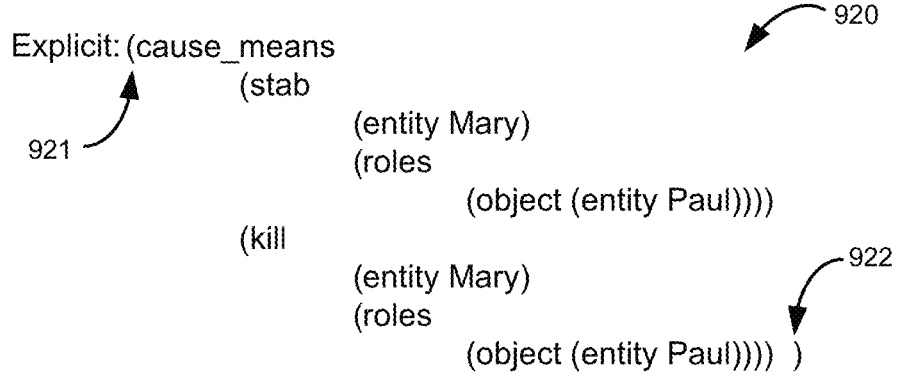

FIG. 8H presents a parentheses-based representation of sentence 8 of FIG. 2B, except that the means causation link, between antecedent and consequent, is not represented (see FIG. 9C for this). Representation 880 presents the statement "Mary stabs Paul" as the Agent "Mary" taking the action "stab" towards the thematic object "Paul." Representation 881 presents the statement "Mary kills Paul" as follows: the Agent "Mary" taking the action of "kill" towards the thematic object "Paul."

Now that the non-causal aspects, of translating a directed graph representation into a parentheses-based representation, have been addressed, also representing causal links, in the parentheses-based representation, is presented.

FIGS. 9A, 9B, and 9C each represents, respectively, causal links 323, 338, and 348 of FIG. 3B. The connector, of each of FIGS. 9A, 9B, and 9C, has embedded within it, respectively, the atomic story elements for each of FIGS. 8C, 8F, and 8H.

Thus, as can be seen, representations 820 and 821 are joined, in FIG. 9A, by the cause_direct operator (since time step T3 of FIG. 3B, that is the corresponding directed graph representation, also expresses direct causation). The connective story element 900 thus formed is enclosed within parentheses 901 and 902.

Similarly, representations 860 and 861 are joined, in FIG. 9B, by the cause_indirect operator (since time step T6 of FIG. 3B, that is the corresponding directed graph representation, also expresses indirect causation). The connective story element 910 thus formed is enclosed within parentheses 911 and 912.

Finally, representations 880 and 881 are joined, in FIG. 9C, by the cause_means operator (since time step T8 of FIG. 3B, that is the corresponding directed graph representation, also expresses means causation). The connective story element 920 thus formed is enclosed within parentheses 921 and 922.

As a group, FIGS. 8A-8H and FIGS. 9A-9C represent a much more detailed, parentheses-based, representation, of the explicit-story-element-only interpretation sequence of FIG. 3B. On a time-step-by-time-step basis, this equivalency is as follows:

T1: Story elements 801-803, of FIG. 8A, are equivalent to story elements 310-312, of FIG. 3B.

T2: Story element 811, of FIG. 8B, is equivalent to story element 315, of FIG. 3B.

T3: Story elements 820 and 821, of FIG. 8C, are equivalent to, respectively, story elements 321 and 322 of FIG. 3B. Further, story element 900, of FIG. 9A, is equivalent to story element 323, of FIG. 3B.

T4: Story element 840, of FIG. 8D, is equivalent to story element 325, of FIG. 3B.

T5: Story element 850, of FIG. 8E, is equivalent to story element 330, of FIG. 3B.

T6: Story elements 860 and 861, of FIG. 8F, are equivalent to, respectively, story elements 336 and 337, of FIG. 3B. Further, story element 910, of FIG. 9B, is equivalent to story element 328, of FIG. 3B.

T7: Story element 870, of FIG. 8G, is equivalent to story element 340, of FIG. 3B.

T8: Story elements 880 and 881, of FIG. 8H, are equivalent to, respectively, story elements 346 and 347, of FIG. 3B. Further, story element 920, of FIG. 9C, is equivalent to story element 348, of FIG. 3B.

2.2.3 Representing Inference Rules

Parentheses-based representation can be extended, in order to represent the trigger and action patterns of inference rules. This can be accomplished by substituting meta-entities for literal entities. When used to represent a pattern, rather than a (relatively) literal story element, a parentheses-based representation can be referred to herein as a parentheses-based meta-representation. (See "Additional Information" section 6, for discussion of "Literal Versus Meta Entities.")

2.2.3.1 Deductive Causation

Figure 11A:
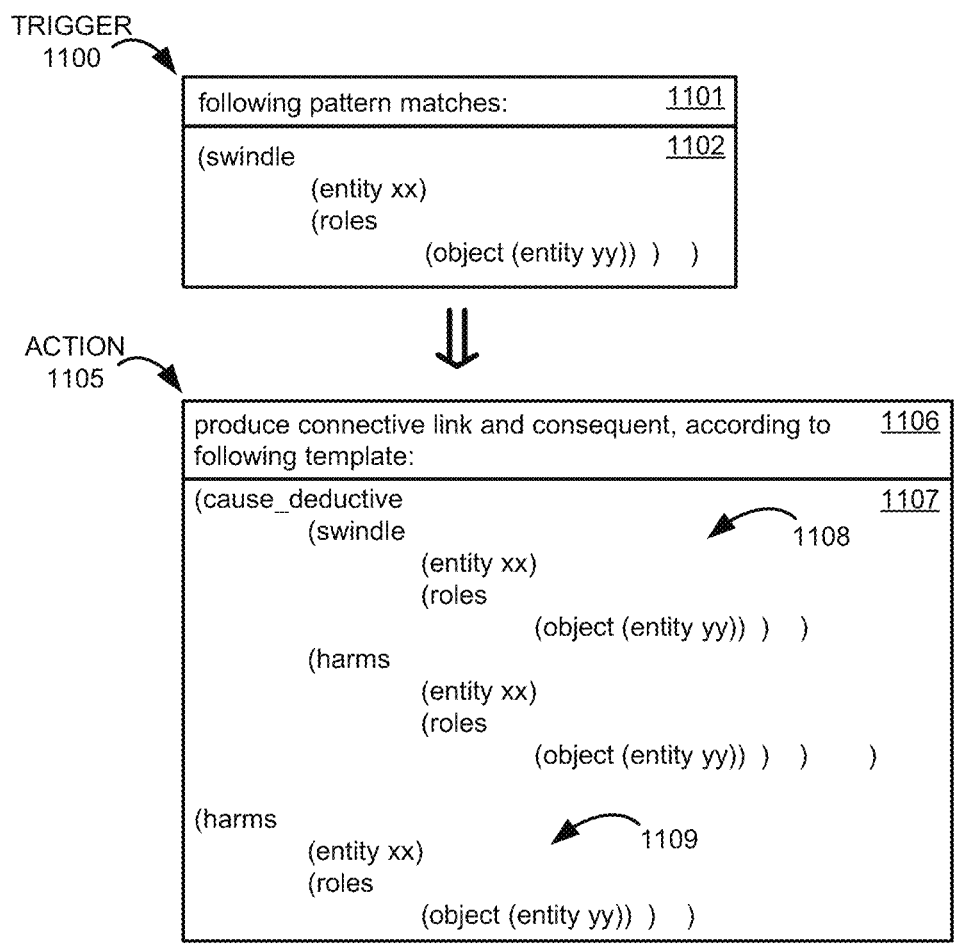
FIGS. 11A-11F present an example rule, expressed in parentheses-based representation, for each category of implicit causation.

An example use of the parentheses-based meta-representation is shown in FIG. 11A, that depicts a trigger portion 1100, and an action portion 1105, for implementing deductive rule 410 of FIG. 4A. Trigger 1100 is divided into two parts: a procedure 1101 and a pattern 1102. Procedure 1101 specifies how the parentheses-based meta-representation, of pattern 1102, is to be utilized. In the case of procedure 1101, it seeks to find an assignment, of literal entities to the meta-entities, such that the story element thereby specified, by pattern 1102, is found in the interpretation sequence. Action portion 1105 is also divided into two similar kinds of subparts: a procedure 1106, and a pattern 1107. Assuming action 1105 has been activated, this means that certain assignments, of literal entities to meta-entities, have satisfied the trigger. These same assignments are applied, in action 1105, in order to create a new story element, for addition to the interpretation sequence. Using pattern 1107 as a guide, procedure 1106 constructs two story elements:
 a connective story element, according to pattern 1108, and
 an atomic consequent story element, according to pattern 1109.

Figure 19A:
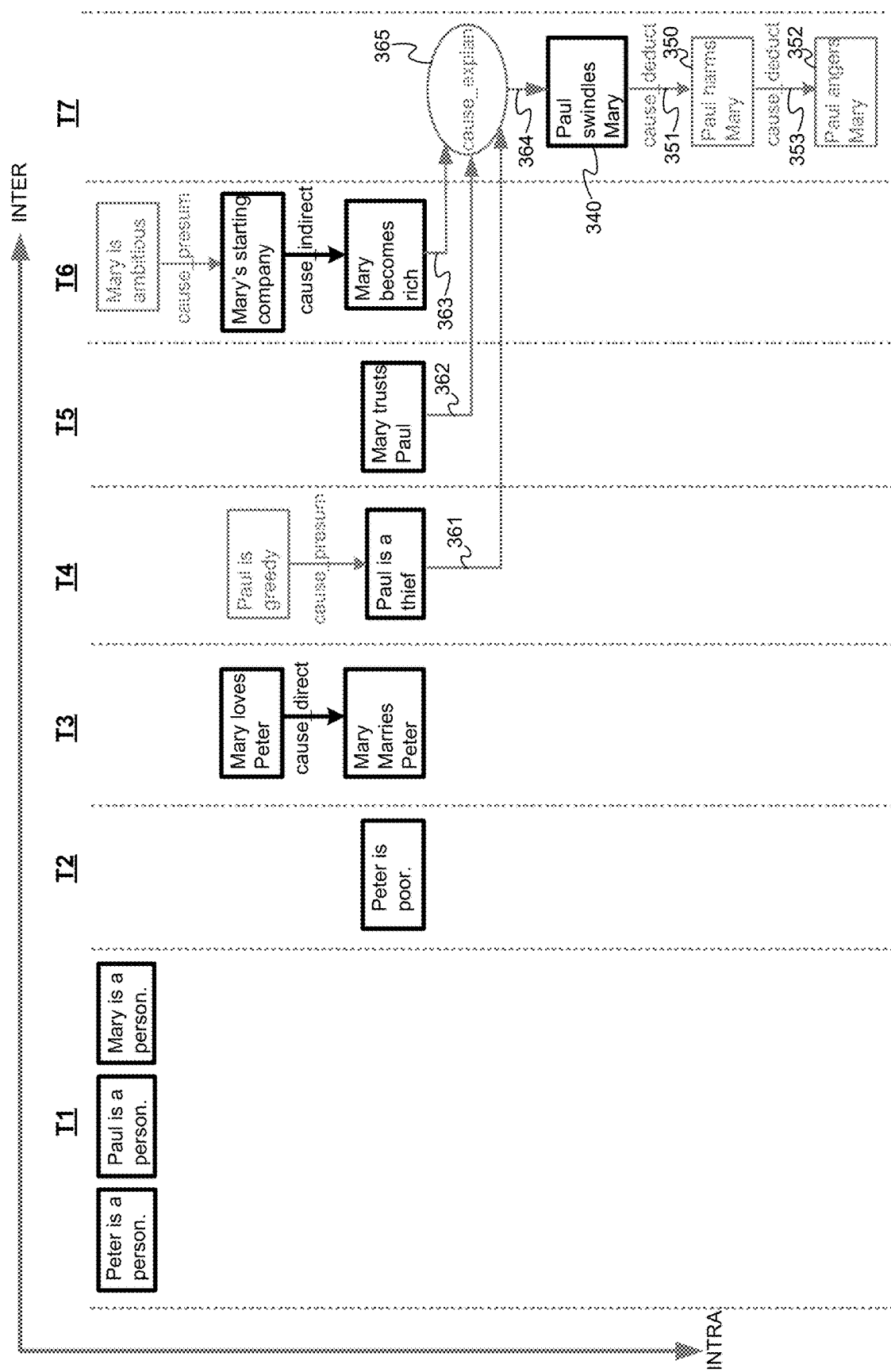
Figure 19B:
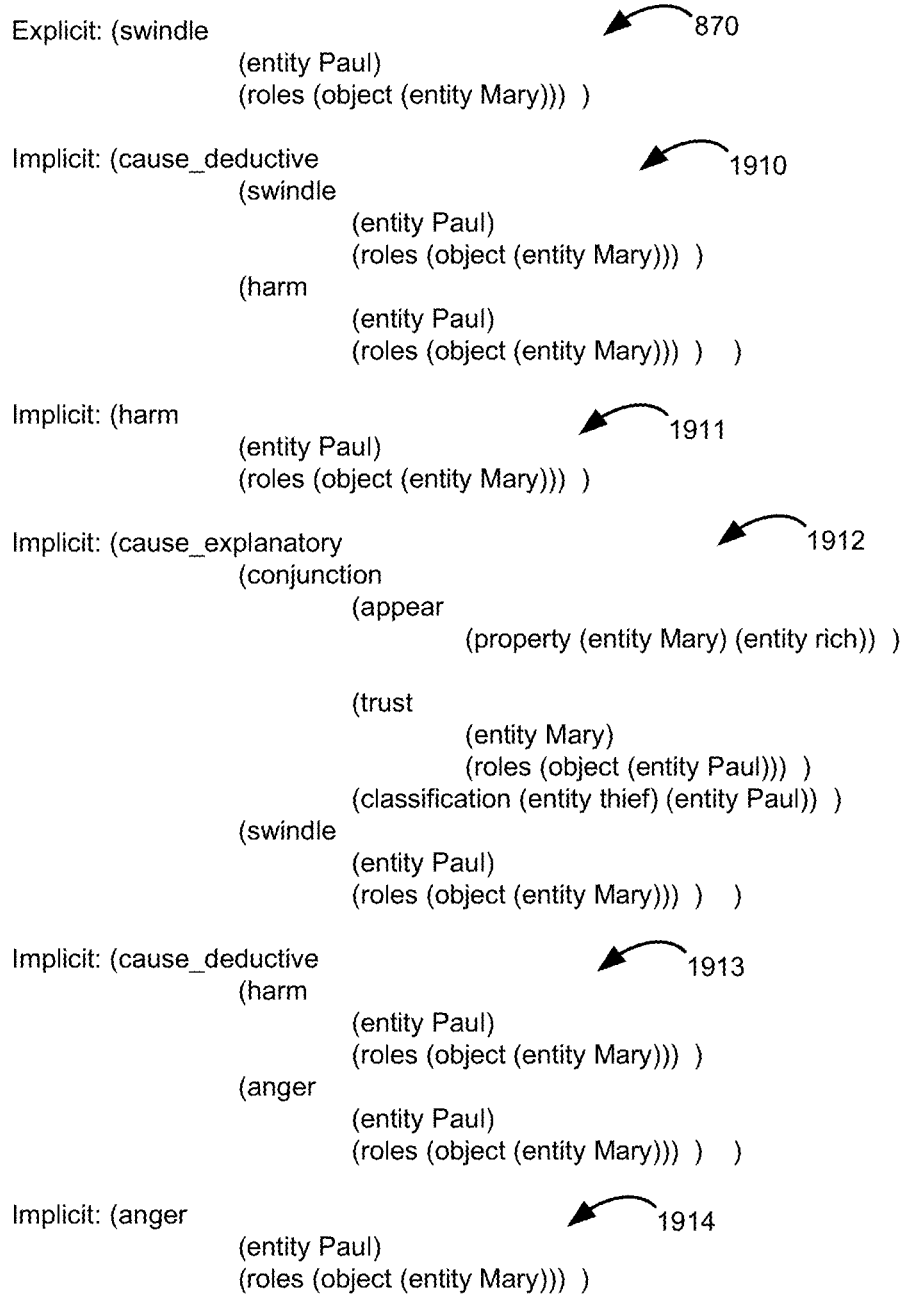

Trigger pattern 1102 matches the parenthesis-based representation of explicit story element 870 (see FIG. 8G), when literal entity "Paul" is assigned to meta-entity "xx," and literal entity "Mary" is assigned to meta-entity "yy." Under these assignments, the results of action patterns 1108 and 1109 are shown in FIG. 19B, where story element 1910 is produced by pattern 1108, and story element 1911 is produced by pattern 1109. Other than for its illustration of story elements 870, 1910, 1911, FIG. 19B should be otherwise ignored for the time being.

FIG. 19 is part of a set of figures, which consists of FIGS. 13-20. FIGS. 13-20 are fully discussed in following section 2.4. For purposes of the present section 2.2.3, certain specific portions of these figures are referred to, simply for purposes of illustrating the isolated operation of example inference rules.

Deductive rules 411 and 412 can be implemented in a similar way, as rule 410 is implemented in FIG. 11A.

2.2.3.2 Explanatory Causation

Figure 11B:
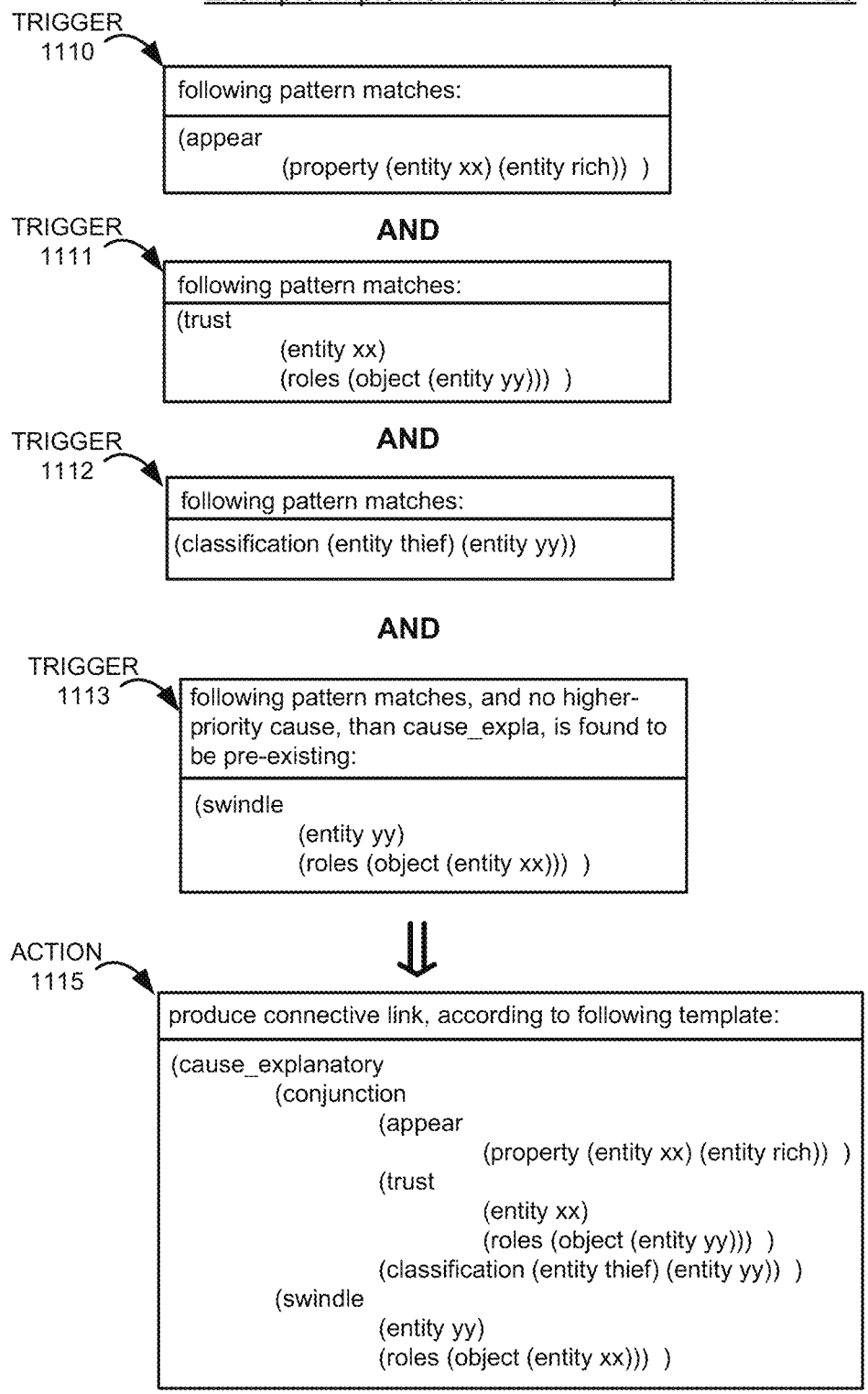

An example parentheses-based representation, for explanatory rule 420 of FIG. 4B, is presented in FIG. 11B. As can be seen, rule 420 is implemented in
 FIG. 11B with four trigger patterns 1110-1113. If "Mary" is assigned to meta-entity xx and "Paul" is assigned to meta-entity yy, then the four trigger patterns can be satisfied by the following:
 1110 is satisfied by story element 861 of FIG. 8F;
 1111 is satisfied by story element 850 of FIG. 8E;
 1112 is satisfied by story element 840 of FIG. 8D; and
 1113 is satisfied by story element 870 of FIG. 8G, and by
  870 not already having a higher priority explanation.

Regarding trigger 1113, it seeks to match what will become the consequent, of the explanatory link created, if the rule is triggered. For this reason, in general, a condition like 1113 can be referred to as a consequent pattern. The other trigger patterns seek to match what will become antecedents, if the rule is triggered. Thus, in general, patterns like 1110-1112 are called antecedent patterns.

Condition 1113 can be understood, in greater detail, by referring to precedence table 130 of FIG. 1B (i.e., see section 2.1.3 "Prioritization"). A higher-priority explanation can simply be the preexistence of another cause_explanatory link, which also places story element 870 as a consequent. This is due to the programming of the "Self" value, at the table 130 location (Explanatory, Explanatory). Also, because of the four instances of the "Blocks" value (under the Explanatory column of table 130), preexistence of any of the following causal link types (with story element 870 as the consequent) will also block application of the rule of FIG. 11B: Direct, Indirect, Deductive, or Proximity.

Assuming the input story is input story 200 of FIG. 2B, and the set of inference rules as shown in FIGS. 4A-4F, trigger pattern 1113 is satisfied. This was already shown in section 2.1, with the directed graph representation of input story 200 being processed. Section 2.1 uses the directed graphs of FIGS. 3B-3K. Within this set of Figures, the transition, from FIG. 3E to FIG. 3F, shows application of explanatory rule 420. As can be seen in FIG. 3E, story element 340 has no explanation, prior to the application of explanation rule 420, as shown in FIG. 3F.

Therefore, rule 420 is triggered, and, as is shown in FIG. 11B, action 1115 uses a parentheses-based meta-representation, in order to produce a connective-type story element (with link type cause_explanatory). The result of this action is connective story element 1912, as shown in FIG. 19B. Because FIG. 11B depicts an explanatory rule (unlike, for example, the deductive rule shown in FIG. 11A), action portion 1115 produces only a connective element.

Explanatory rule 421 can be implemented in a similar way, as rule 420 is implemented in FIG. 11B.

2.2.3.3 Proximity Causation

Figure 11C:
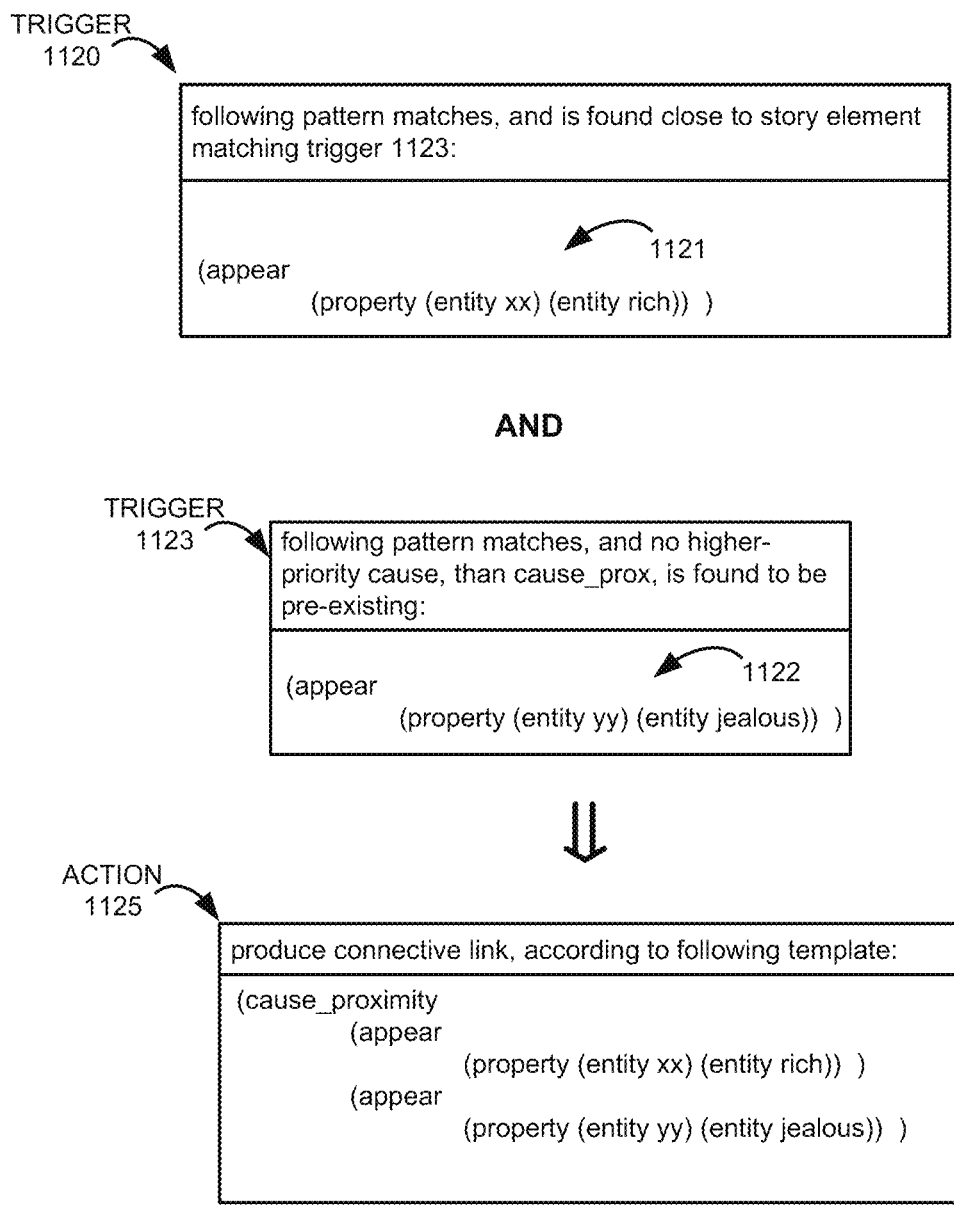

An example implementation, for proximity rule 430 of FIG. 4C, is shown in FIG. 11C.

Regarding trigger 1123, it has the consequent pattern 1122, since 1122 seeks to match what will become the consequent, of the proximity link created, if the rule is triggered. In an analogous fashion to the consequent pattern for the explanatory rule discussed just above, 1123 also requires that any matching story element not already be a consequent of a causal connection of higher priority than a proximity type connection.

Pattern 1121, of trigger 1120, seeks to match what will become the antecedent, if the rule is triggered. The procedural portion of antecedent trigger 1120 differs, from the antecedent trigger for an explanatory rule, by requiring that the antecedent and consequent patterns, 1121 and 1122, match story elements that are "close to each other." Sufficient closeness can mean, for example, that the story elements be in either adjacent time steps, or a same time step. If triggers 1120 and 1123 are matched, then action 1125 produces a connective story element of the cause_proximity type.

Unlike all the other causal types discussed herein, during retextualization (see section 5), a cause_proximity link is never converted into text. Rather, it is a specific indication that the story elements it connects be presented in separate sentences, but that the sentences must be immediately adjacent to each other.

2.2.3.4 Abductive Causation

Figure 11D:
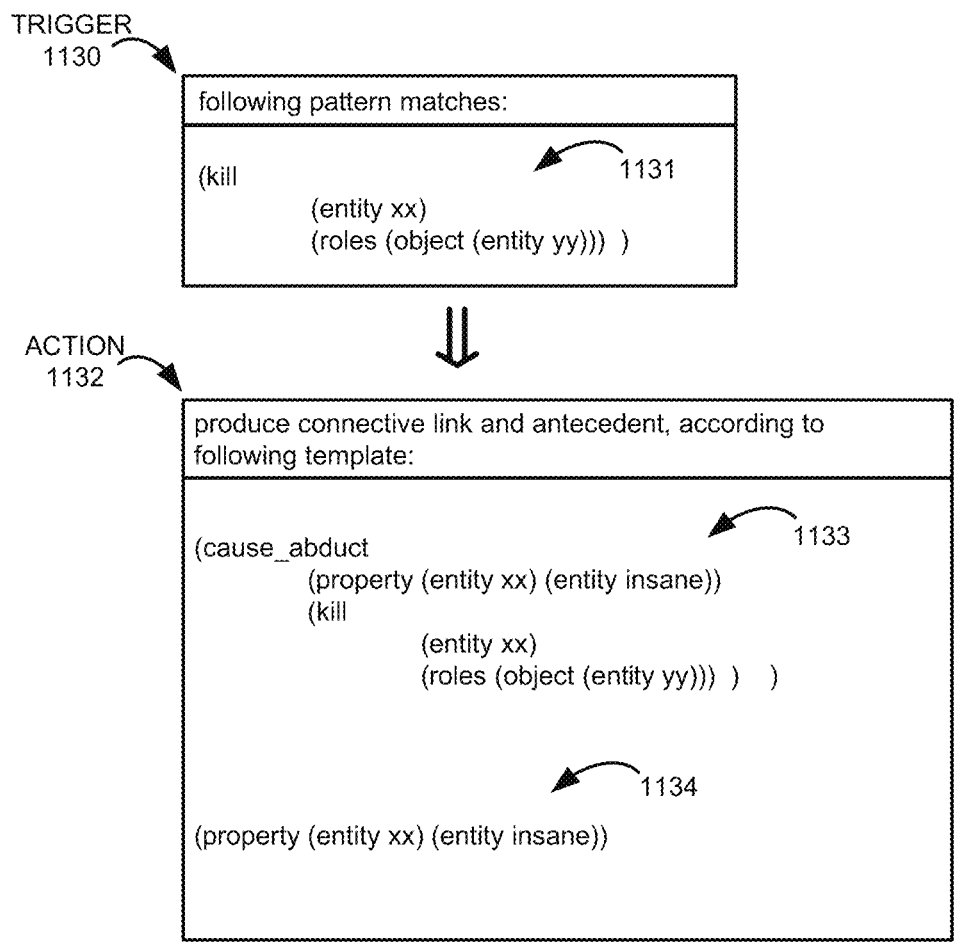

An example implementation, for abductive rule 440 of FIG. 4D, is shown in FIG. 11D. This rule can be triggered, for example, by pattern 1131 matching story element 881 of FIG. 8H, with "Mary" assigned to xx and "Paul" assigned to yy. Although blocked by prioritization, if the rule of FIG. 11D were triggered, action 1132 would produce the following:

With pattern 1133, a story element of the following form, that would be included in FIG. 20B:
(cause_abduct
    (property (entity Mary) (entity insane))
    (kill
        (entity Mary)
        (roles (object (entity Paul)))))
With pattern 1134, a story element of the following form, that would be included in FIG. 20B:
(property (entity Mary) (entity insane))

2.2.3.5 Presumptive Causation

Figure 11E:
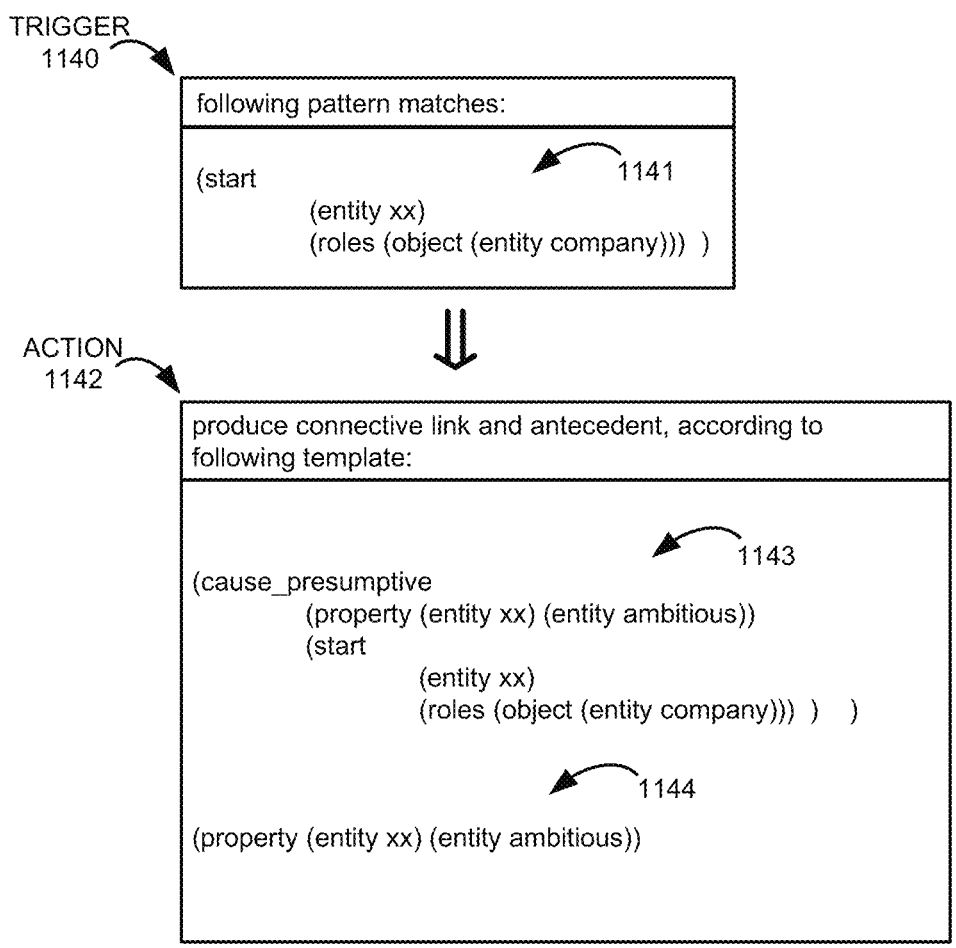

An example implementation, for presumptive rule 450 of FIG. 4E, is shown in FIG. 11E. This rule can be triggered, for example, by pattern 1141 matching story element 860 of FIG. 8F, with "Mary" assigned to xx. Once triggered, action 1142 produces the following:

With pattern 1143, story element 1810 of FIG. 18B.
With pattern 1144, story element 1811 of FIG. 18B.

Presumptive rule 451 can be implemented in a similar manner to that just discussed for rule 450.

2.2.3.6 Enabling Causation

Figure 11F:
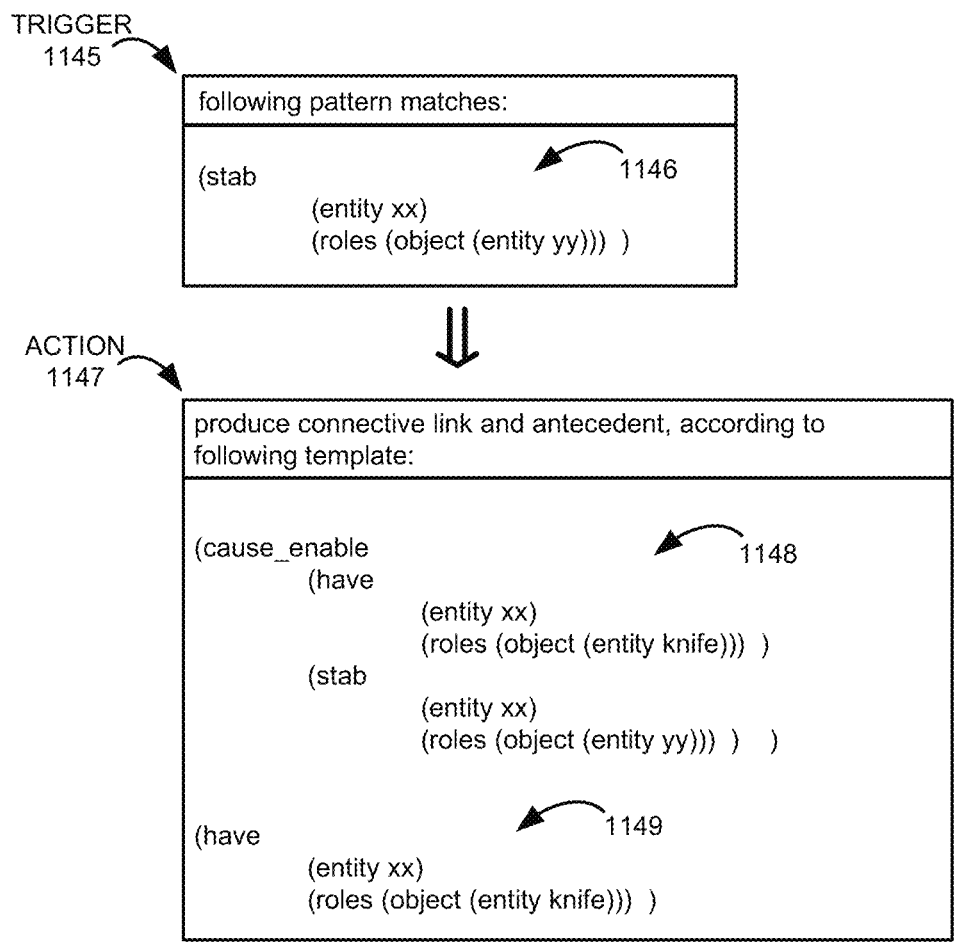

An example implementation, for enabling rule 460 of FIG. 4F, is shown in FIG. 11F. This rule can be triggered, for example, by pattern 1146 matching story element 880 of FIG. 8H, with "Mary" assigned to xx and "Paul" assigned to yy. Action 1147 produces the following:

With pattern 1148, story element 2012 of FIG. 20B.
With pattern 1149, story element 2013 of FIG. 20B.

2.3 Pseudo-Code

A pseudo-coded procedure, for interpretation sequence generation, is depicted in FIGS. 12A-12J. The procedure, called "build-EG," is written in a pseudo-code language that is loosely based upon the C and Java programming languages. The title "build-EG" means "build Elaboration Graph," where elaboration graph is another term by which to refer to an interpretation sequence.

A step-by-step simulated execution of build-EG, using story 200 of FIG. 2B as input, is depicted in FIGS. 13-20. Each of FIGS. 13-20 has an "A" version, and a "B" version. The "A" figures (i.e., FIGS. 13A, 14A, 15A, 16A, 17A, 18A, 19A, and 20A) use the same type of directed graph representation, as was previously presented in section 2.1.2, in conjunction with FIGS. 3B-3K. However, across all of FIGS. 3B-3K, all the explicit story elements are always present, and precedence table 130 (not introduced until section 2.1.3) is not applied. The differences, in going from FIG. 3B to FIG. 3K, are in the successively greater presence of implicit story elements, as each of the different implicit rule types is applied.

In contrast, the "A" figures introduce the explicit story elements sequentially, and in the same order of the sentences in the input story 200. For each next sentence of input story 200, it is converted into its corresponding explicit story elements, and all implications of these newly-produced explicit story elements are explored, before the next sentence is processed. In each of the "A" figures, the newly-produced explicit and implicit story elements are always in the leftmost (or highest-numbered) time step. These newly-produced story elements are further emphasize by their being the only story elements, in each figure, to have explicitly-depicted numerical labels.

Despite the differences in process, behind the two sets of figures (i.e., between FIGS. 3B-3K and the "A" figures), the final resulting interpretation sequence could still be expected to remain the same. However, the fact that precedence table 130 is not in effect for FIGS. 3B-3K, but is in effect for the "A" figures, does make a difference. The one difference (discussed in more detail in section 2.4) is between the last "A" figure (i.e., FIG. 20A) and FIG. 3K: in FIG. 20A, the abductive inference (labeled link 357 in FIG. 3K), that "Mary is insane," is blocked by a higher-priority explanatory link (that says that Mary killed Paul because Paul angered Mary). In FIG. 3K, both inferences (the abductive and explanatory links), that seek to explain why Mary killed Paul, are kept.

For each figure of the "A" figures, its corresponding "B" figure depicts the following in parentheses-based form:

The latest explicit story elements added to the interpretation sequence, as a result of processing the current story sentence.
All the implicit story elements that result from the latest explicit story elements.

Figure 20A:
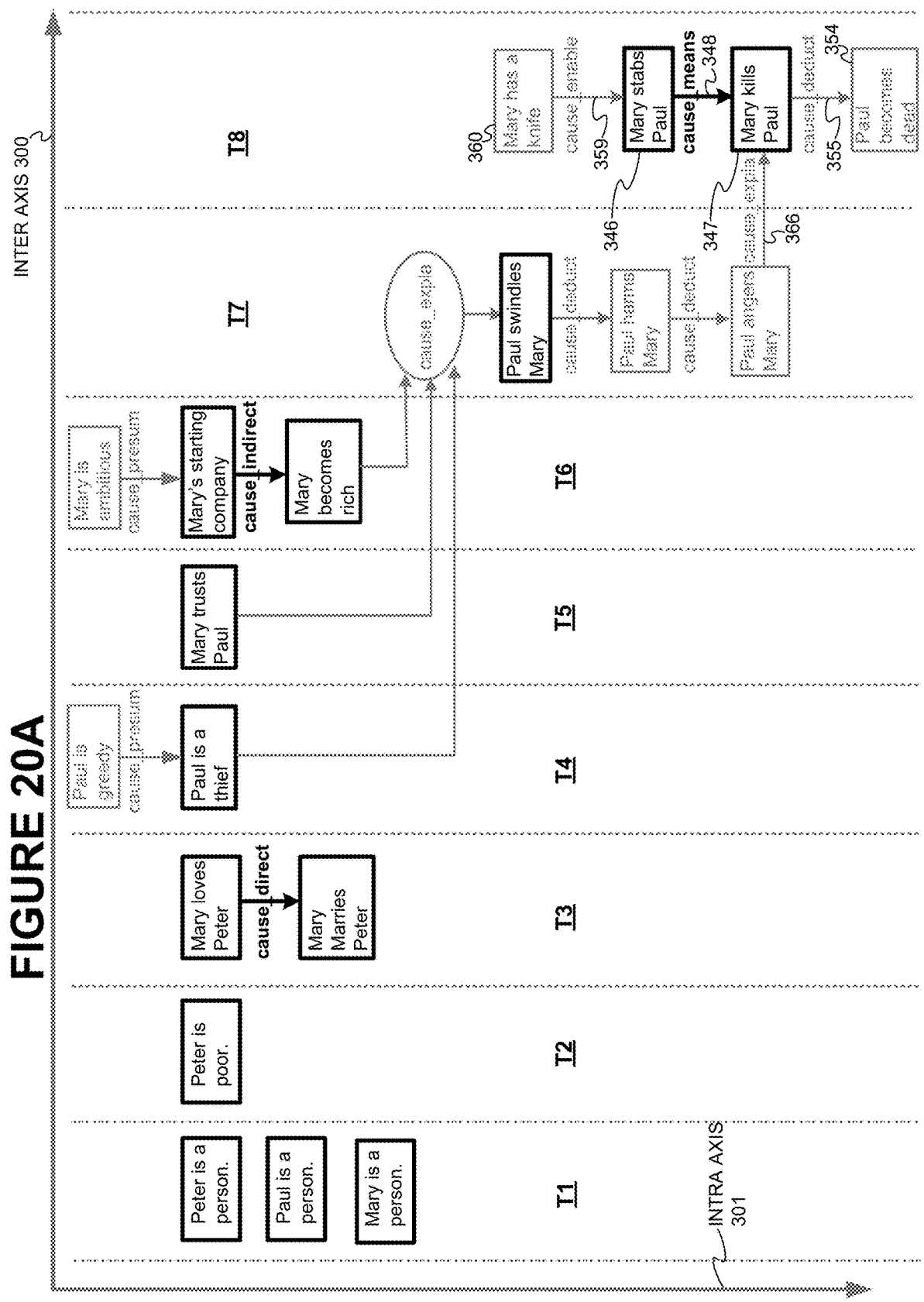

When considered as a group, the "B" figures (i.e., FIGS. 13B, 14B, 15B, 16B, 17B, 18B, 19B, and 20B) constitute a complete interpretation sequence for input story 200, expressed in parentheses-based form. With regard to this interpretation sequence, each of FIGS. 13B, 14B, 15B, 16B, 17B, 18B, 19B, and 20B, correspond to, respectively, the following time step (as shown in FIG. 3K or 20A): T1, T2, T3, T4, T5, T6, T7, and T8.

As used anywhere herein, the term "the 'B' figures" shall be understood as a reference to the following set of figures, which collectively represent an interpretation sequence: FIGS. 13B, 14B, 15B, 16B, 17B, 18B, 19B, and 20B. This definition is also included in the "Additional Information" section 6.

Although introduced here, the "A" figures and the "B" figures are mainly discussed in the next section 2.4. The remainder of this section is a detailed review of the pseudo-code of FIGS. 12A-12J.

As can be seen in FIG. 12A, the definition of build-EG begins on line 5, and the interpretation_sequence variable is initialized, to an empty list, on line 9. The main loop, for iteratively considering each sentence of the input_story, begins on line 14. As can be seen, the current sentence under consideration is assigned to the variable e_sentence.

To aid in the understanding of the pseudo-code depicted in FIGS. 12A-12J, five indentation markings (numbered 1-5) are included at the top-left corner of each page, just above the first line of pseudo-code. Indentation is used in the conventional fashion, to indicate flow-of-control nesting, either as a result of "for" loops or "if" statements. The opening definition of build-EG, at line 5, is at indentation 0 (an indentation level for which top-of-page marking is not included). The interpretation_sequence variable, at line 9, and the opening of the main loop, at line 14, are aligned with indentation level 1.

At line 22, the current time_step to be created is initialized as an empty set (and this line is at indentation level 2). To address the possibility that a sentence of the input story may be compound, the function get-non-compounds is applied at line 26, the result assigned to the variable non_compounds.

At line 32 each non-compound sentence, for the current sentence of the input story, is successively considered by the "for" loop. As can be seen, for each iteration, the current non-compound sentence is assigned to the variable current_sentence.

At line 36, the function "generate-semantic-model" is used to produce a semantic representation of the non-compound sentence that is currently under consideration. generate-semantic-model can work in two main stages: a parsing stage, and a syntax to semantics mapping stage. A suitable parser, for the parsing stage, is the START parser (see below Glossary of Selected Terms). The START parser produces output in the form of ternary expressions (or triples). Atomic story elements in parenthesis-based representation (or equivalent) can be produced, from triples produced by START, using thematic-role frame techniques, such as those discussed in section 2.2. Regarding the production of explicit connective story elements, it has been found that, at least, a highly useful subset of the English-language can be understood, by providing for syntax-to-semantic mapping, of a relatively small set of syntactic cues. Some example syntactic cues were discussed in section 2.1.1.

Figures 13A, 13B:
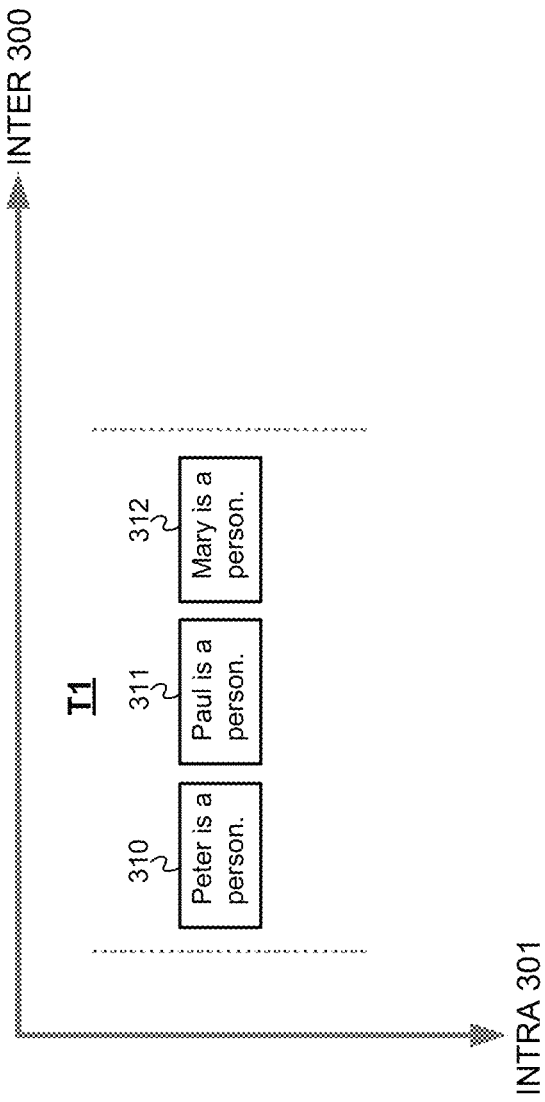

For example, consider sentence 1 of input story 200 (see FIG. 2B). FIG. 13A depicts the directed graph representation of its three corresponding non-compound sentences. FIG. 13B presents an example representation, for each of the non-compound sentences, in parentheses-based form. Each of these parentheses-based representations (numbered 801-803) can be produced, for example, by a separate call to generate-semantic-model.

A semantic representation of a non-compound sentence can be quite complex, in terms of causal operators, conjunctive operators, or both. In such cases, generate-semantic-model can return a recursively nested, parenthesis-based representation.

Figure 6A:
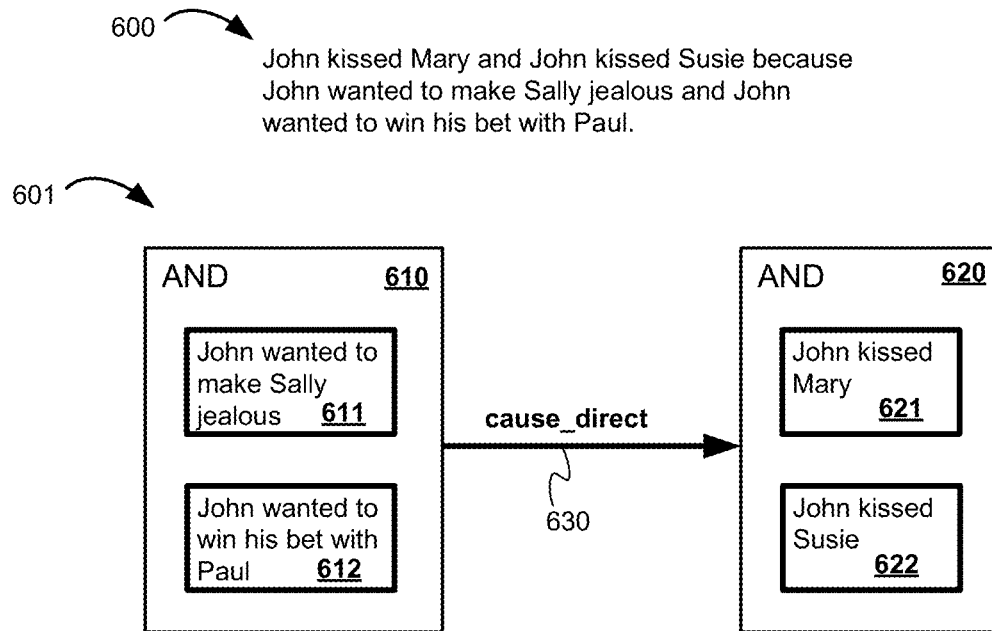
FIG. 6A depicts an example cross-product sentence.

For example, consider sentence 600 of FIG. 6A, that can be descriptively referred to as a "cross-product" sentence. A nested directed graph representation, for this sentence 600, is shown in FIG. 6A as representation 601. Representation 601 is designed to emphasize just the causal and conjunctive operators, expressed by sentence 600. As can be seen, representation 601 has two levels of operators, which are of concern to summarization processes of the present invention. The top-level operator, of representation 601, is direct causation operator 630. Each operand, of this top-level operator 630, has, as its highest-level operator, a conjunctive (or AND) operator. The operands, of operator 630, are labeled 610 and 620. Operand 610 is composed of subparts 611 and 612, while 620 is composed of subparts 621 and 622.

In order to be able to explore all the possibilities, for causal rule triggering that could be caused by a representation like 601, one strategy is to subject it to recursive decomposition (another approach, is to keep all subcomponents, produced during the composition process, in addition to keeping the final result). In the case of representation 601, decomposition identifies the following, as separate and additional story elements, that are to be considered on their own, along with representation 601, for the possible inference rules they may trigger: 611, 612, 621, and 622.

This type of recursive decomposition is invoked at line 13, of FIG. 12B, where the semantic model just produced (and assigned to the variable cs_semantic_model) is passed as a parameter to the procedure "recursive-decomposition." The result of recursive-decomposition is assigned to the variable e_story_elements. The story elements assigned to e_story_elements include the original semantic model, passed as a parameter to recursive-decomposition. In addition, e_story_elements has assigned to it any embedded story elements, identified through the recursive decomposition process.

Figure 10A:
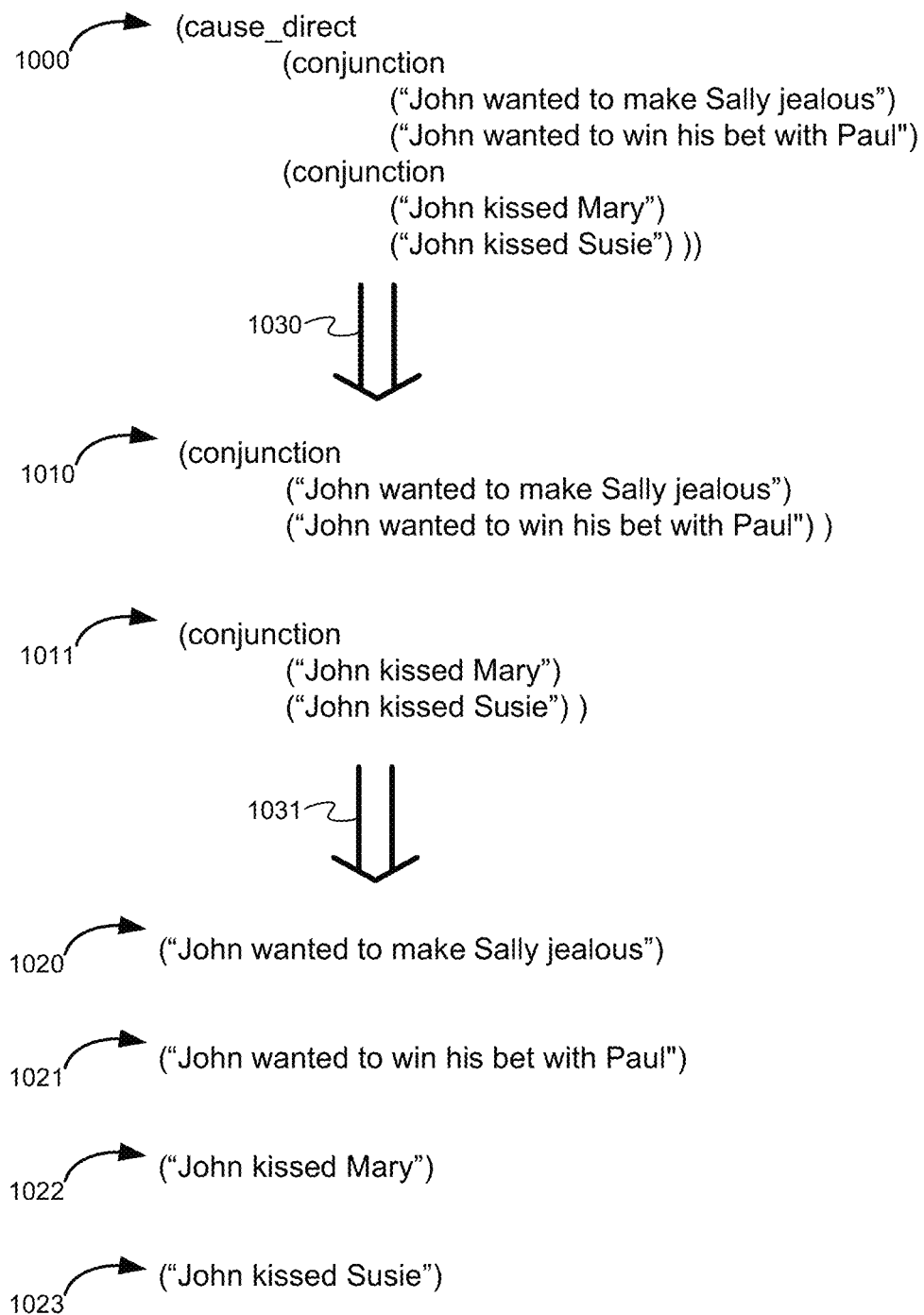
FIG. 10A illustrates a parentheses-based representation of sentence 600.

In order to better understand how the procedure recursive-decomposition operates, a representation of sentence 600, equivalent to representation 601 but expressed in parentheses-based form, is shown in FIG. 10A. It is the representation labeled 1000, and can be decomposed follows. Arrow 1030 represents decomposition of representation 1000 according to the top-level causal operator. The result is representations 1010 and 1111, that correspond to representations 610 and 620 of FIG. 6A. Arrow 1031 represents further decomposition, of each of representations 1010 and 1111, in accordance with their conjunctive operators. The result of decomposing representation 1010 is representations 1020-1021, and the result of decomposing representation 1011 is representations 1022-1023. Representations 1020-1023 correspond to, respectively, representations 611, 612, 621 and 622.

Figure 6B:
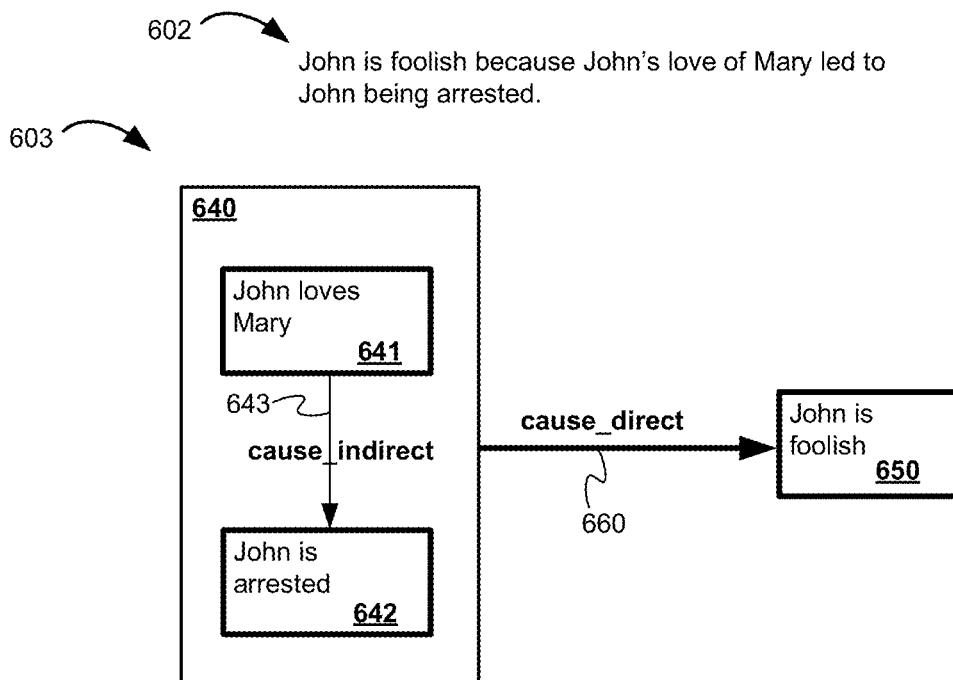
FIG. 6B depicts an example sentence with nested causation.

In order to further understand the complexities of the semantic models that can be produced, and the type of decomposition that can be needed, an example sentence 602 is shown in FIG. 6B. Sentence 602 is an example of nested causation. With regard to its directed graph representation 603, it can be seen that the top-level operator is direct causation operator 660. Operand 640, of the top-level operator, has, as its highest-level operator, an operator labeled 643, which is itself a type of causation (indirect causation).

FIG. 10B presents a parenthesis-based representation 1030 of sentence 602. A discussion, of how 1030 can be decomposed, follows. Arrow 1060 represents decomposition of representation 1030 according to the top-level causal operator. The result is representations 1040 and 1041, which correspond to representations 640 and 650 of FIG. 6B. Arrow 1061 represents further decomposition, of representation 1040, in accordance with its indirect causal operator. The result is representations 1050-1051, and 1041, that correspond to, respectively, representations 641, 642, and 650. (Representation 1041 is simply included, unchanged, along with the other results of arrow 1061.)

Recursive decomposition having been accomplished, at line 13 of FIG. 12B, line 25 of FIG. 12B is done next. Line 25 is just to ensure that the explicit story elements, subjected to further processing, are not already present in the interpretation sequence being constructed. This is insured through a call to the function "prune-elements," the operation of which is explained in the comments of FIG. 12B, at lines 15-21. The set of story elements that have been definitively determined to be members of the interpretation sequence under construction, as of each call to prune-elements at line 25, is the union of interpretation_sequence with time_step. That is why e_story_elements is compared with the set {interpretation_sequence U time_step}, by the prune-elements function.

Line 32 of FIG. 12B determines if there are any story elements that should be censored, given the interpretation sequence thus far constructed. The function "determine-censored-elements" performs this, by considering any censoring rules, that may have been provided. The censoring rules are tested against the set of story elements that have been definitively determined to be members of the interpretation sequence under construction, as of each call to determine-censored-elements at line 32. As with line 25, this is represented by the union of interpretation_sequence with time_step.

At line 35 of FIG. 12B, the function prune-elements is used to remove, from further consideration, any story elements determined to be censored.

The "if" statement, at line 2 of FIG. 12C, is another check, to ensure that, after the prior applications of prune-elements, there are still explicit story elements, from the non-compound sentence currently under consideration, for further processing.

The "while" loop SE_INFER, at line 17 of FIG. 12C, is intended to keep iterating, until all implicit story elements, upon the following basis, can be found: can be inferred from the new explicit story elements of the current non-compound sentence. For each iteration of SE_INFER, the variable new_story_elements has the story elements from which new implicit story elements may be inferable. To the extent an iteration of SE_INFER finds new implicit story elements, they are saved for the next iteration of SE_INFER, by assigning them to next_new_story_elements. SE_INFER keeps iterating, until, during the course of one entire iteration, the contents of new_story_elements results in no new implicit story elements being created. SE_INFER keeps track, of whether an iteration has created new story elements, with the variable rule_triggerings. At line 8 of FIG. 12C, rule_triggerings is initialized to TRUE. At line 11, new_story_elements is initialized to the new explicit story elements resulting from the current non-compound sentence. As can be seen at line 17, SE_INFER keeps iterating while rule_triggerings remains TRUE.

The first action of SE_INFER (at line 20 of FIG. 12C), is to initialize rule_triggerings to FALSE, on the assumption that the current iteration may be the last iteration of the loop. Similarly, at line 22, next_new_story_elements is initialized to an empty set, on the assumption that no next iteration will be needed.

FIGS. 12D-12I (that represent the main body of the SE_INFER LOOP) are very similar, the difference being that each of these figures is concerned with attempting to apply another rule type:

FIG. 12D is concerned with applying deductive rules.
FIG. 12E is concerned with applying enabling rules.
FIG. 12F is concerned with applying proximity rules.
FIG. 12G is concerned with applying explanatory rules.
FIG. 12H is concerned with applying abductive rules.
FIG. 12I is concerned with applying presumptive rules.

Each of FIGS. 12D-12I begins with a "for" loop, the purpose of which is to loop over all rules of a single type. For example, the "for" loop of line 2 of FIG. 12D, for each iteration, sets current_rule to a different deductive rule. FIGS. 12E-12I follow the same pattern:

Line 2 of FIG. 12E, for each iteration, sets current_rule to a different enabling rule.
Line 4 of FIG. 12F, for each iteration, sets current_rule to a different proximity rule.
Line 1 of FIG. 12G, for each iteration, sets current_rule to a different explanatory rule.
Line 1 of FIG. 12H, for each iteration, sets current_rule to a different abductive rule.
Line 1 of FIG. 12I, for each iteration, sets current_rule to a different presumptive rule.

The ordering of the consideration of rule types, across FIGS. 12D-12I, is intended to implement the rule prioritization discussed above (e.g., see section 2.1.3), with respect to precedence table 130 of FIG. 1B Following its initial "for" loop, each of FIGS. 12D-12I has a second "for" loop. The purpose of the second loop is to iterate over all combinations of story elements, where each combination includes at least one story element from new_story_elements, and where the combination selected also satisfies current_rule.

For example, line 6 of FIG. 12D performs this function. The variable current_comb is set to a different combination of story elements, on each iteration. When all combinations of been exhausted, the "for" loop of line 6 terminates (or "falls through" line 24). As can be seen on line 6, the combination is selected from a set, comprised of the union of the following sets of story elements: interpretation_sequence, time_step, and new_story_elements. As can be seen, this three-element union is nested, with the union of interpretation_sequence with time_step being performed first. The union is written in this way, in order to indicate that the set new_story_elements has a dominant position, regarding the formulation of story element combinations: each combination selected must include at least one story element from new_story_elements.

The union of interpretation_sequence with time_step is intended to represent the set of all story elements definitely known to be included in the interpretation sequence thus far constructed, as of the end of the last iteration of SE INFER. As can be seen from the "satisfying" pseudo-code keyword, included at the end of the "for" loop definition line (line 6 of FIG. 12D), each combination selected is further restricted to be only those that can satisfy the current_rule.

FIGS. 12E-12I follow the same pattern, regarding their second "for" loop:

Line 6 of FIG. 12E, for each iteration, selects a different combination of story elements, that satisfy the current enabling rule.
Line 8 of FIG. 12F, for each iteration, selects a different combination of story elements, that satisfy the current proximity rule.
Line 2 of FIG. 12G, for each iteration, selects a different combination of story elements, that satisfy the current explanatory rule.
Line 2 of FIG. 12H, for each iteration, selects a different combination of story elements, that satisfy the current abductive rule.
Line 2 of FIG. 12I, for each iteration, selects a different combination of story elements, that satisfy the current presumptive rule.

Following its second "for" loop, each of FIGS. 12D-12E uses a function called "apply-rule," in order to apply the current_rule, with the currently selected combination (i.e., the combination of story elements assigned to variable current_comb). This is done at line 12, of FIGS. 12D and 12E. At lines 15-16, of FIGS. 12D and 12E, results of applying the current rule, that are not new, are removed (with the function prune-elements). Line 17, of FIGS. 12D and 12E, tests whether any new story elements have been found. If so, lines 21 and 22, of FIGS. 12D and 12E, do the following. The variable rule_triggerings is set to TRUE, to ensure that at least one more iteration of SE_INFER is performed. The one or more new story elements found are saved away, for the next iteration of SE_INFER, in the variable next_new_story_elements.

The code of FIGS. 12D and 12E is very similar because neither the deductive nor enabling rules can have their application blocked, if the consequent, in current_comb, is already being treated as a consequent as a result of a pre-existing causal connection.

FIGS. 12F-12I, however, each does a successively more complex check, for whether the consequent, which could be explained by application of current_rule, already has a higher-priority explanation. FIGS. 12F-12I obtain, with the function "get-consequent," the story element that can be explained by application of the current_rule with the current combination (i.e., current_comb). This story element is assigned to current_consequent. In FIG. 12F, get-consequent is invoked at line 14, while in FIGS. 12G-12I it is invoked at line 5.

Then, in order to do the most thorough job possible, of determining whether the current consequent already has a higher priority explanation, it is necessary to compare current_consequent to all story elements that are either currently in the interpretation sequence, or are even planned for addition to it in a next iteration of SE_INFER. This is why, at line 16 of FIG. 12F, the set called all_story_elements is determined. In FIGS. 12G-12I, all_story_elements is determined that line 7.

For FIG. 12F, in accordance with precedence table 130, application of a proximity rule can only be blocked by a pre-existing Priority 1 or proximity explanation. This is why, at lines 20 and 22, the predicates "consequent_of priority1" and "consequent_of proximity" are tested. If these two predicates are false, then the actions taken, at lines 26, 30, and 31, of FIG. 12F, are the same as those discussed above, that occur in FIGS. 12D and 12E (at lines 12, 21, and 22).

FIG. 12G is the same as FIG. 12F, except, in addition to testing the predicates consequent_of priority1 (at line 11 in FIG. 12G), and consequent_of proximity (at line 13 in FIG. 12G), the predicate "consequent_of explanatory" is also tested (at line 15 of FIG. 12G).

FIG. 12H is the same as FIG. 12G, except that, in addition to the predicates tested in FIG. 12G, the predicate "consequent_of abductive" is tested (at line 17 of FIG. 12H).

FIG. 12I is the same as FIG. 12H, except that, in addition to the predicates tested in FIG. 12H, the predicate "consequent_of presumptive" is tested (at line 19 of FIG. 12I).

Once all the implicit rule types have been tried, for the current iteration of SE_INFER, preparation for the next iteration of SE_INFER is performed at lines 4-5 of FIG. 12J. Since, by line 4, the new_story_elements have been fully tested for any implications they may cause, they can be added to the current time_step that is under construction. At line 5, new_story_elements gets the contents of next_new_story_elements. Once the code falls through line 11, of FIG. 12J, it is known that the current sentence of the input story has been fully considered. Therefore, the time step corresponding to this current sentence has been fully constructed. Thus, at line 15 of FIG. 12J, this latest-to-be-constructed time step can be added onto the end of the interpretation sequence (this type of concatenation, or list-element-appending operation, is represented at line 15 by the "+" symbol). Once the code falls through line 17, the entire input story has been processed, and the complete interpretation sequence can be returned, as the value of build EG, at line 19.

2.4 Execution of Pseudo-Code

A step-by-step simulated execution of build-EG, as depicted in FIGS. 13-20, is now described. As has already been discussed above (see section 2.3), each of FIGS. 13-20 has an "A" version, and a "B" version. The "A" figures (i.e., FIGS. 13A, 14A, 15A, 16A, 17A, 18A, 19A, and 20A) describe the operation using a directed graph representation. The "B" figures (i.e., FIGS. 13B, 14B, 15B, 16B, 17B, 18B, 19B, and 20B) describe the same step, in the operation of the pseudo-code, using the parentheses-based representation.

As already discussed above, FIGS. 13A and 13B describe processing, by build_EG, of sentence 1 of FIG. 2B. As can be appreciated, because this is a compound sentence, this sentence will result in three iterations of the "for" loop, that begins at line 32 of FIG. 12A. Each of these iterations will, in turn, create a semantic model of the non-compound sentence with the function generate-semantic-model (line 36 of FIG. 12A), and cause a single iteration of the loop SE_INFER (that begins at line 17 of FIG. 12C) with no implicit story elements produced. The explicit parentheses-based representations produced are shown as story elements 801-803 of FIG. 13B. Rather than use graphical techniques, to indicate story elements 801-803 as explicit, each parenthesis-based representation is given the "Explicit:" prefix.

Figures 14A, 14B:
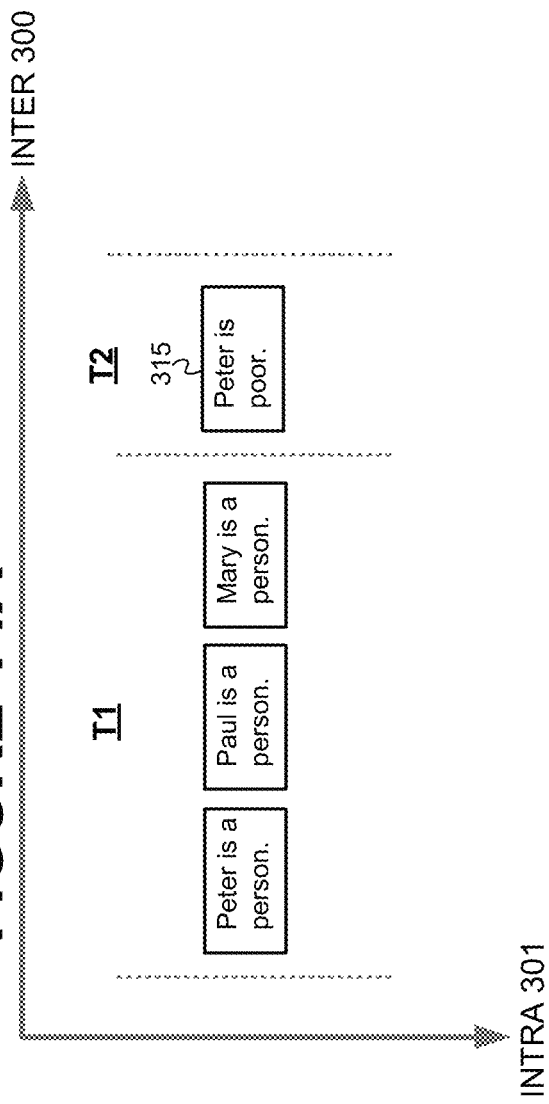

Next, sentence 2 of input story 200 is processed. It results in one call to generate-semantic-model, where explicit story element 811, of FIG. 14B, is produced. SE_INFER finds no implicit story elements.

The processing of sentence 3 of input story 200 results in one call to generate-semantic-model, which produces explicit story element 900 of FIG. 15B. For this story element however, in comparison to the earlier ones produced, the recursive-decomposition function of FIG. 12B, line 13, produces additional explicit story elements. Connective story element 900 is divided into two atomic story elements, labeled 820 and 821, in FIG. 15B. These two atomic story elements are added to time step T3, along with story element 900. SE_INFER, however, still finds no implicit story elements.

Figure 16A:
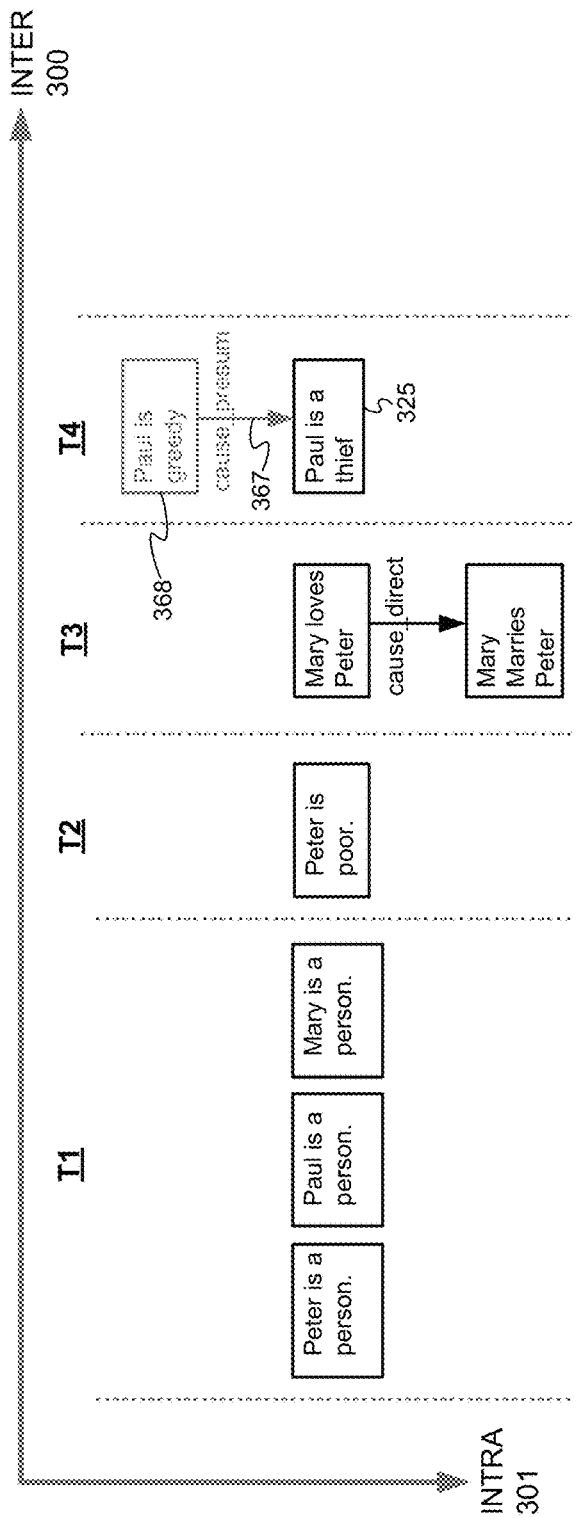
Figure 16B:
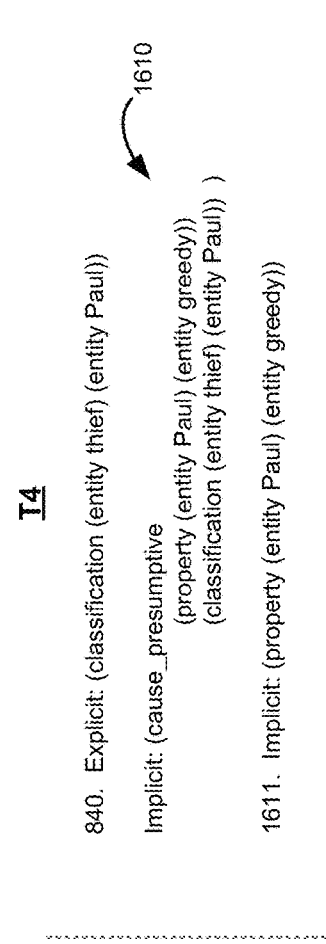

The processing of sentence 4 of input story 200 results in one call to generate-semantic-model, which produces explicit story element 840 of FIG. 16B. The call to recursive-decomposition (FIG. 12B, line 13) produces no additional explicit story elements. SE_INFER, however, finds that presumptive rule 451 (FIG. 4E) is triggered. Therefore, per the call to apply-rule, at line 24 of FIG. 12I, story elements 1610 and 1611 are produced and added to time step T4. The implicit nature, of each of story elements 1610 and 1611, is indicated by each having the "Implicit:" prefix.

Figure 17A:
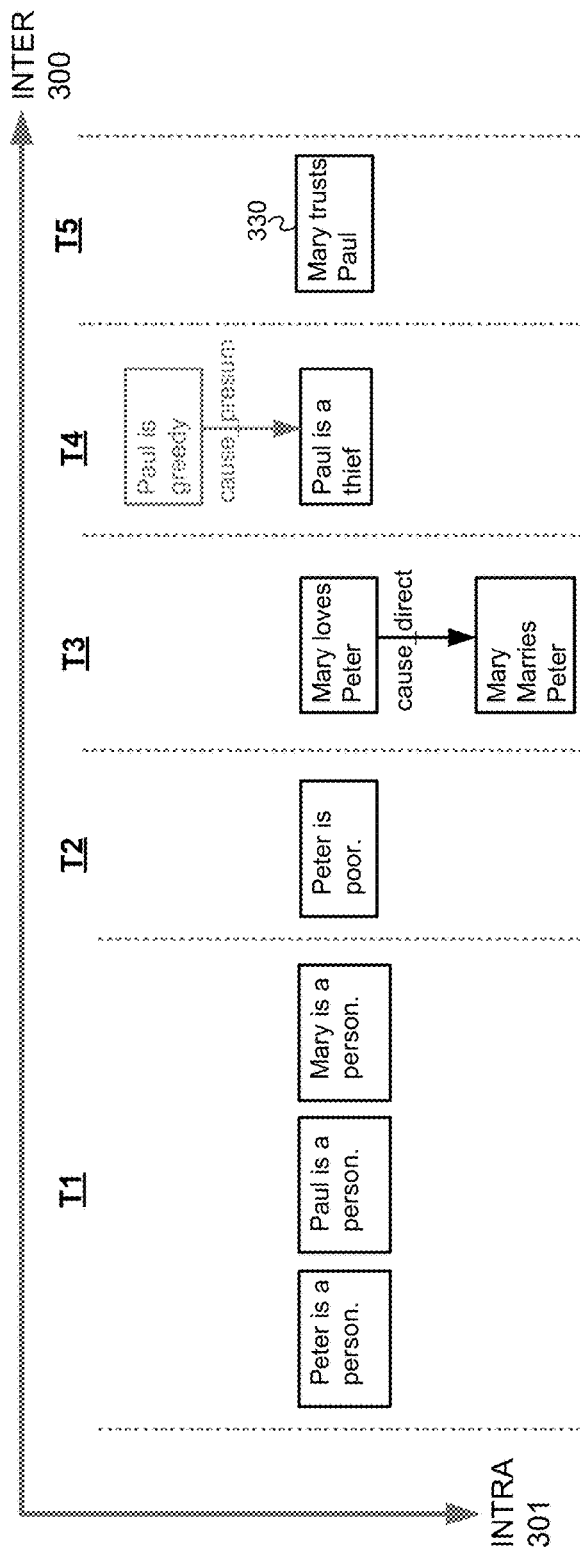
Figure 17B:
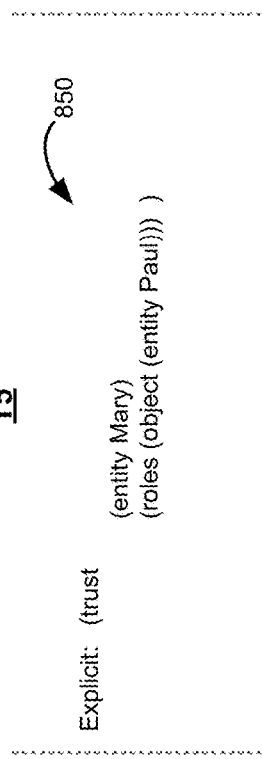
Figure 18A:
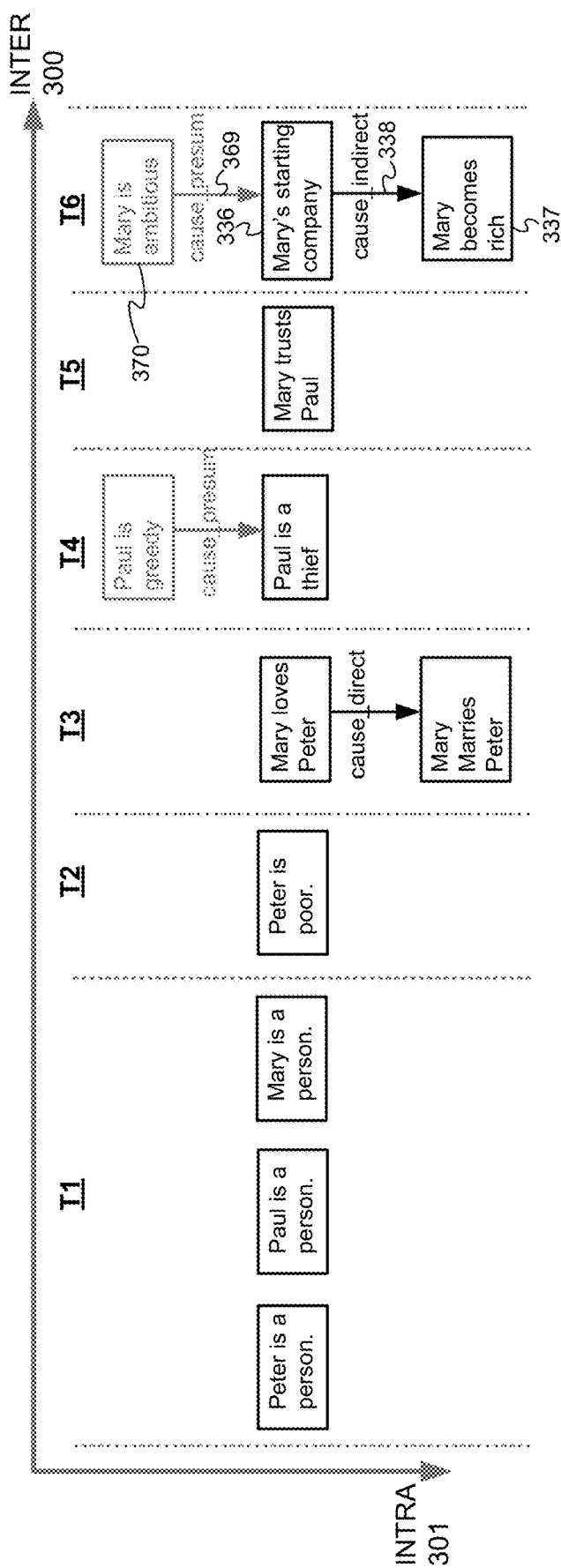

Next, sentence 5 of input story 200 is processed. It results in one call to generate-semantic-model, where explicit story element 850, of FIG. 17B, is produced. SE_INFER finds no implicit story elements.

The processing of sentence 6 of input story 200 results in one call to generate-semantic-model, which produces explicit story element 910 of FIG. 18B. The recursive-decomposition function, of FIG. 12B, line 13, divides 910 into two explicit atomic story elements, labeled 860 and 861. These two atomic story elements are added to time step T6, along with story element 910.

Next, the processing of sentence 6 continues, with SE_INFER finding that presumptive rule 450 is triggered (as was discussed above, an overview of rule 450 is shown in FIG. 4E, and a detailed implementation is presented in FIG. 11E). As can be seen from FIG. 11E, the results are as follows:

Pattern 1143 produces implicit connective story element 1810, of FIG. 18B.

Pattern 1144 produces, as an independent implicit story element 1811, the antecedent portion of 1810.

Next, sentence 7 of input story 200 is processed. It results in one call to generate-semantic-model, where explicit story element 870, of FIG. 19B, is produced. On a first iteration of SE_INFER, deductive rule 410 (overviewed in FIG. 4A) is executed (by a call to rule-apply, at line 12 of FIG. 12D). As was discussed above (i.e., section 2.2.3), a detailed implementation of rule 410 is shown in FIG. 11A. As can be seen from FIG. 11A, the results are as follows:

Pattern 1108 produces implicit connective story element 1910, of FIG. 19B.

Pattern 1109 produces, as an independent implicit story element 1911, the consequent portion of 1910.

Both 1910 and 1911 are saved, for a second iteration of SE_INFER, in next_new_story_elements.

Later, in the same first iteration of SE_INFER that executes rule 410, explanatory rule 420 is found applicable (overviewed in FIG. 4B). As was discussed above (i.e., section 2.2.3), a detailed implementation of rule 420 is shown in FIG. 11B. As can be seen from FIG. 11B, rule 420 is triggered because:

The pattern of trigger 1110 is found, in the interpretation_sequence thus far constructed, as story element 861 of FIG. 18B.

The pattern of trigger 1111 is found, in the interpretation_sequence thus far constructed, as story element 850 of FIG. 17B.

The pattern of trigger 1112 is found, in the interpretation_sequence thus far constructed, as story element 840 of FIG. 16B.

The pattern of trigger 1113 is found, in the current value of new_story_elements. new_story_elements contains the explicit story element 870, as pictured in FIG. 19B.

Trigger 1114 is triggered, upon a review of all_story_elements (produced at line 7 of FIG. 12G). This is because the predicates of FIG. 12G, at lines 11, 13, and 15, are all found false:

Story element 870 is not found to already be a consequent of a Priority 1 causal connection.

Story element 870 is not found to already be a consequent of a proximity causal connection.

Story element 870 is not found to already be a consequent of a pre-existing explanatory causal connection.

As can be seen from FIG. 11B, the result is as follows:

Pattern 1115 produces implicit connective story element 1912, of FIG. 19B. It is of type cause_explanatory.

On a second iteration of SE INFER, deductive rule 411 is executed. This is because, on the second iteration, story element 1911 is available in new_story_elements, for purposes of triggering a rule. As can be seen in FIG. 19B, the results of rule 411 are as follows:

Implicit connective story element 1913.

Implicit story element 1914, as an independent version of the consequent portion of 1913.

Finally, sentence 8 of input story 200 is processed. It results in one call to generate-semantic-model, where explicit story element 920, as shown in FIG. 20B, is produced. A semantic decomposition of 920, causes explicit story elements 880 and 881 to be added. This is because 880 and 881 are, respectively, independent story element versions of the antecedent and consequent of 920.

On a first iteration of SE_INFER, deductive rule 412 (overviewed in FIG. 4A) is executed (by a call to rule-apply, at line 12 of FIG. 12D). As can be seen from FIG. 20B, the results are as follows:

Implicit connective story element 2010.

Implicit story element 2011, as an independent version of the consequent portion of 2010.

Next, in this same first iteration of SE_INFER, enabling rule 460 (overviewed in FIG. 4F) is executed (by a call to rule-apply, at line 12 of FIG. 12E). As was discussed above (i.e., section 2.2.3), a detailed implementation of rule 460 is shown in FIG. 11F. As can be seen from FIG. 11F, rule 460 is triggered because:

The pattern 1146 of trigger 1145 is found, in the new_story_elements, as story element 880 of FIG. 20B.

The results of FIG. 11F are as follows:

Pattern 1148 produces implicit connective story element 2012, of FIG. 20B.

Pattern 1149 produces, as an independent implicit story element 2013, the antecedent portion of 2012.

Next, in this same first iteration of SE_INFER, explanatory rule 421 (overviewed in FIG. 4B) is executed (by a call to rule-apply, at line 19 of FIG. 12G). This is because of the following:

"xx angers yy" matches story element 1914 of FIG. 19B.

"yy kills xx" matches story element 881 of FIG. 20B.

The predicates of FIG. 12G, at lines 11, 13, and 15, are all found false:

Story element 881 is not found to already be a consequent of a Priority 1 causal connection.

Story element 881 is not found to already be a consequent of a proximity causal connection.

Story element 881 is not found to already be a consequent of a pre-existing explanatory causal connection.

The result of rule 421 being triggered is the production of explanatory element 2014 of FIG. 20B.

Finally, and still in the same first iteration of SE_INFER, abductive rule 440 (overviewed in FIG. 4D) is tested for execution. A detailed implementation of rule 440 is shown in FIG. 11D. Although pattern 1131 of Trigger 1130 matches story element 881 of FIG. 20B, the abductive rule is blocked, by the "consequent_of explanatory" predicate, of line 15, FIG. 12H. This is because of explanatory link 2014. Even though 2014 was just created, in the same iteration of SE_INFER, it is still included in the all_story_elements, which is tested by the consequent_of explanatory predicate. This blocking, of abductive rule 440, is the one difference, between FIG. 3K (as determined in section 2.1.2) and FIG. 20A. As has been discussed above, the difference is due to the application of precedence table 130 for the production of FIG. 20A (and also for the production of FIG. 20B). Precedence table 130 was not applied in section 2.1.2.

3 SELECTION OF EXPLICIT STORY ELEMENTS

Once the interpretation sequence has been produced, the next major choice (represented by decision point 103 in FIG. 1A) is to choose the method, by which to decide whether an explicit story element, of the interpretation sequence, is to be included in the summary. Two main approaches, for accomplishing this selection, are presented:

1. Connection-based: production of a connection-based summary is represented by step 104.
2. Concept-based: production of a concept-based summary is represented by steps 105-107.

3.1 Connection-Based Selection

3.1.1 Procedure

In the case of a connection-based summary, two main tests are applied to each explicit story element of the interpretation sequence. As long as at least one of the two tests is satisfied, the story element is included in the summary:

Is the story element part of an instance of explicit causation (as either antecedent, consequent, or causal link between the two)?

Is the story element an antecedent for at least one instance of deductive causation, while not appearing as a consequent, for any other occurrences of deductive causation?

FIGS. 25A-25B present a more detailed pseudo-coded version of this procedure. The procedure "Connectedness-Summarization" begins at line 2 of FIG. 25A. The main "for" loop of the procedure, that causes each story element of the interpretation to be considered, begins at line 6. The current story element under consideration is assigned to story_element_1. Because of line 9, the story element currently assigned to story_element_1 is only subjected to further processing if it is explicit (determined by applying the predicate "get-explicit").

Line 12 of FIG. 25A tests whether story_element_1 is a connective story element (using the procedure "causal-connection"). If it is, line 14 causes it to be marked (using the procedure "mark-it") for inclusion in the summary.

If story_element_1 is not itself a connective story element, lines 18-23, of FIG. 25A, cause it to be tested for whether it is part of a connective story element. Thus, at line 18, a nested "for" loop is started, that loops over each story element of the interpretation sequence, assigning each story element to the variable story_element_2. If story_element_2 is explicit and connective (both of which are tested by line 19), line 21 tests for whether story_element_1 is embedded, as part of story_element_2. If the condition of line 21 is satisfied, then line 22 causes story_element_1 to be marked, for inclusion in the summary.

At line 3 of FIG. 25B, story_element_1 is tested for whether it is already marked for inclusion in the summary. If it has not already been marked, then we know that story_element_1 can only be included in the summary if it causes a deductive inference, but is not itself caused by another deductive inference.

At line 4 a nested "for" loop is started (nested with respect to the "for" loop of line 6 of FIG. 25A), that loops over each story element of the interpretation sequence, assigning each story element to the variable story_element_3. This "for" loop looks for a connective story element, representative of deduction, where story_element_1 is an antecedent. Line 7 determines whether story_element_3 is a deductive causal link, and line 10 determines whether story_element_1 is embedded, in the role of the antecedent, within story_element_3. If line 7 and line 10 are satisfied, then we know that story_element_1 acts as a cause.

In order for story_element_1 to be included in the summary, however, it must be shown that it is not, itself, the consequent of some other deduction. This is determined by lines 13-19. First, at line 13, it is assumed that story_element_1 is not a consequent of a deduction, by setting the variable caused_by_another to FALSE. Then, at line 15, a "for" loop is begun, that assigns each story element of the interpretation sequence to the variable story_element_4. If the current story element assigned to story_element_4 is both explicit and a deductive link (as determined by line 16), then it is tested (at line 17), for whether story_element_1 is embedded, within story_element_4, in the role of consequent. If story_element_1 is embedded as a consequent within story_element_4, the variable caused_by_another is set to TRUE (line 18). Thus, if the "for" loop of lines 15-19 completes, with caused_by_another still set to FALSE, then it is known that story_element_1 is not a consequent for any deductive causation.

At line 21, caused_by_another is tested, and, if it is FALSE, story_element_1 is marked for inclusion in the summary.

In the following two subsections, this connection-based procedure is applied to each version of FIG. 20: the directed graph version of FIG. 20A, and the parentheses-based representation of FIG. 20B.

3.1.2 Directed Graph Representation of Story Elements

FIG. 21 is the same as FIG. 20A, except that, following the procedure of section 3.1.1, FIG. 21 indicates the story elements that are selected for a connection-based summary. A story element of FIG. 21 is part of the summary if it is in dashed form.

FIG. 20A contains a total of 16 explicit story elements (for a listing of all 16 explicit story elements see "Additional Information" section 6).

In FIG. 21, however, only 10 explicit story elements are marked for inclusion in a summary. In time step order, these 10 explicit story elements are as follows:

1. Connective story element 323, of type cause_direct, that connects "Mary loves Peter" to "Mary marries Peter."
2. The atomic story element "Mary loves Peter" (321).
3. The atomic story element "Mary marries Peter" (322).
4. Connective story element 338, of type cause_indirect, that connects "Mary's starting a company" to "Mary becomes rich."
5. The atomic story element "Mary's starting a company" (336).
6. The atomic story element "Mary becomes rich" (337).
7. The atomic story element "Paul swindles Mary" (340).
8. Connective story element 348, of type cause_means, that connects "Mary stabs Paul" to "Mary kills Paul."
9. The atomic story element "Mary stabs Paul" (346).
10. The atomic story element "Mary kills Paul" (347).

While there are other ways to measure it, herein, we will measure story reduction as follows: by comparing the number of explicit story elements selected for a summary, against the number of explicit story elements in the interpretation sequence from which the summary is selected.

In this case, the interpretation sequence, produced from input story 200, has a starting size of 16 explicit story elements. A count of these 16 elements can be found in section 6.2.

Thus, connectedness summarization has achieved a reduction of 6 story elements, from the starting size of 16 story elements. As a percentage of 16, the reduction of 6 is a reduction of 37.5%.

3.1.3 Parenthesis-Based Representation of Story Elements

In terms of the parenthesis-based representation, going in order from T1 to T8, across FIGS. 8A-8H and FIGS. 9A-9C, the following is a listing of the 10 explicit story elements, selected for inclusion in the summary:

1. Connective story element 900, of type cause_direct.
2. Atomic story element 820.
3. Atomic story element 821.
4. Connective story element 910, of type cause_indirect.
5. Atomic story element 860.
6. Atomic story element 861.
7. Atomic story element 870.
8. Connective story element 920, of type cause_means.
9. Atomic story element 880.
10. Atomic story element 881.

3.2 Concept-Based Selection

3.2.1 Concept Identification

As shown in FIG. 1A, production of a concept-based summary begins with the identification of one or more "concepts" (the identification of such concepts represented by step 105). FIGS. 5A-5D depict specifications for four example concepts:

FIG. 5A depicts a version of the concept of "murder," as a rule 510.

FIG. 5B depicts a version of the concept of "tragic greed," as a rule 520.

FIG. 5C depicts a version of the concept of "ambition rewarded," as a rule 530.

FIG. 5D depicts a version of the concept of "regicide," as rules 540 and 541.

Like the implicit causation rules of FIGS. 4A-4F, the concepts are specified in stylized English sentences. The two major differences, between the rules of FIGS. 4A-4F and the concepts of FIGS. 5A-5D, are as follows:

A concept can use a new "leads_to" operator.

A concept can be specified by more than one stylized sentence, such as the "regicide" concept of FIG. 5D.

The leads_to operator is not an explicit specification of indirect causation, as was discussed above with respect to certain transitive phrasal verbs, like "leads to." Instead, leads_to, as used in a concept specification, means that an antecedent and consequent story element are connected through one or more causal links. Further, the one or more causal links, connecting the antecedent and consequent, can be of any type (e.g., can be any of the three explicit, and six implicit, types discussed above).

Approaches to concept recognition, under the directed graph and parentheses-based representations, are presented, respectively in the following sections 3.2.1.1 and 3.2.1.2.

3.2.1.1 Directed Graph Representation

Figure 22A:
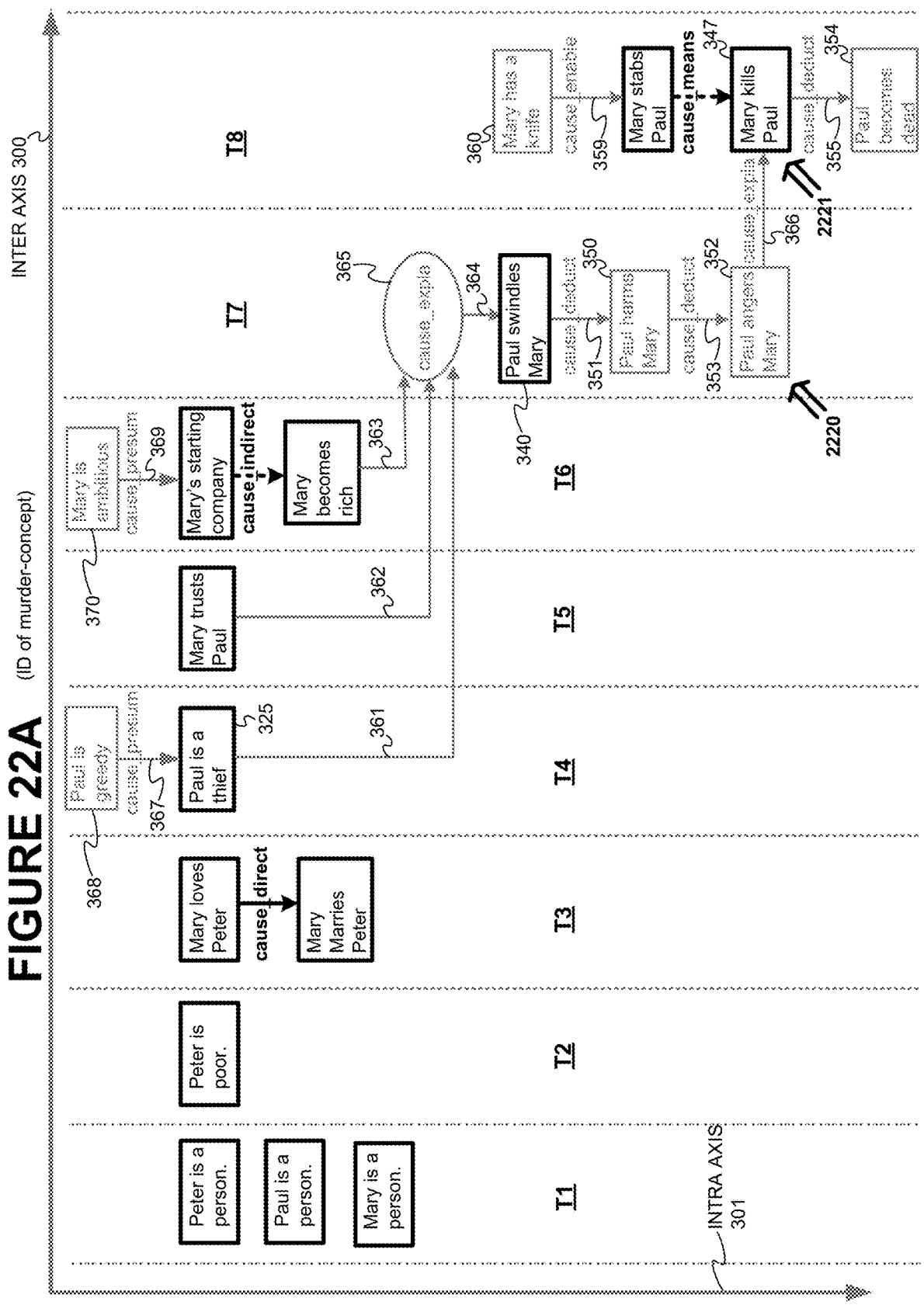

For example, with regard to the murder concept 510 of FIG. 5A, in an interpretation sequence, a story element meaning "xx angers yy" must be connected, through one or more causal links of any type, to a story element meaning "yy kills xx." With regard to the interpretation sequence of FIG. 20A, this concept is satisfied when Paul is assigned to meta-entity xx and Mary is assigned to meta-entity yy. In that case, implicit story element 352 ("Paul angers Mary") leads to, through explanatory causal link 366, explicit story element 347 ("Mary kills Paul"). The net result, as shown in FIG. 22A, is that story element 352 is marked as matching a specified trigger pattern of concept 510 (i.e., see arrow 2220), and that story element 347 is marked as matching a specified trigger pattern of concept 510 (i.e., see arrow 2221).

With regard to tragic greed concept 520, of FIG. 5B, a story element meaning "xx is greedy" must be connected, through one or more causal links of any type, to a story element meaning "xx becomes dead." With regard to the interpretation sequence of FIG. 22B, this concept is satisfied by the following sequence, that includes six causal connections:

"xx is greedy" is satisfied by story element 368 ("Paul is greedy"), when "Paul" is assigned to xx.

Story element 368 is connected to story element 325 ("Paul is a thief"), through cause_presumptive story element 367.

Story element 325 is connected to story element 340 ("Paul swindles Mary"), through cause_explanatory story element 365. In particular, story element 365 accomplishes the connection through its edges 361 and 364.

Story element 340 is connected to story element 350 ("Paul harms Mary"), through cause_deductive story element 351.

Story element 350 is connected to story element 352 ("Paul angers Mary"), through cause_deductive story element 353.

Story element 352 is connected to story element 347 ("Mary kills Paul"), through cause_explanatory story element 366.

Story element 347 is connected to story element 354 ("Paul becomes dead"), through cause_deductive story element 355.

"xx becomes dead" is satisfied by story element 354, when maintaining the assignment, of the first step of the sequence, of "Paul" to xx.

The net result, as shown in FIG. 22B, is that story element 368 is marked as matching a specified trigger pattern of concept 510 (i.e., see arrow 2210), and that story element 354 is marked as matching a specified trigger pattern of concept 510 (i.e., see arrow 2211).

3.2.1.2 Parenthesis-Based Representation

Figure 11G:
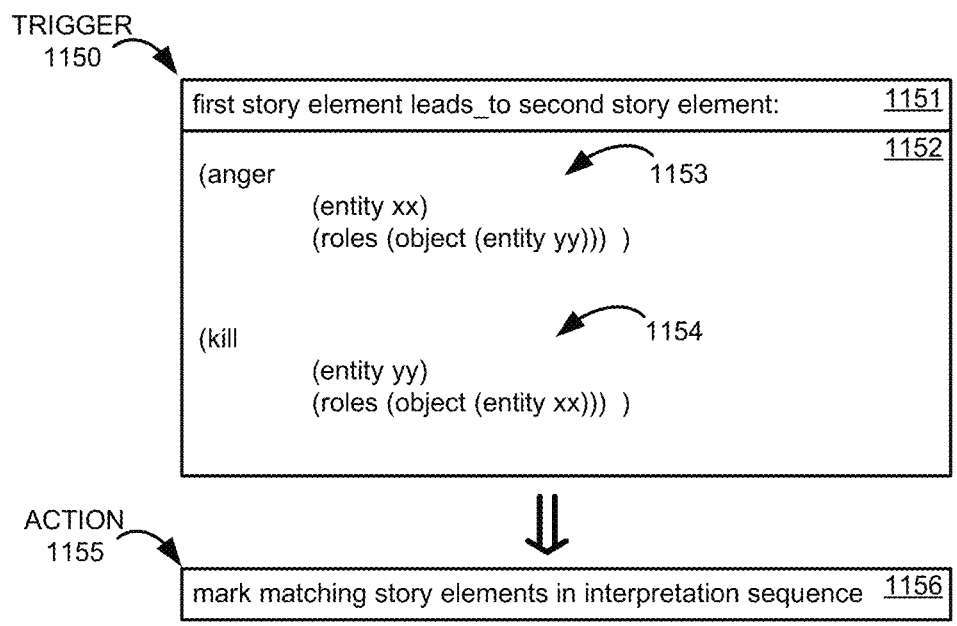
FIG. 11G depicts an implementation of a concept rule 510, using the parentheses-based representation.

FIG. 11G depicts an implementation of a concept rule 510, using the parentheses-based representation. As can be seen, the implementation consists of a trigger portion 1150 and an action portion 1155. Within the trigger 1150, there is procedural part 1151, and pattern part 1152. Within action portion 1155, is just shown a procedural part 1156. Trigger 1150 is satisfied when all of the following conditions are met:

A story element is found that matches first pattern 1153.

A story element is found that matches second pattern 1154.

The story element matching pattern 1153 is found to lead_to, through one or more causal connections (of any type), the story element matching pattern 1154.

If the trigger is satisfied, then action procedure 1156 marks the story elements, in the interpretation sequence, matching the trigger patterns. This marking then serves at least the two following functions:

Provides starting points for counter-causal search, in order to generate concept-based summaries.

Provides a record, of the fact of the concept being found, so that, if selected, it can be reported.

From the above discussion of FIG. 11G, it can be appreciated that a concept rule is very similar to the story-element-finding rules of FIGS. 11A-11F. In fact, there are only two significant differences:

The trigger can include a new leads_to operator.

The action contains only a procedural portion, and not a pattern for creating story elements.

Regarding the latter difference, depending upon the application, it can be useful to include a pattern as part of the action portion. For example, with regard to action portion 1155, in addition to procedural part 1156, it can be useful to include the following pattern (that we shall refer to as pattern 1157):

(murder
    (entity yy)
    (roles (object (entity xx))))

Regarding the interpretation sequence of FIGS. 13-20, it can be seen that all requirements of trigger 1150 can be satisfied as follows:

Pattern 1153 is satisfied by story element 1914 (of FIG. 19B).

Pattern 1154 is satisfied by story element 881 (shown in FIG. 20B).

Story element 1914 leads to story element 881, through explanatory causal connection 2014 (of FIG. 20B).

In that case, with "Paul" assigned to xx and "Mary" assigned to yy, above-listed pattern 1157 can produce the following new implicit story element:

(murder
  (entity Mary)
  (roles (object (entity Paul))))

This new story element can be added to the interpretation sequence, and thereby open the possibility that additional inference rules can be triggered. Just as with the creation of implicit story elements with inference rules, a story element created by a concept rule can be put in the most-recent time step, on which its creation depended.

Figure 11H:
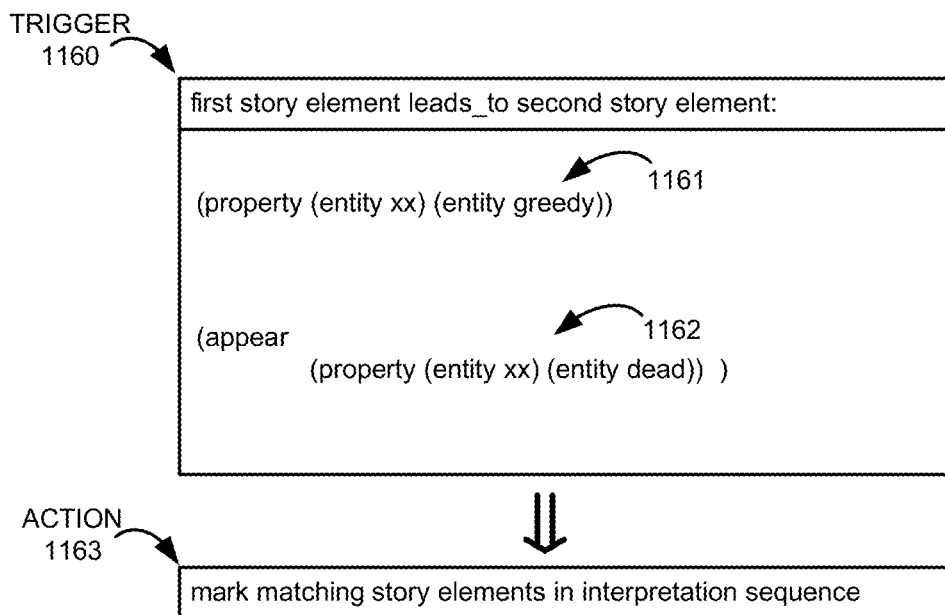
FIG. 11H depicts an implementation of a concept rule 520, using the parentheses-based representation.

FIG. 11H depicts an implementation of a concept rule 520, using the parentheses-based representation. It consists of a trigger portion 1160, and an action portion 1163. Trigger 1160 is satisfied when all of the following conditions are met:

A story element is found that matches first pattern 1161.

A story element is found that matches second pattern 1162.

The story element matching pattern 1161 is found to lead_to, through one or more causal connections, the story element matching pattern 1162.

Regarding the interpretation sequence of FIGS. 13-20, it can be seen that all requirements of trigger 1160 can be satisfied as follows:

Pattern 1161 is satisfied by story element 1611 (of FIG. 16B).

Pattern 1162 is satisfied by story element 2011 (shown in FIG. 20B).

Story element 1611 leads to story element 2011, through the following six causal connections:

Presumptive story element 1610 leads from story element 1611 to story element 840 (see FIG. 16B).

Explanatory story element 1912 leads from story element 840 to story element 870 (see FIG. 19B).

Deductive story element 1910 leads from story element 870 to story element 1911.

Deductive story element 1913 leads from story element 1911 to story element 1914.

Explanatory story element 2014 leads from story element 1914 to story element 881 (see FIG. 20B).

Deductive story element 2010 leads from story element 881 to story element 2011 (see FIG. 20B).

3.2.2 Metrics

The use of metrics, represented by step 106 of FIG. 1A, is optional. For the concepts identified in step 105 of the process, it can simply be the case that all such concepts are utilized in step 107. Step 107 is where the explicit story elements, that are to be included in the summary, are identified (by contra-causal search, from the selected concepts).

However, a metric can be used to select only a subset, of the concepts identified in step 105. For example, in accordance with an appropriate metric, the most important concept or concepts can be identified, so that a more compact summary, a more targeted summary, or both, can be achieved. The concepts can be ranked in order of decreasing importance, and the most important concept selected, or the n highest-ranked concepts selected. The selected concepts then serve as the basis, for choosing the explicit story elements included in the summary.

One metric is the number of story elements comprising a concept instance. For a concept defined with the leads_to operator, this can be the number of story elements traversed, in going from the antecedent story element to the consequent story element, over the one or more causal links required.

For example, as was discussed above for murder concept 510, the instance found in the interpretation sequence (as represented by the "B" figures) has the following three story elements:

1. Antecedent, with respect to murder concept, story element 1914.
2. Consequent, with respect to murder concept, story element 881.
3. Story element 2014, which connects 1914 to 881 through a cause_explanatory link.

For tragic greed concept 520, the instance found has the following story 13 elements:

1. Antecedent, with respect to tragic greed concept, story element 1611.
2. Presumptive story element 1610.
3. Consequent, relative to cause_presumptive, story element 840.
4. Explanatory story element 1912.
5. Consequent, relative to cause_explanatory, story element 870.
6. Deductive story element 1910.
7. Consequent, relative to cause_deductive, story element 1911.
8. Deductive story element 1913.
9. Consequent, relative to cause_deductive, story element 1914.
10. Explanatory story element 2014.
11. Consequent, relative to cause_explanatory, story element 881.
12. Deductive story element 2010.
13. Consequent, with respect to tragic greed concept, story element 2011.

Thus, with regard to the number of story elements covered, the tragic greed concept (with a score of 13) appears to be much more important, to input story 200, than is the murder concept (with a score of 3).

Another metric can be the time span covered (or number of transitions between time steps covered) by a concept instance. For a concept defined with the leads_to operator, this can be the number of transitions between time steps covered, in going from the antecedent story element to the consequent story element, over the one or more causal links required.

For example, for murder concept 510, the instance found in the interpretation sequence covers one transition between time steps. This is the transition from time step T7 to T8, traversed as a result of going from antecedent story element 1914 to consequent story element 881.

As another example, for tragic greed concept 520, the instance found in the interpretation sequence covers four transitions between time steps:

Three time step transitions are traversed, in going from initial story element 1611 at time step T4, to story element 870 at time step T7.

One time step transition is traversed, in going from story element 870 at time step T7, to final story element 2011 at time step T8.

Thus, with regard to the number of transitions between time steps, the tragic greed concept (with a score of 4)

appears to be much more important, to input story 200, than is the murder (with a score of 1).

Another metric can be formed from the combination of the two metrics (number of story elements, number of transitions) just discussed above. One way to do this, is to sum together, for each concept instance, the score obtained under each metric:

Tragic greed concept=13 story elements covered+4 transitions covered=17

Murder concept=3 story elements covered+1 transition covered=4 Before summing the metrics together, each can be multiplied by a weighting factor.

3.2.3 Contra-Causal Search

Regardless of how selected (with metrics or not), once a concept instance is selected, it can be utilized as follows, in order to select explicit story elements for inclusion in the output summary.

Regarding a concept with a trigger pattern that includes one or more leads_to operators, the following process can be used. Each operand, of each leads_to operator, can be used as a starting point, for a contra-causal search of the interpretation sequence (see step 107 of FIG. 1A). This contra-causal search can operate as follows:

1. First, if the starting point is an explicit story element, it is marked for inclusion in the summary.
2. Next, each causal link, with the starting point as consequent, is identified:
   2.1. If the causal link is explicit, mark it for inclusion in the summary.
   2.2. For each antecedent of the current causal link:
      2.2.1. Recursively restart this process with the current antecedent as starting point.

More specifically, FIG. 26 depicts an example pseudo-coded contra-causal search procedure "ConceptSummarization." ConceptSummarization begins on line 3, where it can be seen that an interpretation sequence and starting point are passed as inputs. For example, with respect to FIG. 22A, the interpretation_sequence can be the entirety of the figure, with the starting point being either story element indicated by arrow 2220 or 2221.

At line 7, the starting_point is tested for whether it is an explicit story element. If it is, it is marked for inclusion in the summary (at line 8).

Because of lines 11 and 14, each story element is found (referred to as story_element_1), that is connective and has starting_point in its consequent. Because of lines 17 and 19, if story_element_1 is explicit, it is marked for inclusion in the summary.

Next, the antecedents to story_element_1 are found at line 21. Because of lines 23-25, each antecedent found is used as the basis for a recursive invocation of ConceptSummarization.

Following this procedure, FIG. 23 depicts the explicit story elements, of FIG. 20A, that are selected, for a summary based on murder concept 510 of FIG. 5A. As with the connection-based summary of FIG. 21 (and section 3.1), a story element of FIG. 23 is indicated, as being a part of the summary, if it is in dashed form. Arrows 2220 and 2221 continue to indicate the two story elements 352 and 347, that directly matched each operand of the concept's leads_to operator.

It can be readily observed, that a counter-causal search from the story element indicated by arrow 2221, is a superset of a counter-causal search from the story element indicated by arrow 2220. This is because a counter-causal search, from story element 347, will necessarily traverse explanatory causation link 366, and thereby reach, as part of its counter-causal search, the story element indicated by arrow 2220.

A possible sequence, of a counter-causal search starting at story element 347, is the following listing. In the following listing, greater indentation corresponds to greater recursion level. Each explicit story element traversed is emphasized, by being in all capital letters and boldface:

1. EXPLICIT STORY ELEMENT 347 ("Mary kills Paul") is the starting point.
2. Story element 347 is found to have the two following antecedents:
   a. EXPLICIT STORY ELEMENT 346 ("Mary stabs Paul"), connected to 347 through EXPLICIT CONNECTIVE LINK 348.
      i. Implicit story element 360 ("Mary is a knife"), connected to 346 through implicit connective link 359.
   b. Implicit story element 352 ("Paul angers Mary"), connected to 347 through implicit connective link 366.
      i. Implicit story element 350 ("Paul harms Mary"), connected to 352 through implicit causal link 353.
         1. EXPLICIT STORY ELEMENT 340 ("Paul swindles Mary"), connected to 350 through implicit causal link 351.
         2. Story element 340 is found to have the following three antecedents:
            a. EXPLICIT STORY ELEMENT 325 ("Paul is a thief"), connected to 340 through implicit causal link 365.
               i. Implicit story element 368 ("Paul is greedy"), connected to 325 through implicit causal link 367.
            b. EXPLICIT STORY ELEMENT 330 ("Mary trusts Paul"), connected to 340 through implicit causal link 365.
            c. EXPLICIT STORY ELEMENT 337 ("Mary becomes rich"), connected to 340 through implicit causal link 365.
               i. EXPLICIT STORY ELEMENT 336 ("Mary's starting company"), connected to explicit story element 337 through EXPLICIT CAUSAL LINK 338.
                  1. Implicit story element 370 ("Mary is ambitious"), connected to 336 through implicit causal link 369.

As can be seen in the above listing, the counter-causal search results in the identification of 9 explicit story elements. Thus, in this case, the original input story 200 has been reduced in size by 7 story elements, from a starting size of 16 story elements, a reduction of 43.8%.

4 REPORTING OPTIONS

Now that the primary summarization functionality, of reducing the amount of explicit textual material to be included, has been described, we will address options-selecting step 108. Step 108 is representative of the fact that certain options can be applied, regarding the explicit and implicit story elements for inclusion in the summary.

4.1 Means-Type Causation

For example, regarding the explicit story elements that have thus far been selected for inclusion in the summary, it can sometimes be desirable to omit the means-type causal information. This is because, for a summary, it is often unnecessary to include the details, of how certain actions are accomplished.

For example, regarding sentence 8 of input story 200 (FIG. 2B), consider a situation where one needs to make a choice, between the two following options for reporting on the sentence's content:
1. Reporting that Paul was killed by Mary, and not knowing how the killing was done.
2. Reporting that Mary stabbed Paul, without knowing what happened to Paul as a result of the stabbing.

At least for purposes of a higher-level summary, an average reader would regard option one as providing the more important item of information. Step 108 of FIG. 1A depicts the default option as being the reporting of means-type causation, with the end-user having the option to suppress such reporting. However, depending upon the application, the setting of this option can be reversed. In that case, suppression of means-type causation becomes the default option, and the end-user has the option to include such information.

FIG. 24A depicts the same connection-based selection of explicit story elements, as is shown in FIG. 21, except story elements providing means type information are no longer selected for inclusion in the summary. More specifically, the cause_means connective story element 348, and atomic story element 346 have been omitted.

FIG. 24B depicts the same murder-concept-based selection of explicit story elements, as is shown in FIG. 23, except story elements providing means type information are no longer selected for inclusion in the summary. More specifically, the cause_means connective story element 348, and atomic story element 346 have been omitted.

4.2 Implicit Causation

Regarding the six types implicit of causation addressed in section 2.1.2, only the deductive causal type, is excluded as an option for reporting.

Regarding the other five types, depending upon the situation, a user may wish to include any combination of them in the output summary. Specifically, the five types of implicit causation, from among which a user may wish to select, are as follows:
proximity causation (cause_proximity),
explanatory causation (cause_explanatory),
abductive causation (cause_abductive),
presumptive causation (cause_presumptive), and
enabling causation (cause_enabling).

Step 108 presents, as the default, a user not wishing to report any of them. However, depending upon the application, the default can be that all are reported, and the user given the option to not report any combination of them.

Reporting of implicit causation may appear unnecessary, because an average reader can be expected, eventually, to make these types of implicit connections anyway. However, a reader may be able to absorb a summary faster, if implicit causal connections are provided. In other words, provision of the implicit causal connections can actually allow the summarizer to do some of the thinking for the reader.

With regard to deductive-type inferences, they are not provided, as an option for reporting, because they are considered too obvious, to provide any significant time-saving advantage to the reader. In fact, inclusion of deductive-type causation can even slow the summary-reading process. For example, inclusion of deductive-type inferences can annoy the reader. As another example, deductive-type inferences can cause a reader to waste time wondering, whether he/she is misunderstanding the deduction, because such low utility information is not expected in a summary.

In their usual mode of operation, deductive, abductive, presumptive, and enabling causation tend to accomplish intra-time-step augmentation of an interpretation sequence. This is because these rules are designed with the objective of adding both a story element and a link to the newly-added element.

In contrast, since explanatory and proximity causation look only for opportunities to introduce additional connections, in general, the odds are higher, that these causal types will cause an inter-time-step connection. Proximity causation, in particular, looks for semantics that would tend to be in separate, but immediately adjacent, sentences. In general, one can expect inter-time-step (or inter-sentence) inferences to be more difficult to identify, and therefore more useful to a summary reader, than intra-time-step (or intra-sentence) inferences.

FIG. 27A is the same as FIG. 24B, except that the two explanatory causation links (365 and 366) are marked for inclusion in the summary. Including connective story element 365, does not result in any other story element additions, since the story elements it connects (325, 330, 337, and 340) are all explicit, and therefore already marked for inclusion in the summary. Regarding the inclusion of connective story element 366, however, it does result in implicit story element 352 being included in the summary.

Presumptive causation can also be helpful to include. Its speculative nature may make it take longer, for the average reader, to infer the possibility. FIG. 27B is the same as FIG. 27A, except that the two presumptive causation links (367 and 369) are marked for inclusion in the summary. The inclusion of these links also cause the inclusion of implicit story elements 368 ("Paul is greedy") and 370 ("Mary is ambitious").

5 RETEXTUALIZATION

The step described in this section, herein called "retextualization" (and numbered 109 in FIG. 1A), is concerned with taking the set of story elements selected, for inclusion in the output summary, and converting them back into a sequence of human-readable sentences.

The default procedure for this, is to visit each story element, and write out a text version of it, according to the order of the interpretation sequence's time steps. This is because this ordering hews most faithfully to the author's chosen order of presentation.

Within a time step, story elements can be a retextualized according to their causal ordering, relative to each other. For example, if two (or more) causal links are connected in series, each link will typically be retextualized in order of causation. As will be discussed further below, if a causal link is to be retextualized immediately after another retextualization of (at least) the link's antecedent, then only the consequent, of the causal link, need be retextualized. This kind of optimization is called post hoc ergo propter hoc (or PHEPH) optimization. PHEPH optimization can occur across time steps, and depends only upon ordering of the story elements, at the time of retextualization.

If a first and second story element share a common time step but are causally independent of each other, then the connectivity of each, with story elements of other time steps, can be analyzed according to a metric. The relative scores of the first and second story elements, according to the metric, can be used to determine their ordering, with respect to retextualization. As an example of connectivity with other time steps, the first story element has connectivity, with a third story element of another time step, if the third story element is embedded within the first story element. If the causally-independent story elements cannot be ordered based on connectivity with other time steps, then the ordering of their corresponding output sentences can be chosen arbitrarily.

5.1 without Options Applicable 5.1.1 Connection-Based Summary

For example, FIG. 28A depicts the same connection-based summary as shown in FIG. 21, except story elements not part of the summary (i.e., not selected for retextualization) are deleted.

Starting at time step T1, and advancing incrementally, the first non-empty time step is T3. As can be seen, T3 contains three story elements: connective story element 323, antecedent story element 321, and consequent story element 322. While having all three of the story elements present is useful for a directed graph representation, converting all three of them back into text would result in an unduly verbose summary. This is because the textual presentation of a connective story element inherently requires textual presentation of its antecedents and consequents. Therefore, as an optimization, only connective story element 323 is converted back into text.

More generally, assume a connective story element "cse_1" has been selected for inclusion in a summary, and that another story element "se_1" has also been selected. If se_1 is embedded in cse_1, as either antecedent or consequent, then only cse_1 need be converted into text. This optimization, which we will sometimes refer to as the "embedded-element optimization," applies regardless of whether se_1 and cse_1 are in the same time step.

This optimization can also be understood in terms of the parenthesis-based representation of T3, as shown in FIG. 15B. As can be seen, it only makes sense to convert story element 900 into text, as story element 821 is embedded as consequent, and story element 820 is embedded as the antecedent.

Thus far, therefore, the summary consists of only the following sentence:
Mary marries Peter because Mary loves Peter.
Continuing from left to right, the next non-empty time step to be encountered is T6. As with time step T3, T6 also contains a connective story element (in this case numbered 338), that couples an antecedent 336 to a consequent 337. Once again, as an optimization, only connective story element 338 is converted into text.

Now the summary consists of two sentences:
Mary marries Peter because Mary loves Peter. Mary's starting a company leads to Mary becoming rich.
For time step T7 there is only one story element, leading to a summary consisting of the following three sentences:
Mary marries Peter because Mary loves Peter. Mary's starting a company leads to Mary becoming rich. Paul swindles Mary.
Lastly, a time step T8, only connective story element 348 is converted into text, leaving out 346 and 347. Thus, the complete summary produced is as follows:
Mary marries Peter because Mary loves Peter. Mary's starting a company leads to Mary becoming rich. Paul swindles Mary. In order to kill Paul, Mary stabs Paul.

5.1.2 Concept-Based Summary

FIG. 29A presents the same murder-concept-based summary, as was previously discussed with respect to FIG. 23, except story elements not chosen for retextualization are deleted. Arrows 2220 and 2221 are kept, to indicate that murder concept 510 is still recognized. Converting the story elements, and identified concepts, of FIG. 29A, into sentence form, in time step order, produces the following summary: The story is about murder. Paul is a thief. Mary trusts Paul.
Mary's starting a company leads to Mary becoming rich. Paul swindles Mary. In order to kill Paul, Mary stabs Paul.
It is worth noting that the above summary begins with a statement identifying the
concepts upon which it is based. Since a concept is likely to represent the most complex reasoning, by a summarizer on the input story, it usually makes sense to list it first.

5.2 Options Applied

In addition to basing retextualization upon connection-based or concept-based selection, of explicit elements, the contents of a summary can be shaped by selection from a variety of options.

5.2.1 Without Means

For example, FIG. 28B is the same connection-based summary as FIG. 28A, except that the option to suppress reporting of means-type story elements has been selected. Therefore, story elements 346 and 348 are not considered, when producing the following summary:
Mary marries Peter because Mary loves Peter. Mary's starting a company leads to Mary becoming rich. Paul swindles Mary. Mary kills Paul.

5.2.2 without Means, with Explanations

As was already discussed in section 4.2, FIG. 27A is the same as the murder-concept-based summary of FIG. 23, except:
The option to suppress reporting of means-type story elements has been selected.
The option to include reporting of explanatory-type story elements has been selected.
FIG. 27B is the same as FIG. 27A, except that the option to include reporting of presumptive-type story elements has been selected.
Now, for purposes of retextualization, both FIGS. 27A and 27B are taken a step further.
FIG. 29B is the same as FIG. 27A, except for the following two differences:
Story elements not part of the summary are deleted.
Story elements are given the label number of their corresponding parentheses-based representation, in the "B" figures.
FIG. 29C is the same as FIG. 27B, except for the following two differences:
Story elements not part of the summary are deleted.
Story elements are given the label number of their corresponding parentheses-based representation, in the "B" figures.
FIG. 29B makes it clear that there are many opportunities to apply the embedded-element optimization. The most significant example is with respect to the cause_explanatory link 1912. As can be readily appreciated (by viewing 1912 in its parentheses-based form in FIG. 19B) the following elements are embedded in it:
  story element 840 of T4 (FIG. 16B),
  story element 850 of T5 (FIG. 17B),
  story elements 861 of T6 (FIG. 18B), and
  story element 870 of T7 (FIG. 19B).

The application of an embedded-element optimization is particularly dramatic for story elements 840 and 850, since their removal renders time steps T4 and T5 empty.

Regarding time step T6, connective story element 910 is still present. Story element 910 has its own embedded-element optimization effect, eliminating story element 860 (for purposes of retextualization).

With regard to connective story element 2014, embedded-element optimization permits elimination of story elements 1914 and 881.

In summary, at this point in the retextualization process, only the following three story elements remain, from FIG. 29B:
  cause_indirect link 910,
  cause_explanatory link 1912, and
  cause_explanatory link 2014.

Retextualizing just these three story elements results in the following summary:
  The story is about murder. Mary's starting a company leads to Mary's becoming rich. Paul swindles Mary, probably because Paul is a thief, Mary trusts Paul and Mary becomes rich. Mary kills Paul, probably because Paul angers Mary.

An additional optimization, that can be applied during retextualization, is called post hoc ergo propter hoc (or PHEPH) optimization. Literally, the Latin phrase means "after this therefore because of this." PHEPH optimization can be used to further reduce the textual length of a summary. While PHEPH is not a mathematical truth, it is often a good heuristic clue, when trying to determine the causes of an event. PHEPH appears to be a universal tendency of the human thought process, and it became a widely accepted writing technique, when human language transitioned from purely oral to written language.

With regard to the summary listed just-above, it can be seen that it still contains some redundancy: in both the first and second sentences there is embedded a statement about Mary being rich. The second instance of this statement is unnecessary, because the first instance appears in the immediately prior sentence. Because of PHEPH, even without a literal statement about Mary's wealth in the second sentence, an average reader understands, because it appeared in the first sentence, that it would be a factor in Paul's decision to swindle Mary.

In general, PHEPH optimization can be stated as follows:
  Assume there is a story element "A" that expresses a causal connection between one or more antecedents and one or more consequents.
  Assume that, immediately prior to the story element "A," there is a story element "B" that asserts one or more of the antecedents of the story element "A."
  For each antecedent of the story element "A," which is asserted in story element "B," the antecedent does not need to be retextualized, as part of the retextualization of the story element "A."

Within this general rule, connective story element 1912 fulfills the role of the story element "A," connective story element 910 fulfills the role of the story element "B," and "Mary becomes rich" is the antecedent of the story element "A" that is asserted by story element "B." Retextualizing story elements 910, 1912, and 2014, with PHEPH optimization included, produces the following summary:
  The story is about murder. Mary's starting a company leads to Mary's becoming rich. Paul swindles Mary, probably because Paul is a thief, and Mary trusts Paul. Mary kills Paul, probably because Paul angers Mary.

Figure 30A:
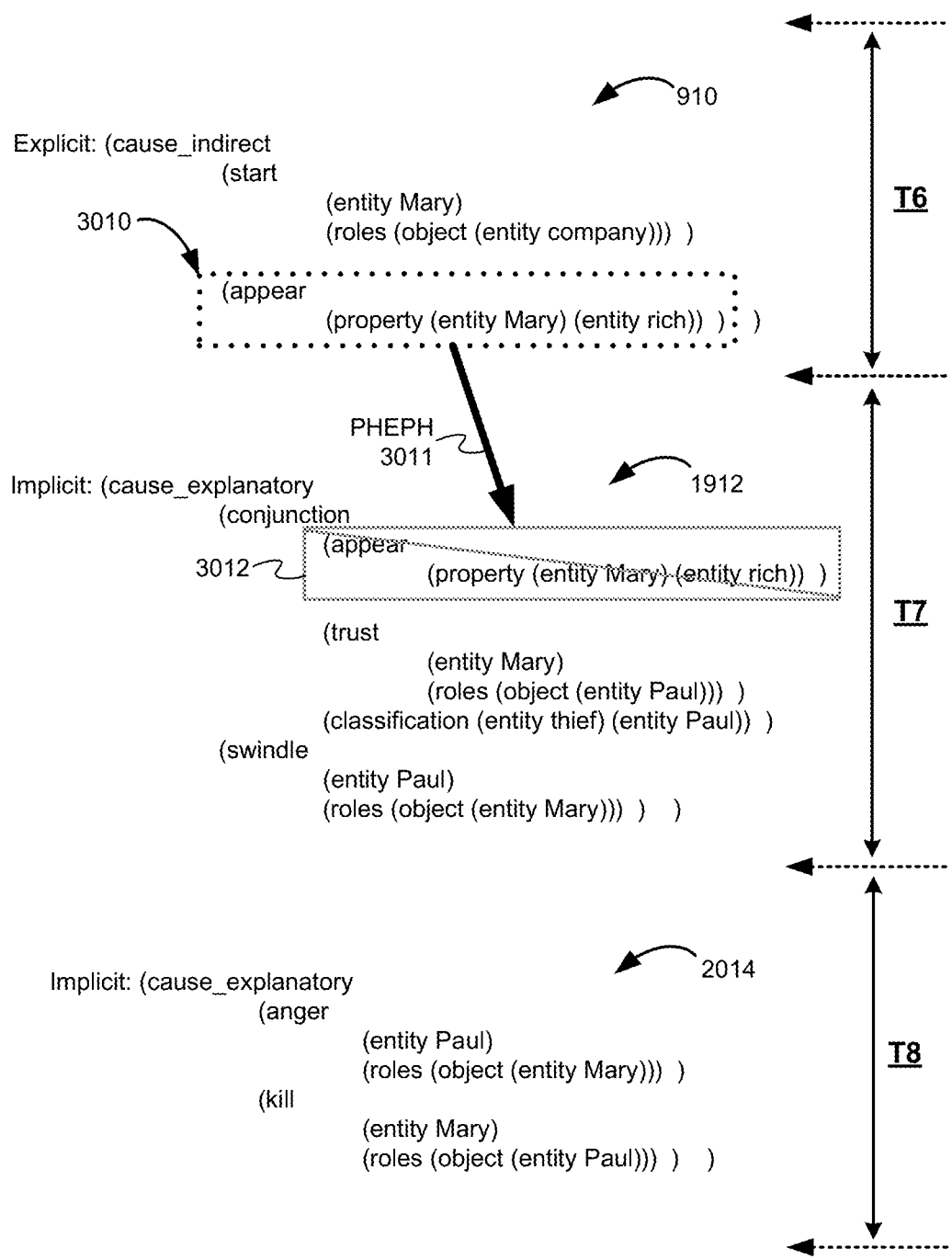
FIG. 30A depicts an opportunity for PHEPH optimization, with respect to FIG. 29B.

The operation of PHEPH can be better understood by reference to FIG. 30A. Proceeding from the top of the figure downwards, are listed, in retextualization order, the three remaining story elements of the summary to be produced: 910, 1912, and 2014. The right side of the figure shows the time step to which, respectively, each story element is assigned: T6, T7, and T8.

As can be seen, there is an opportunity for PHEPH optimization (indicated by arrow 3011). The consequent portion 3010, of the story element 910, appears as an antecedent portion 3012 of story element 1912. The "strikethrough" in box 3012 is indicative of the fact that this antecedent does not need retextualization.

5.2.3 without Means, with Explanations and Presumptions

As has been discussed, FIG. 27B is the same as FIG. 27A, except that the option to include reporting of presumptive-type story elements has been selected.

FIG. 29C takes FIG. 27B forward, for purposes of retextualization, by introducing the following two differences:
  Story elements not part of the summary are deleted.
  Story elements are given the label number of their corresponding parentheses-based representation, in the "B" figures.

Using embedded-element optimization, the following story elements can be eliminated FIG. 29C:
  story elements 1611, and 840 of T4 (connective story element 1610 is kept);
  story element 850 of T5, rendering T5 empty;
  story elements 1811, 860, and 861 of T6 (connective story elements 1810 and 910 are kept);
  story elements 870, and 1914 of T7 (connective story element 1912 is kept); and
  story element 881 of T8 (connective story element 2014 is kept).

The five remaining story elements of FIG. 29C are the following: 1610, 1810, 910, 1912, and 2014. A retextualization of these elements produces the following summary:
  The story is about murder. Paul is a thief, presumably because Paul is greedy. Mary starts a company, presumably because Mary is ambitious. Mary's starting a company leads to Mary's becoming rich. Paul swindles Mary, probably because Paul is a thief, Mary trusts Paul, and Mary becomes rich. Mary kills Paul, probably because Paul angers Mary.

Figure 30B:
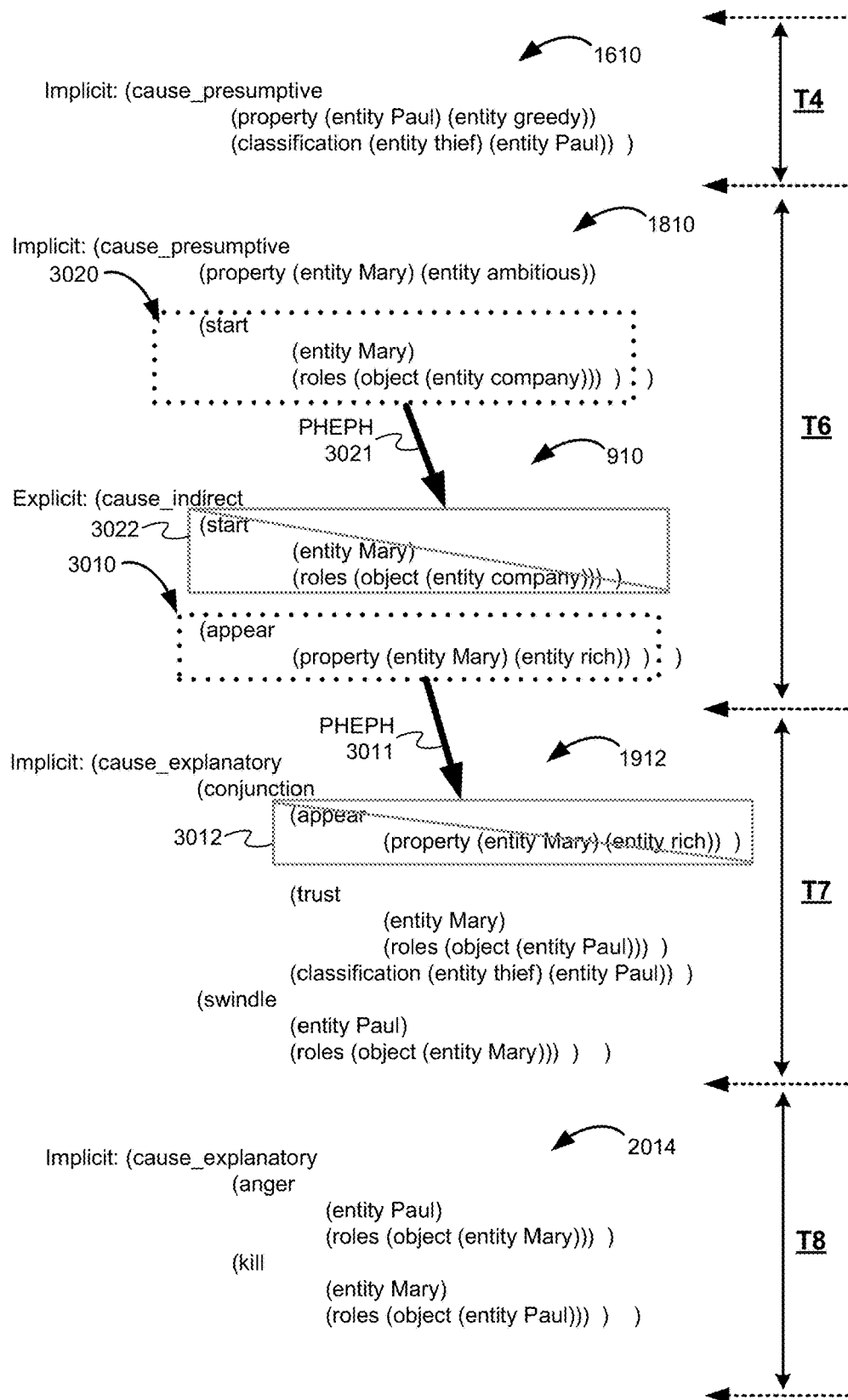
FIG. 30B depicts an opportunity for PHEPH optimization, with respect to FIG. 29C.

FIG. 30B re-depicts the five remaining story elements of FIG. 29C, in parentheses-based form. As can be seen, because of story element 1810, there is an additional opportunity (indicated by arrow 3021) for PHEPH optimization (additional to what is shown in FIG. 30A). The consequent portion 3020 of 1810 reappears as antecedent portion 3022 in 910. Therefore, antecedent portion 3022 is unneeded, since the consequent 3010 will be implied, anyway, as a result of portion 3020 of the immediately preceding sentence.

Applying both opportunities for PHEPH optimization, results in the following summary:
  The story is about murder. Paul is a thief, presumably because Paul is greedy. Mary starts a company, presumably because Mary is ambitious. Mary becomes rich. Paul swindles Mary, probably because Paul is a thief, and Mary trusts Paul. Mary kills Paul, probably because Paul angers Mary.

5.2.4 Phraseology

As can be seen from the above example summaries, if an inference rule type has been chosen for reporting, a preselected stock phrase can be used to express it.

In the examples above, "probably because" is used to express an explanatory-type causal link, while "presumably because" is used to express a presumptive-type causal link.

However, depending upon the particular application, other phraseology may be better suited. For example, "probably because" could be used for presumptive-type causation, as well as for explanatory-type causation. Another example phrase could be "possibly because," which could be used for explanatory-type causation, presumptive-type causation, or both.

A proximity causal link differs, from the other link types discussed herein, by the fact of it not being translated into actual text. Rather, a proximity causal link imposes, for the text corresponding to the story elements it links, adjacency.

If the abductive inference rule 440 had been applied to the interpretation sequence of FIGS. 13-20, then there would be the issue of phraseology, for expressing another reason why Mary killed Paul: Mary is insane. One approach can be, for example, to use the phrase " "at least in part, because." In that case, the following sentence can be added to the summary: "Mary kills Paul, at least in part, because Mary is insane."

If enabling rule 460 were selected for reporting, along with reporting of means-type causation, an enabling-type link can be converted into a prepositional phrase. For example, the sentence "In order to kill Paul, Mary stabs Paul," can be changed to "In order to kill Paul, Mary stabs Paul with a knife."

6 ADDITIONAL INFORMATION

6.1 Thematic-Role Frames

Thematic role frames are based upon the frame approach to knowledge representation. Thematic-role frames have been used very successfully, to capture the semantics of at least individual sentences, in human language. A thematic-role frame is typically anchored by the verb of the sentence it represents, with each thematic-role specifying how some noun participates, in the verb's action. Many different roles can be utilized, depending upon the variety, and complexity, of the sentences to be modeled.

Two of the most important thematic-roles are often called the "agent" and "thematic object." For most sentences, agent and thematic object correspond to, respectively, syntactic subject and object. An example of where they differ, because agent and thematic object are semantic designations, is as follows. Between two sentences that are the same, other than one being in active form and the other being in passive, the agent and thematic object remain the same. In contrast, syntactic subject and object are reversed, between the active and passive forms of an otherwise identical sentence.

Other than agent and thematic object, it is almost always the case that a thematic-role corresponds to a prepositional phrase of the sentence. The particular thematic-role is often identified from a combination of factors, including the following: the particular preposition used, the particular verb, the particular noun.

An example discussion, of frames, and of the thematic-role approach, can be found in, respectively, Chapters 9 and 10 of the following book (pgs. 179-230), herein incorporated by reference in its entirety: "Artificial Intelligence" Third Edition, by Patrick Henry Winston, Addison-Wesley, 1992.

6.2 Story Element Count

In order from T1 to T8, following is a listing of the 16 explicit story elements of FIG. 20A:
1. Atomic story element "Peter is a person"
2. Atomic story element "Paul is a person"
3. Atomic story element "Mary is a person"
4. Atomic story element "Peter is poor"
5. Connective story element, of type cause_direct, that connects "Mary loves Peter" to "Mary marries Peter."
6. Atomic story element "Mary loves Peter"
7. Atomic story element "Mary marries Peter"
8. Atomic story element "Paul is a thief"
9. Atomic story element "Mary trusts Paul"
10. Connective story element, of type cause_indirect, that connects "Mary's starting a company" to "Mary becomes rich."
11. Atomic story element "Mary's starting a company"
12. Atomic story element "Mary becomes rich"
13. Atomic story element "Paul swindles Mary."
14. Connective story element, of type cause_means, that connects "Mary stabs Paul" to "Mary kills Paul."
15. Atomic story element "Mary stabs Paul"
16. Atomic story element "Mary kills Paul"

In terms of the parenthesis-based representation, going in order from T1 to T8, across FIGS. 8A-8H and FIGS. 9A-9C, the following is a listing of the 16 explicit story elements:
1. Atomic story element 801.
2. Atomic story element 802.
3. Atomic story element 803.
4. Atomic story element 811.
5. Connective story element 900, of type cause_direct.
6. Atomic story element 820.
7. Atomic story element 821.
8. Atomic story element 840.
9. Atomic story element 850.
10. Connective story element 910, of type cause_indirect.
11. Atomic story element 860.
12. Atomic story element 861.
13. Atomic story element 870.
14. Connective story element 920, of type cause_means.
15. Atomic story element 880.
16. Atomic story element 881.

6.3 Literal Versus Meta Entities

In the various discussions presented herein, it should be understood that "meta" entities, and "literal" entities, are relative terms. It need only be the case that the so-called "literal" entity be a lower-level representation, relative to the so-called "meta" specification.

6.4 The "B" Figures

As used anywhere herein, the term "the 'B' figures" shall be understood as a reference to the following set of figures, which collectively represent an interpretation sequence: FIGS. 13B, 14B, 15B, 16B, 17B, 18B, 19B, and 20B When considered as a group, the "B" figures (i.e., FIGS. 13B, 14B, 15B, 16B, 17B, 18B, 19B, and 20B) constitute a complete interpretation sequence for input story 200, expressed in parentheses-based form. With regard to this interpretation sequence, each of FIGS. 13B, 14B, 15B, 16B, 17B, 18B, 19B, and 20B, correspond to, respectively, the following time step (as shown in FIG. 3K or 20A): T1, T2, T3, T4, T5, T6, T7, and T8.

6.5 Use of White Space

Occasionally, whitespace is inserted between closing parentheses, such as is the case for closing parentheses 805 and 806, of representation 800 of FIG. 8A. Such whitespace is not functionally necessary, but is intended to assist in identifying the corresponding opening parenthesis. For example, parentheses 805 is the closing parentheses for the "roles" operator, while parentheses 806 is the closing parentheses for the verb "put."

A discussion of the parentheses-based representation, upon which representation 800 of FIG. 8A is based, is presented in section 2.2 ("Parentheses-based representation").

7 GLOSSARY OF SELECTED TERMS

Author: The one or more persons, sufficiently involved in the story-writing process, such that each can be regarded, to at least some extent, as a creator of the story.

Java code: The Java programming language was originally created by Sun Microsystems, Inc. (USA), which was then acquired by Oracle Corporation (Redwood Shores, Calif., USA).

Meta-entity: A symbol, used in the trigger or action portion of a rule. A meta-entity differs from an entity by the fact that different entities (of an interpretation sequence) can be assigned to it. For the duration of an assignment, a meta-entity is treated, in either the trigger or action portion, as if it actually were the assigned entity. In general, a meta-entity is indicated herein by a twice-repeated character (e.g., "xx" is a meta-entity).

NLP: Natural Language Processing.

Rule: As used herein, refers to an encapsulation of reader knowledge. Can be used to capture common-sense knowledge, for purposes of interpretation sequence construction, or concept-knowledge. Regardless of the particular format, a rule comprises a trigger portion and an action portion. The trigger portion comprises a particular configuration of semantic knowledge, expressed relative to meta-entities. A matcher seeks to find, within an interpretation sequence, instances of the semantic knowledge expressing the same configuration as the trigger, except an instance in the interpretation sequence is expressed relative to entities. If the trigger is satisfied, the action portion of the rule is performed. If a meta-entity of the trigger is also present in the action, the action is performed with the same assignment, of meta-entity to entity, which produced the trigger's satisfaction. The action portion causes the interpretation sequence to be augmented, with one or more additional story elements.

START parser: A natural language processing system, developed by Boris Katz at the Massachusetts Institute of Technology. START includes a parser, that produces ternary expressions, which can be nested, for purposes of representing more complex sentence structures. Example publication on the START parser:

Boris Katz. "Annotating the World Wide Web Using Natural Language." Proceedings of the 5th RIAO Conference on Computer Assisted Information Searching on the Internet (RIAO '97), 1997.

8 COMPUTING EQUIPMENT

In accordance with what is ordinarily known by those in the art, the inventive methods, procedures, or techniques, described herein, can be implemented through the use of any suitable computing hardware. Suitable hardware can include the use of one or more general purpose computers or processors. Hardware implementation techniques can include the use of various types of integrated circuits, programmable memories (volatile and non-volatile), or both.

Those of ordinary skill in the relevant art will appreciate that, while certain algorithms have been presented as sequential, iterative, or recursive, depending upon the availability of parallel or concurrent hardware, such operations can be suitably re-partitioned.

While the particular embodiments described above are based upon the receipt of textual input, and the production of textual output, those of ordinary skill in the relevant art will appreciate that, with suitable hardware, the input can be received as an audio signal, that can then be converted to text, or the audio signal can be directly converted, into an interpretation sequence representation. Similarly, the output can be an audio signal, either produced from output text, or as a direct conversion, from the story elements chosen for inclusion in the summary.

Computational hardware, whether in integrated circuit form or otherwise, is typically based upon the use of transistors (field effect, bipolar, or both), although other types of components (e.g., optical, microelectromechanical, or magnetic) may be included. Any computational hardware has the property that it will consume energy, as a necessary part of being able to perform its function. Also, regardless of how quickly it can be made to operate, computational hardware will require some amount of time to change state. Because of its basis on physical devices (electronic or otherwise), computational hardware, however small, will occupy some amount of physical space.

Programmable memories are also often implemented in integrated circuit form, and are subject to the same physical limitations described above for computational hardware. A programmable memory is intended to include devices that use any kind of physics-based effects or properties, in order to store information in at least a non-transitory way, and for an amount of time commensurate with the application. The types of physical effects used to implement such storage, include, but are not limited to: maintenance of a particular state through a feedback signal, charge storage, changes to optical properties of a material, magnetic changes, or chemical changes (reversible or irreversible).

Unless specifically indicated otherwise, the terms computational hardware, programmable memory, computer-readable media, system, and sub-system, do not include persons, or the mental steps a person may undertake.

For any method, procedure or technique described above, to the extent it is implemented as the programming of a computer or other data processing system, it can also be described as a computer program product. A computer program product can be embodied on any suitable computer-readable medium or programmable memory.

The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored, from which a defined unit of information can be retrieved, or both.

9 Java Implementation

Appendix G of the '180 Application, herein incorporated by reference in its entirety, presents actual Java code, for performing various kinds of summarization, in accordance with techniques of the present invention.

The three main summarization methods of Appendix G are as follows:
1. composeSummaryFromAntecedentsAndExplicitCauses:
   a. See page 5 of Appendix G.
   b. Presents the most basic, connectedness-based, summarization technique.
2. composeConceptCenteredSummaries:
   a. See page 6 of Appendix G.
   b. Presents a summarization technique dependent upon the identification of Concept Patterns. While the term "Concept Pattern" is used in the '180 Application, herein, a "Concept Pattern" is simply referred to as a "concept."
3. composeDominantConceptCenteredSummary:
   a. See page 7 of Appendix G.
   b. Presents a summarization technique dependent upon the identification of a dominant (or best according to a metric) Concept Pattern.

Appendix H of the '180 Application, herein incorporated by reference in its entirety, presents actual Java code, for the identification of Concept Patterns. This code serves as the basis for the Concept-Pattern based summarization methods of Appendix G.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for summarizing natural language, comprising:
   obtaining, performed at least with a configuration of computing hardware and programmable memory, a first input story, containing a plurality of sentences;
   determining, performed at least with a configuration of computing hardware and programmable memory, a first sequential ordering, of the plurality of sentences of the first input story;
   producing for each sentence of the first input story, performed at least with a configuration of parsing and syntax-to-semantics mapping computing hardware and programmable memory, a semantic model comprising one or more explicit story elements;
   including, performed at least with a configuration of computing hardware and programmable memory, each semantic model in a time-step set;
   producing an interpretation sequence, performed at least with a configuration of computing hardware and programmable memory, by ordering the time-step sets according to the first sequential ordering;
   producing for the semantic model, performed at least with a configuration of parsing and syntax-to-semantics mapping computing hardware and programmable memory, as a representation for each atomic story element, a thematic-role frame, wherein at least one frame includes the roles of agent and thematic object;
   producing, performed at least with a configuration of parsing and syntax-to-semantics mapping computing hardware and programmable memory, an explicit causal connective story element that connects an antecedent thematic-role frame to a consequent thematic-role frame, for a semantic model of a first sentence, if the first sentence is determined to connect atomic story elements as a result of, at least, including an explicit connective syntactic cue of causation;
   applying a first database, that represents implicit common-sense knowledge about causation as a collection of rules, to the interpretation sequence;
   triggering a first rule of the first database by finding, within the interpretation sequence, one or more story elements with one or more literal entities, that match a first trigger pattern, wherein the first trigger pattern includes one or more story elements with one or more meta-entities;
   producing one or more story elements with an action pattern of the first rule, for addition to the interpretation sequence, wherein the production includes substituting, for one or more meta-entities within the action pattern, one or more literal entities identified in the triggering of the first rule;
   matching, performed at least with a configuration of computing hardware and programmable memory, an antecedent, of a first concept pattern, to a first story element of the interpretation sequence, wherein at least one meta-entity of the antecedent is matched with a literal entity of the first story element;
   matching, performed at least with a configuration of computing hardware and programmable memory, a consequent, of the first concept pattern, to a second story element of the interpretation sequence, wherein at least one meta-entity of the consequent is matched with a literal entity of the second story element;
   indicating a match of the first concept pattern, performed at least with a configuration of computing hardware and programmable memory, if the first story element leads to the second story element, through one or more causal connections;
   producing a first subset of the interpretation sequence, performed at least with a configuration of computing hardware and programmable memory, where a story element is included, in the first subset, if it is a story element that would be traversed as part of a contra-causal search, through the interpretation sequence, starting at the second story element;
   considering, performed at least with a configuration of computing hardware and programmable memory, each story element of the first subset;
   marking for inclusion in a summary, performed at least with a configuration of computing hardware and programmable memory, each considered story element that is explicit; and
   producing, performed at least with a configuration of computing hardware and programmable memory, an output sentence, for each marked story element.

2. The method of claim 1, further comprising:
   matching an antecedent, of a second concept pattern, to a third story element of the interpretation sequence;
   matching a consequent, of the second concept pattern, to a fourth story element of the interpretation sequence;

indicating a match, of the second concept pattern, if the third story element leads to the fourth story element, through one or more causal connections;

measuring the match of the first concept pattern, according to a metric, in order to produce a first score;

measuring the match of the second concept pattern, according to the metric, in order to produce a second score; and selecting the first concept pattern, for production of the first subset, if the first score, relative to the second score, indicates the first concept pattern is more important to the first story than the second concept pattern.

3. The method of claim 1, further comprising:
ordering the output sentences in accordance with a traversal, of each marked story element, firstly, on a sequential time-step set by time-step set basis, and, secondly, within each time-step, according to any causally-determined ordering that may be present.

4. The method of claim 1, further comprising:
optimizing a first output sentence, that would otherwise state a causal relationship between an antecedent and consequent, to omit the antecedent, if a second output sentence, scheduled for output immediately prior to the first output sentence, contains the antecedent.

5. The method of claim 1, further comprising:
unmarking a marked story element, if it is a causal connection that indicates an instrumentality, as a means for accomplishing another story element.

6. The method of claim 1, further comprising:
unmarking a marked story element, if it is embedded in another marked story element.

7. The method of claim 1, further comprising:
marking a considered story element, for inclusion in a summary, if a user input has indicated that explanatory-type causal connections are to be included in the summary, and if the considered story element is an explanatory-type causal connection.

8. The method of claim 1, further comprising:
identifying the connective syntactic cue indicative of causation, as a first instance of direct causation, at least by identifying, in the first sentence, a first subordinating conjunction.

9. The method of claim 1, further comprising:
identifying the connective syntactic cue indicative of causation, as a first instance of indirect causation, at least by identifying, in the first sentence, a first transitive phrasal verb.

10. The method of claim 1, further comprising:
identifying the connective syntactic cue indicative of causation, as a first instance of instrumentality causation, at least by identifying, in the first sentence, a first phrasal adverb.

11. The method of claim 1, further comprising:
identifying a first deductive rule, that undergoes a first triggering as a result of, at least, a first story element of a first time-step set.

12. The method of claim 11, further comprising:
producing, for inclusion in the first time-step set, as a result of the first triggering, story elements that include, at least, a first implicit consequent, and, coupling the first story element to the first implicit consequent, a first implicit deductive connection.

13. The method of claim 12, further comprising:
producing a first implicit deductive connection that, if converted into a sentence and included in a first summary, would, when read by an average reader, provide no useful information.

14. The method of claim 1, further comprising:
identifying a first story element in a first time step, that is not a consequent of an instance of explicit causation;
identifying the first story element as not being a consequent of an instance of deductive causation;
identifying a first proximity rule, that has a first consequent pattern that is matched by the first story element;
searching for a second story element, in a second time-step set adjacent to the first time-step set, that matches a first antecedent pattern of the first proximity rule; and
producing a first implicit proximity connection that includes, at least, connecting the second story element to the first story element.

15. The method of claim 1, further comprising:
identifying a first story element in a first time step, that is not a consequent of an instance of explicit causation;
identifying the first story element as not being a consequent of an instance of deductive causation;
identifying a first explanatory rule, that has a first consequent pattern that is matched by the first story element;
searching for a second story element, in any time-step set of the interpretation sequence, that matches a first antecedent pattern of the first explanatory rule; and
producing a first implicit explanatory connection that includes, at least, connecting the second story element to the first story element.

16. The method of claim 15, further comprising:
producing a first implicit explanatory connection that, if converted into a first sentence and included in a first summary, can, when read by an average reader, reduce the time required, before for the average reader understands the connection.

17. The method of claim 1, further comprising:
identifying a first presumptive rule, that undergoes a first triggering as a result of, at least, a first story element of a first time-step set.

18. The method of claim 17, further comprising:
producing, for inclusion in the first time-step set, as a result of the first triggering, story elements that include, at least, a first implicit antecedent, and, coupling the first implicit antecedent to the first story element, a first implicit presumptive connection.

19. The method of claim 1, further comprising:
determining a first set of unique entities, used across a first selection of story elements, where the first selection of story elements is to be matched against a first inference rule;
determining a first set of unique meta-entities, used across a first set of trigger patterns of the first inference rule;
determining a first set of assignments, of the first set of entities to the first set of meta-entities; and
indicating a match if, under the first set of assignments, the first set of trigger patterns specifies the first selection of story elements.

20. The method of claim 19, further comprising:
producing one or more story elements, as a result of the match being indicated, by utilizing the first set of assignments with a first set of action patterns of the first inference rule.

* * * * *